(12) United States Patent
Jung

(10) Patent No.: US 12,277,295 B2
(45) Date of Patent: Apr. 15, 2025

(54) INPUT DEVICE AND CONTROL METHOD THEREFOR

(71) Applicant: Woo Yeol Jung, Jeollanam-do (KR)

(72) Inventor: Woo Yeol Jung, Jeollanam-do (KR)

( * ) Notice: Subject to any disclaimer, the term of this patent is extended or adjusted under 35 U.S.C. 154(b) by 0 days.

(21) Appl. No.: 18/705,280

(22) PCT Filed: Jan. 20, 2023

(86) PCT No.: PCT/KR2023/001006
§ 371 (c)(1),
(2) Date: Apr. 26, 2024

(87) PCT Pub. No.: WO2023/146224
PCT Pub. Date: Aug. 3, 2023

(65) Prior Publication Data
US 2024/0329783 A1 Oct. 3, 2024

(30) Foreign Application Priority Data
Jan. 26, 2022 (KR) ........................ 10-2022-0011495

(51) Int. Cl.
*G06F 3/044* (2006.01)
*G06F 3/041* (2006.01)
(Continued)

(52) U.S. Cl.
CPC ............ *G06F 3/044* (2013.01); *G06F 3/0416* (2013.01); *G06F 3/046* (2013.01);
(Continued)

(58) Field of Classification Search
CPC ........ G06F 3/044; G06F 3/0416; G06F 3/046; G06F 2203/04104; G06F 2203/04106; G06V 40/1306; G06V 40/1365
See application file for complete search history.

(56) References Cited

U.S. PATENT DOCUMENTS

2015/0363038 A1* 12/2015 Luo .................... G06F 3/041661
345/173
2017/0003876 A1* 1/2017 Marsden ............... G06F 3/0231
2017/0090594 A1* 3/2017 Borghi ................ G06F 3/03547

FOREIGN PATENT DOCUMENTS

JP 2010-182201 A 8/2010
KR 10-2013-0134981 A 12/2013
(Continued)

OTHER PUBLICATIONS

Request for submission of opinion issued Oct. 21, 2022 in the counterpart Korean Patent Application No. 10-2022-0011495.
(Continued)

*Primary Examiner* — Muhammad N Edun
(74) *Attorney, Agent, or Firm* — Sughrue Mion, PLLC

(57) ABSTRACT

Provided is an input device including a pair of bases each including a first installation groove and a second installation groove formed on an upper surface a first input unit provided in the first installation groove to form a palm seating area and configured to detect a palm input signal by electromagnetic and capacitive methods when a palm is brought into contact therewith, a second input unit provided in the second installation groove to form a finger seating area and configured to detect a finger input signal by a capacitive method when a finger is brought into contact therewith, a control unit provided on each of the bases configured to transmit the palm input signal and the finger input signal transmitted respectively from the first input unit and the second input unit to the electronic device, and a power supply unit.

9 Claims, 41 Drawing Sheets

(51) Int. Cl.
*G06F 3/046* (2006.01)
*G06V 40/12* (2022.01)
*G06V 40/13* (2022.01)

(52) U.S. Cl.
CPC ...... *G06V 40/1306* (2022.01); *G06V 40/1365* (2022.01); *G06F 2203/04104* (2013.01); *G06F 2203/04106* (2013.01)

(56) References Cited

FOREIGN PATENT DOCUMENTS

| | | |
|---|---|---|
| KR | 10-2015-0109597 A | 10/2015 |
| KR | 10-2016-0069692 A | 6/2016 |
| KR | 10-2018-0090705 A | 8/2018 |
| KR | 20-2020-0002775 U | 12/2020 |

OTHER PUBLICATIONS

Written Decision on Registration issued Feb. 22, 2023 in the counterpart Korean Patent Application No. 10-2022-0011495.
International Search Report for PCT/KR2023/001006 dated Mar. 30, 2023.

* cited by examiner

[Fig. 1]
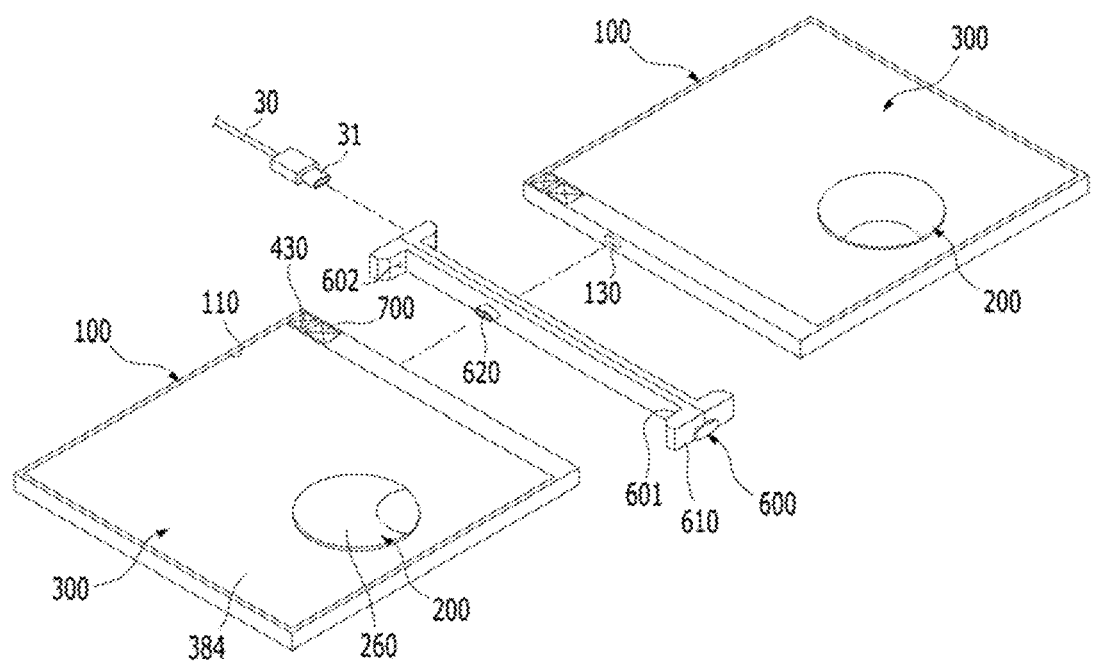

[Fig. 2]
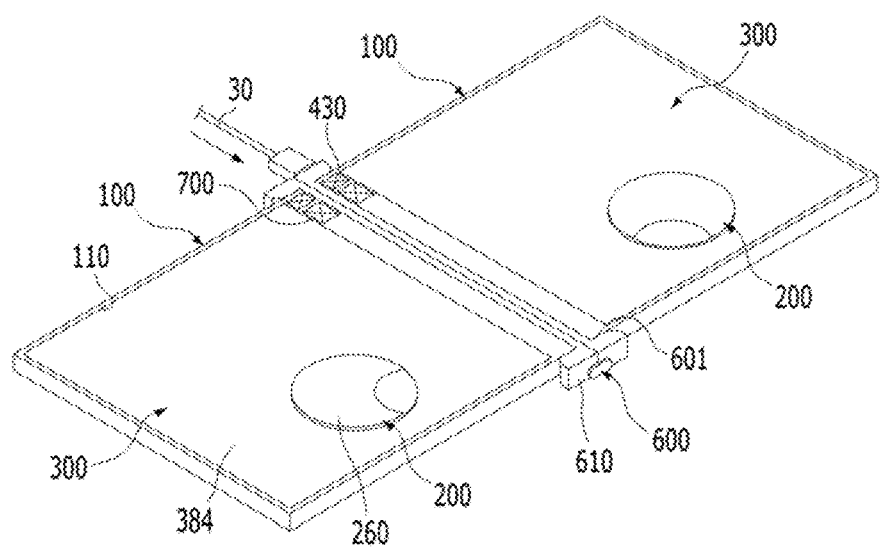

[Fig. 3]
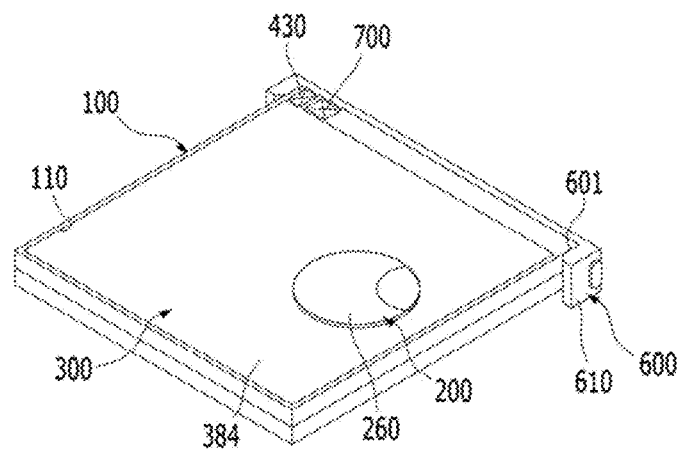

[Fig. 4]
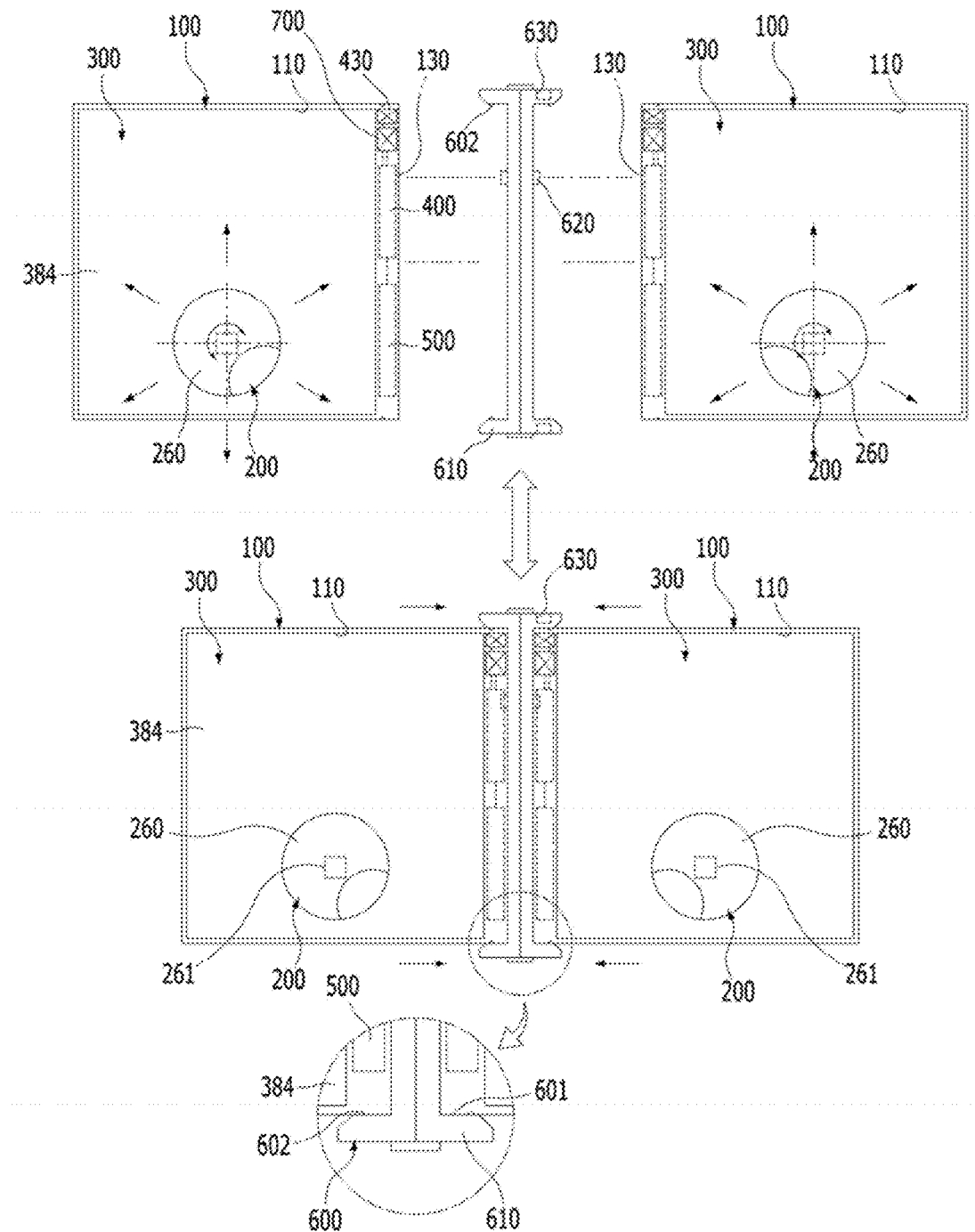

[Fig. 5]
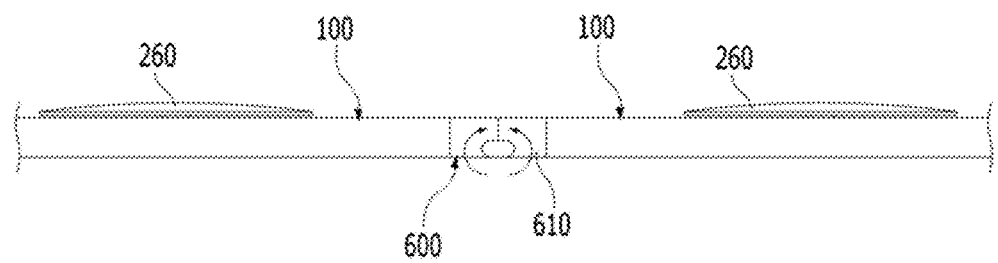

[Fig. 6]
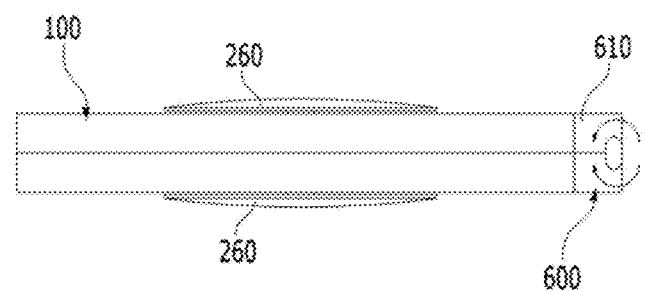

[Fig. 7]
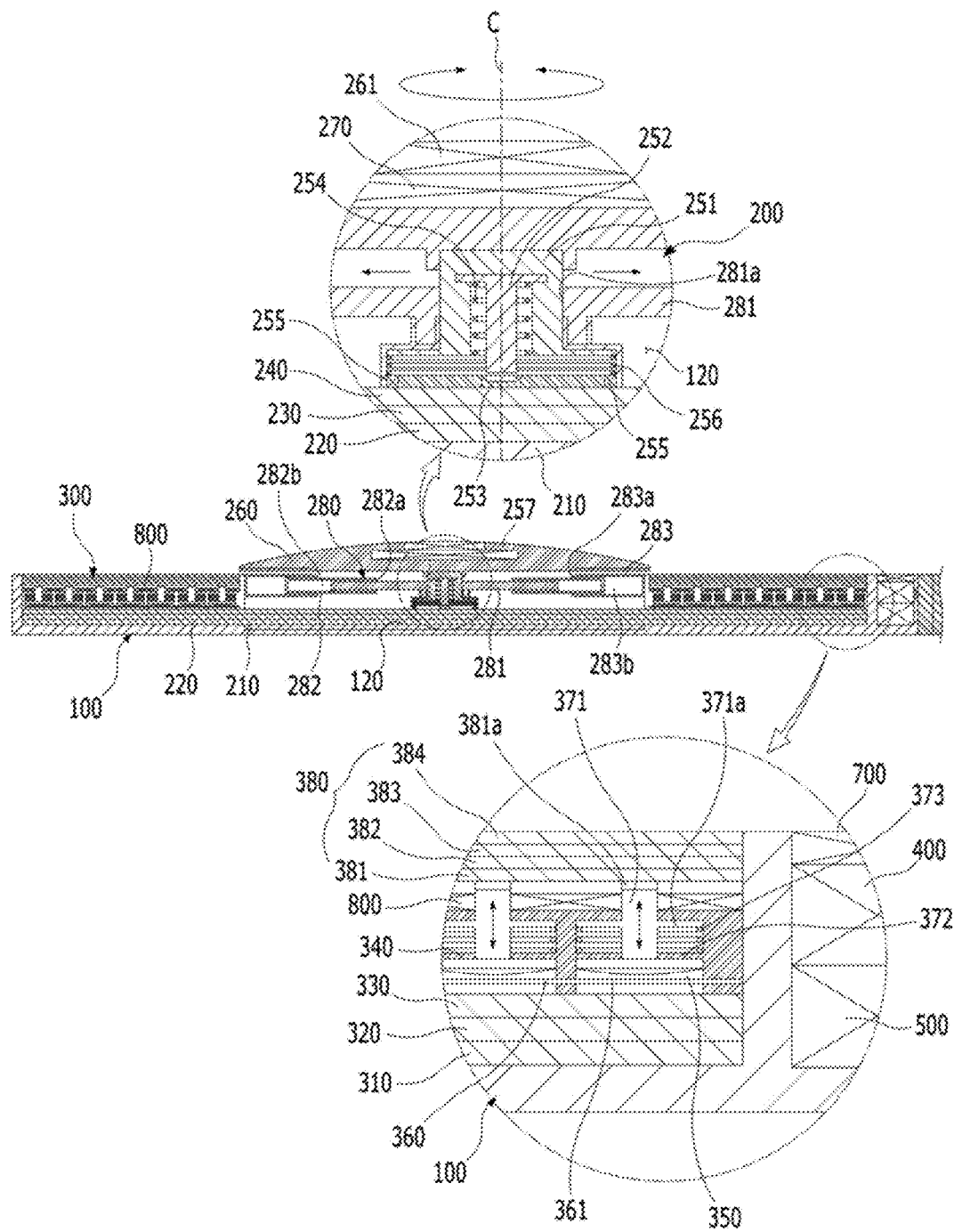

[Fig. 8]
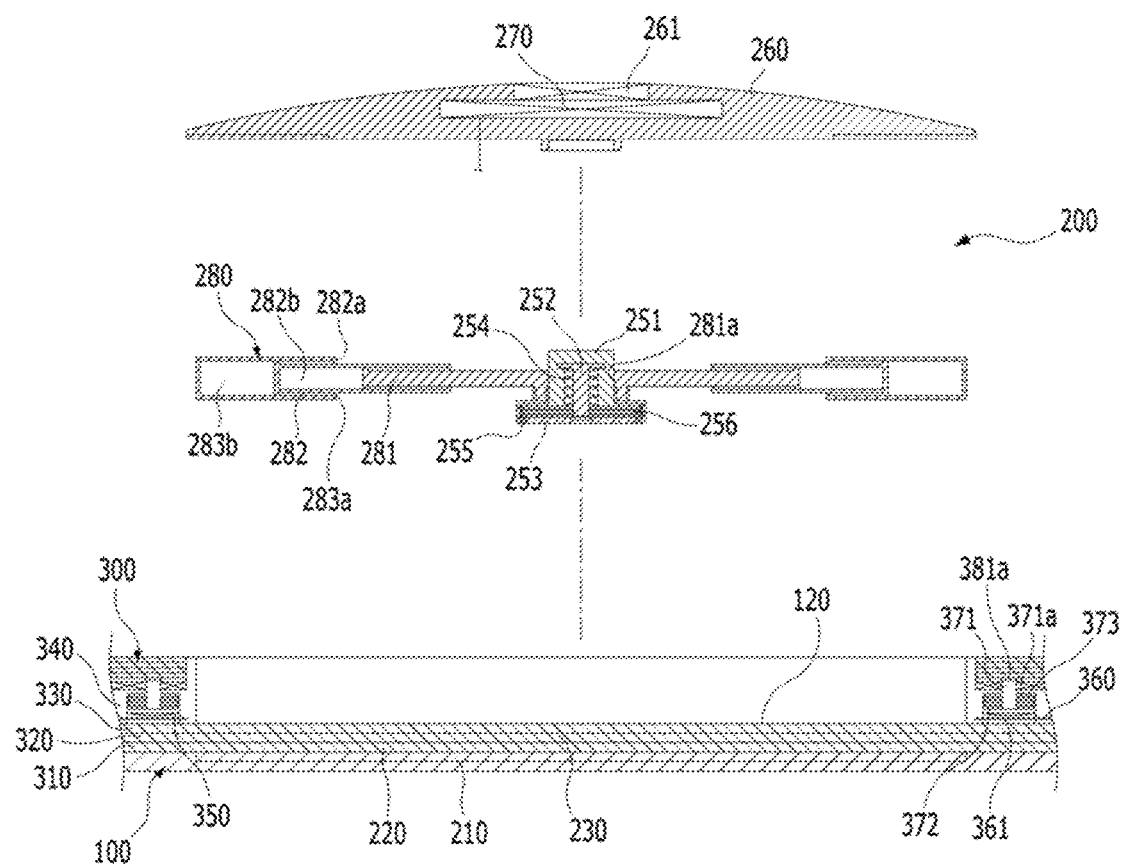

[Fig. 9]
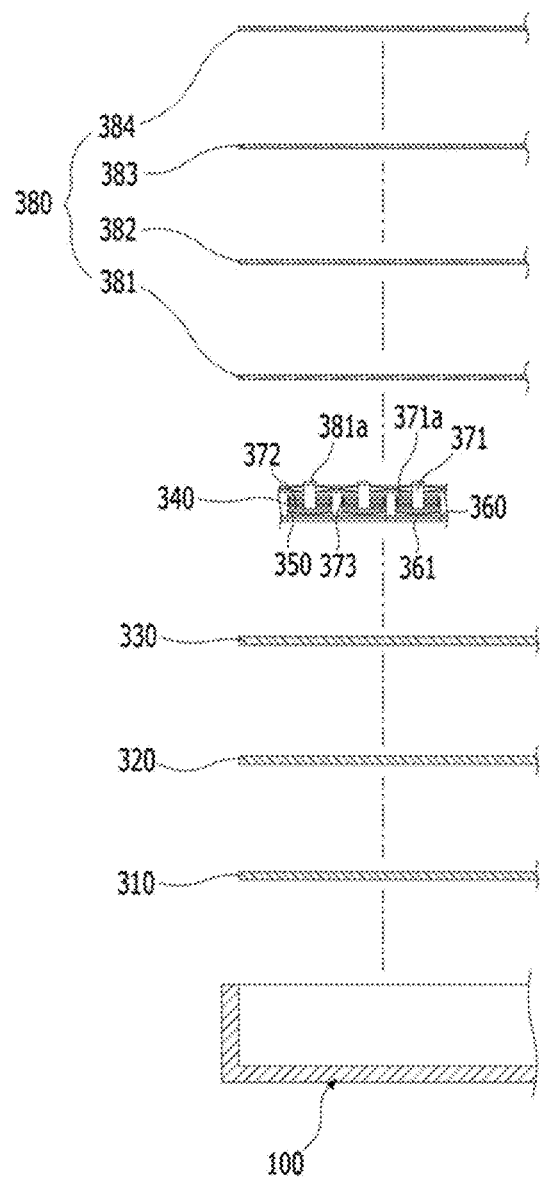

[Fig. 10]
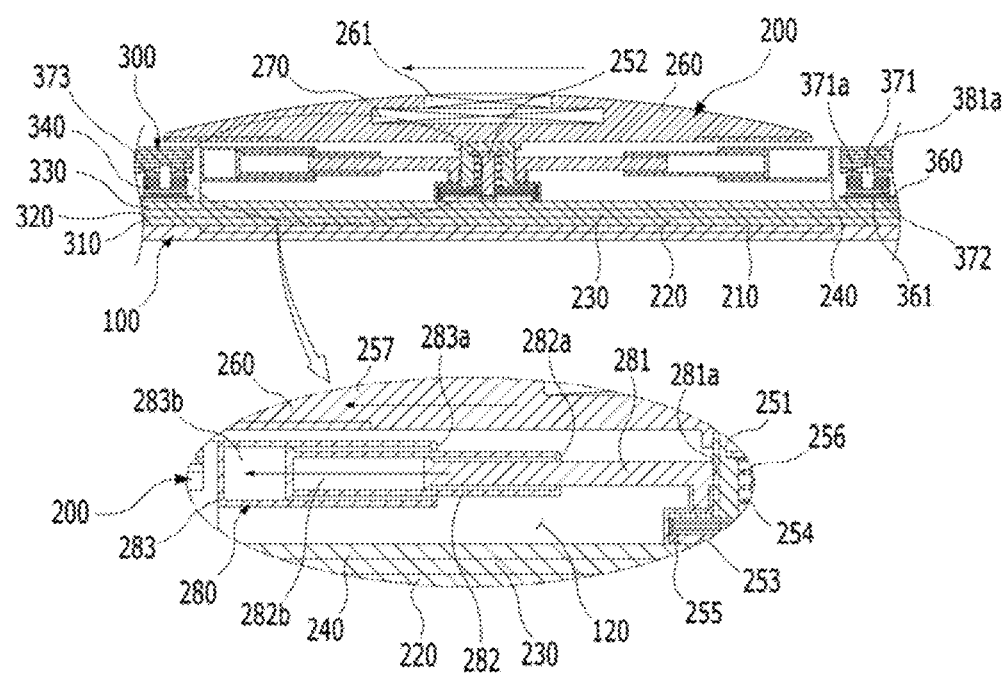

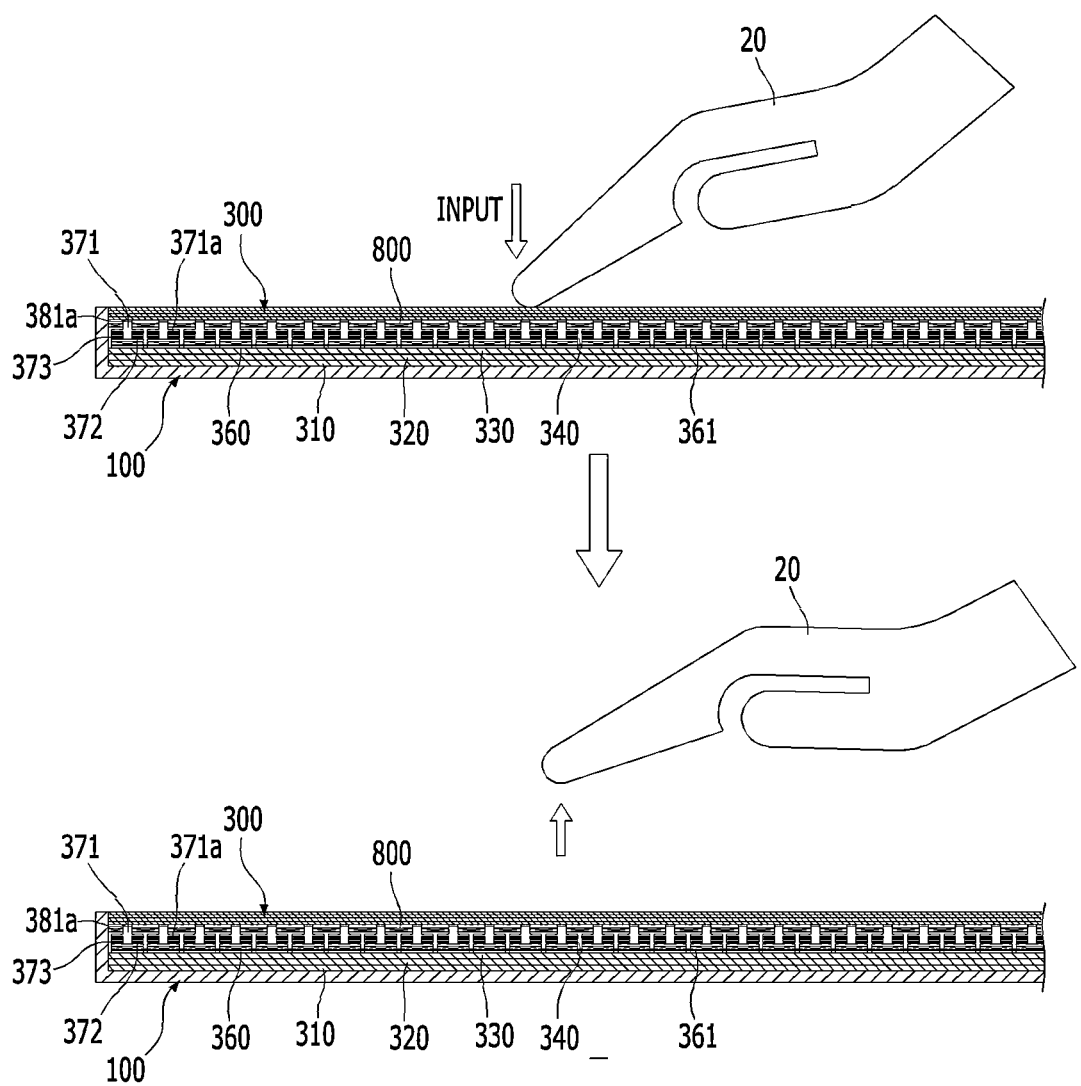
[Fig. 11]

[Fig. 12]
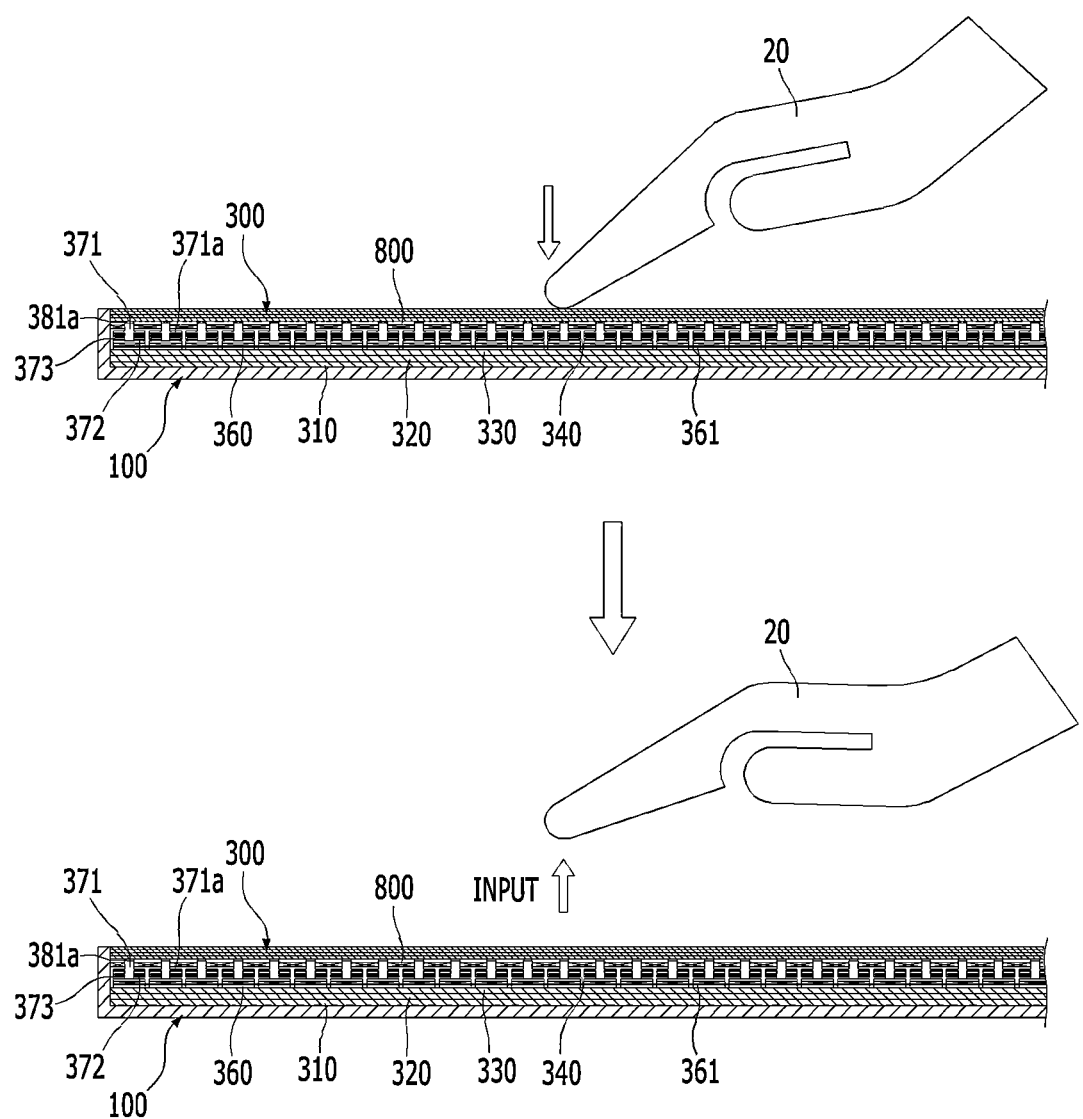

[Fig. 13]
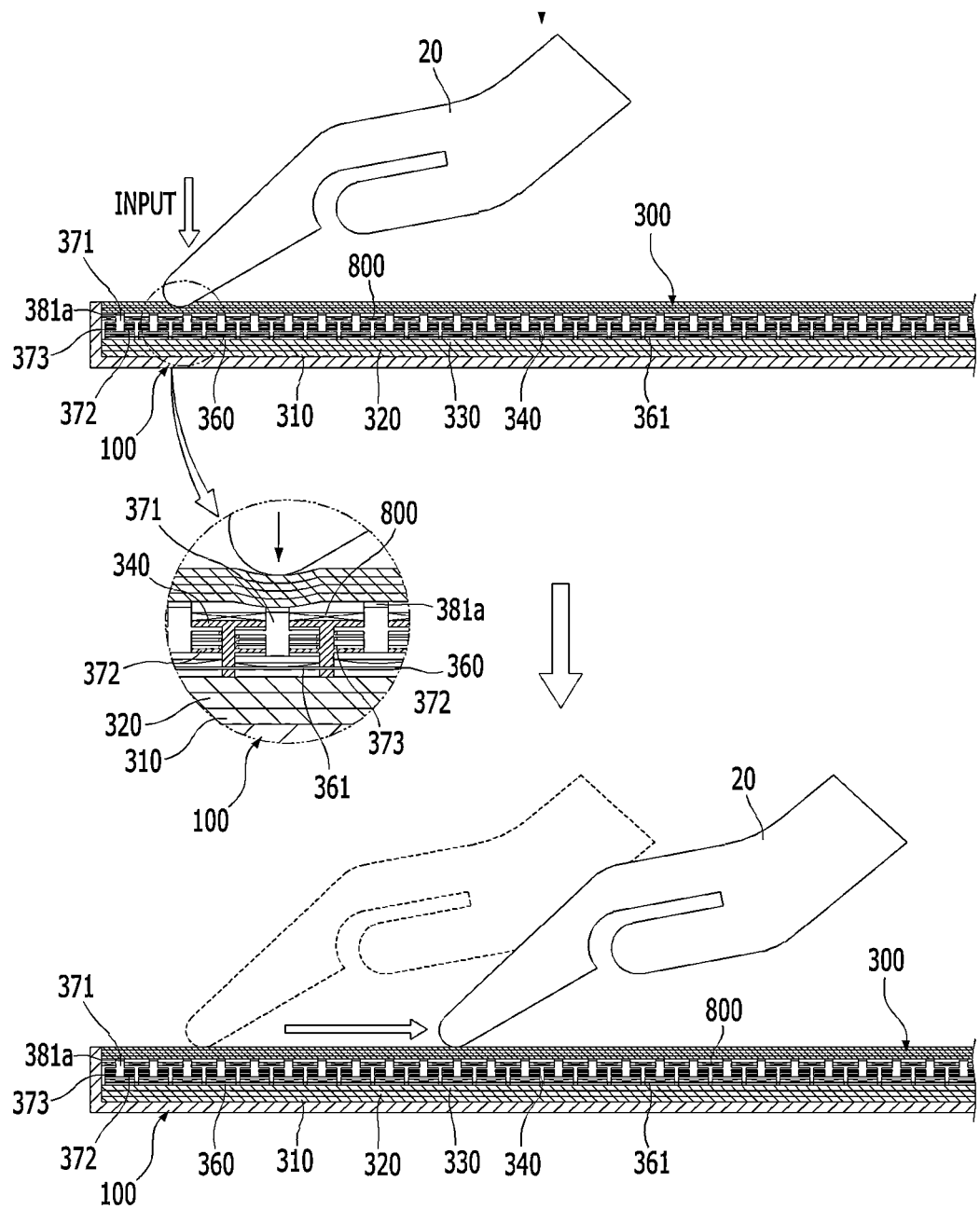

[Fig. 14]
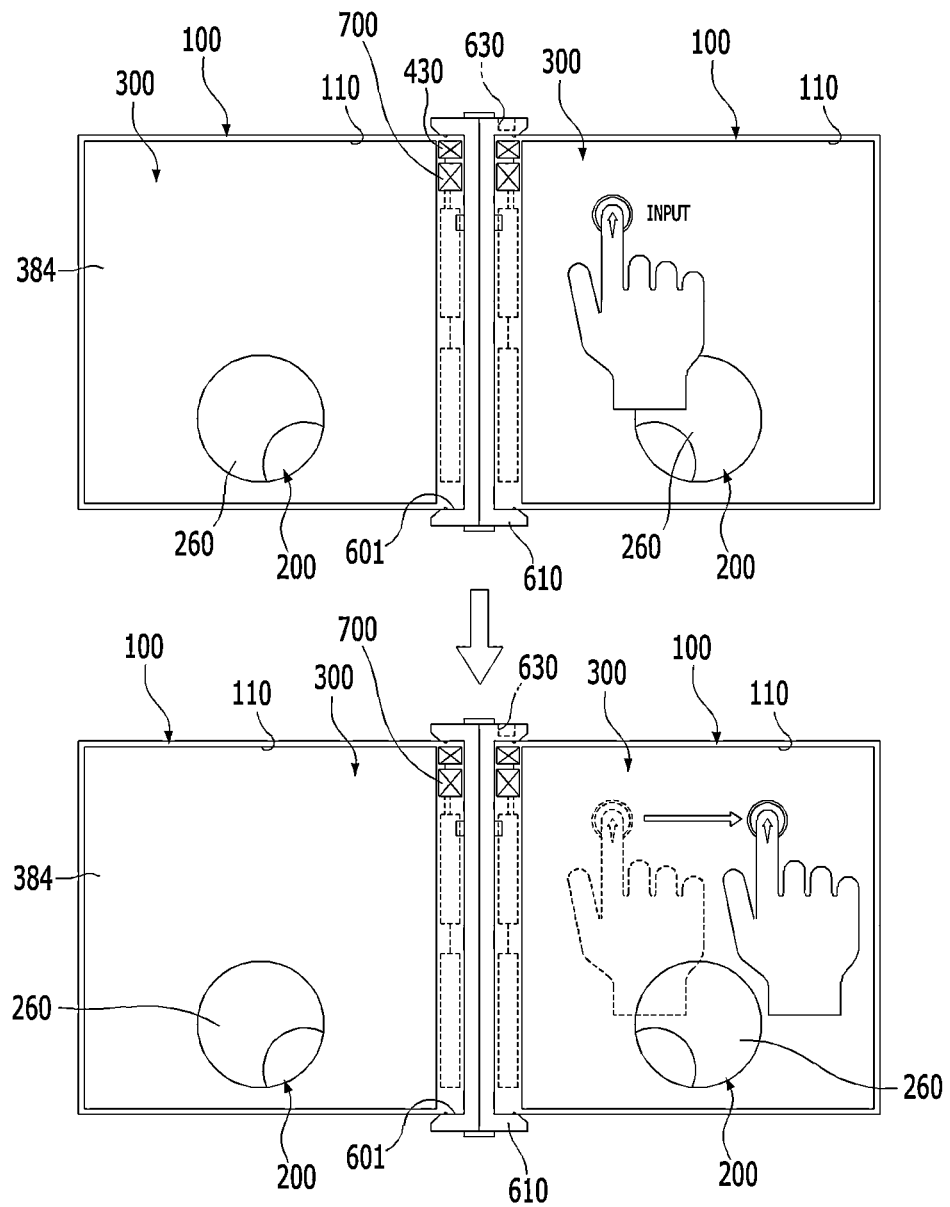

[Fig. 15]
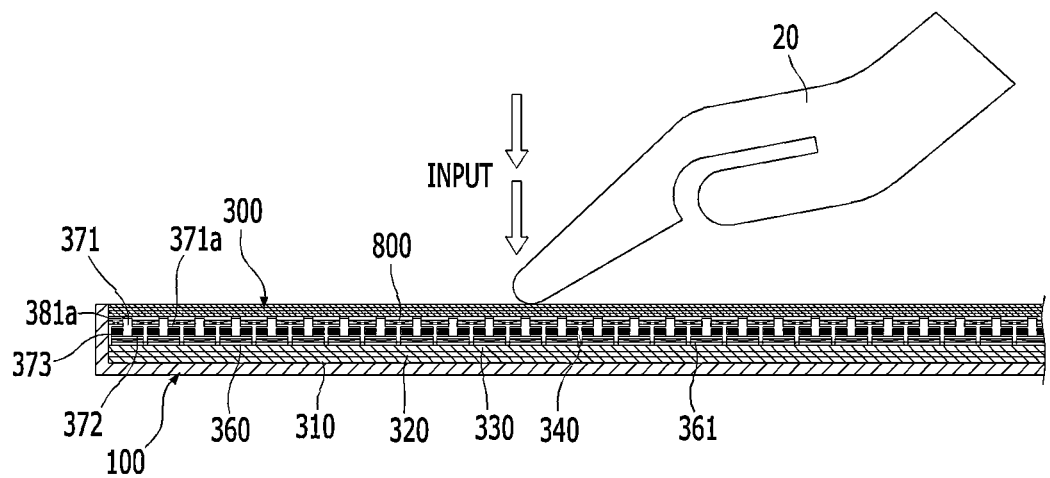

[Fig. 16]
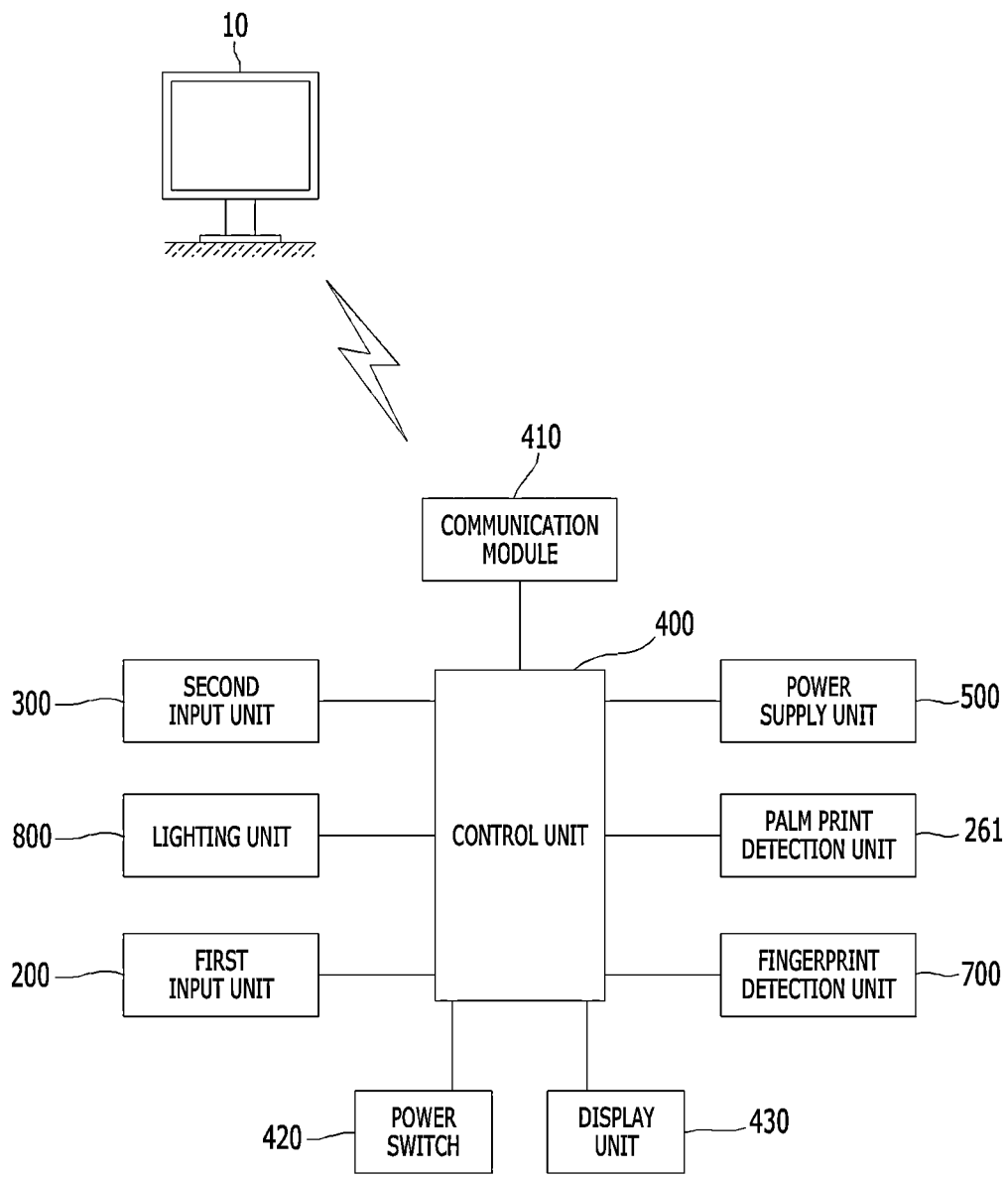

[Fig. 17]
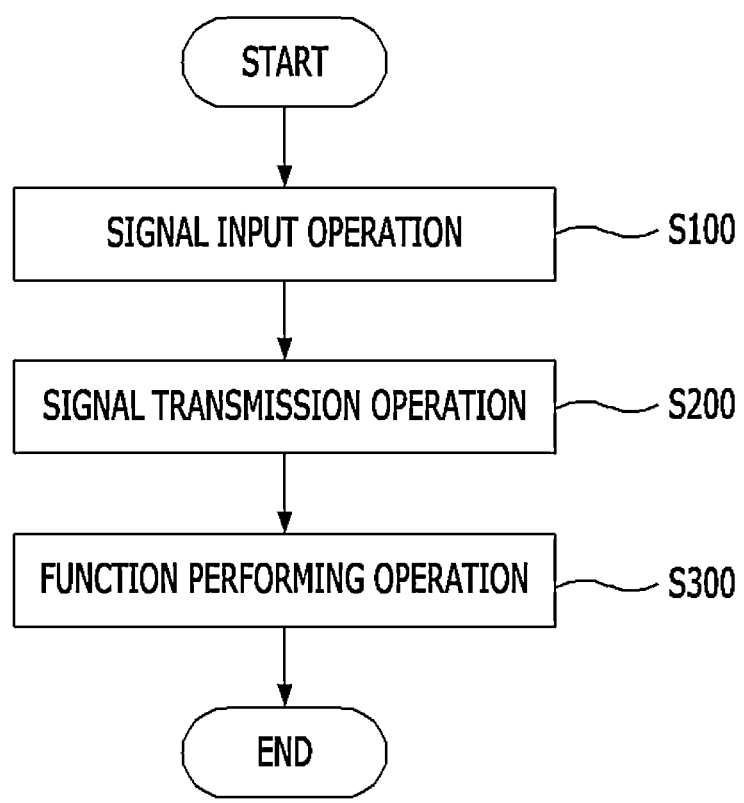

[Fig. 18]
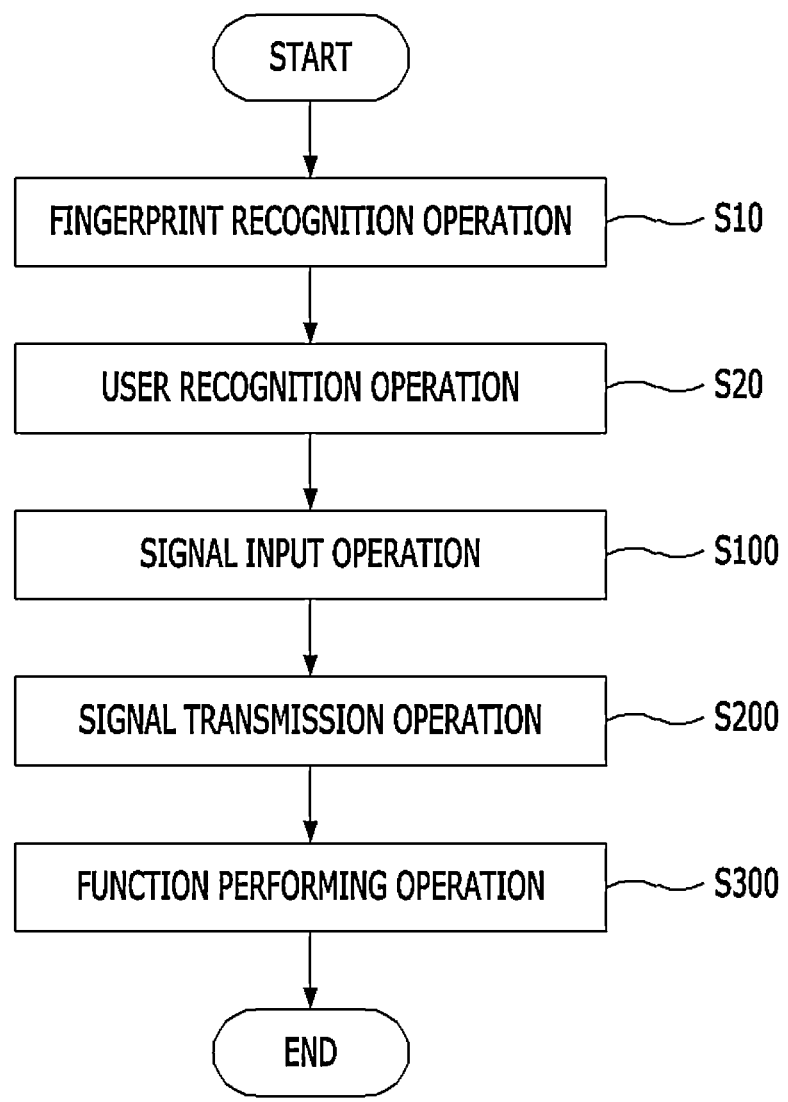

[Fig. 19]
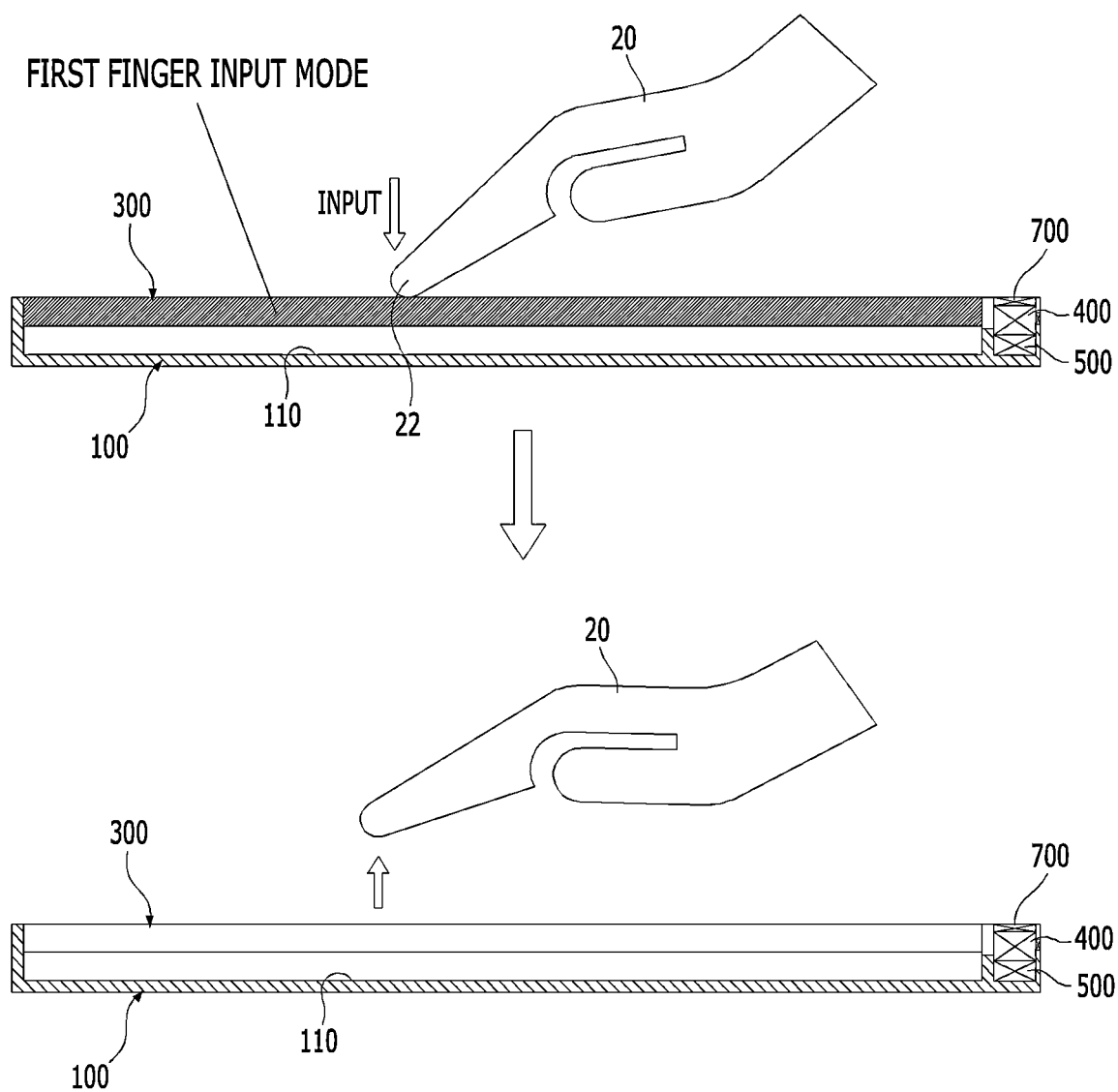

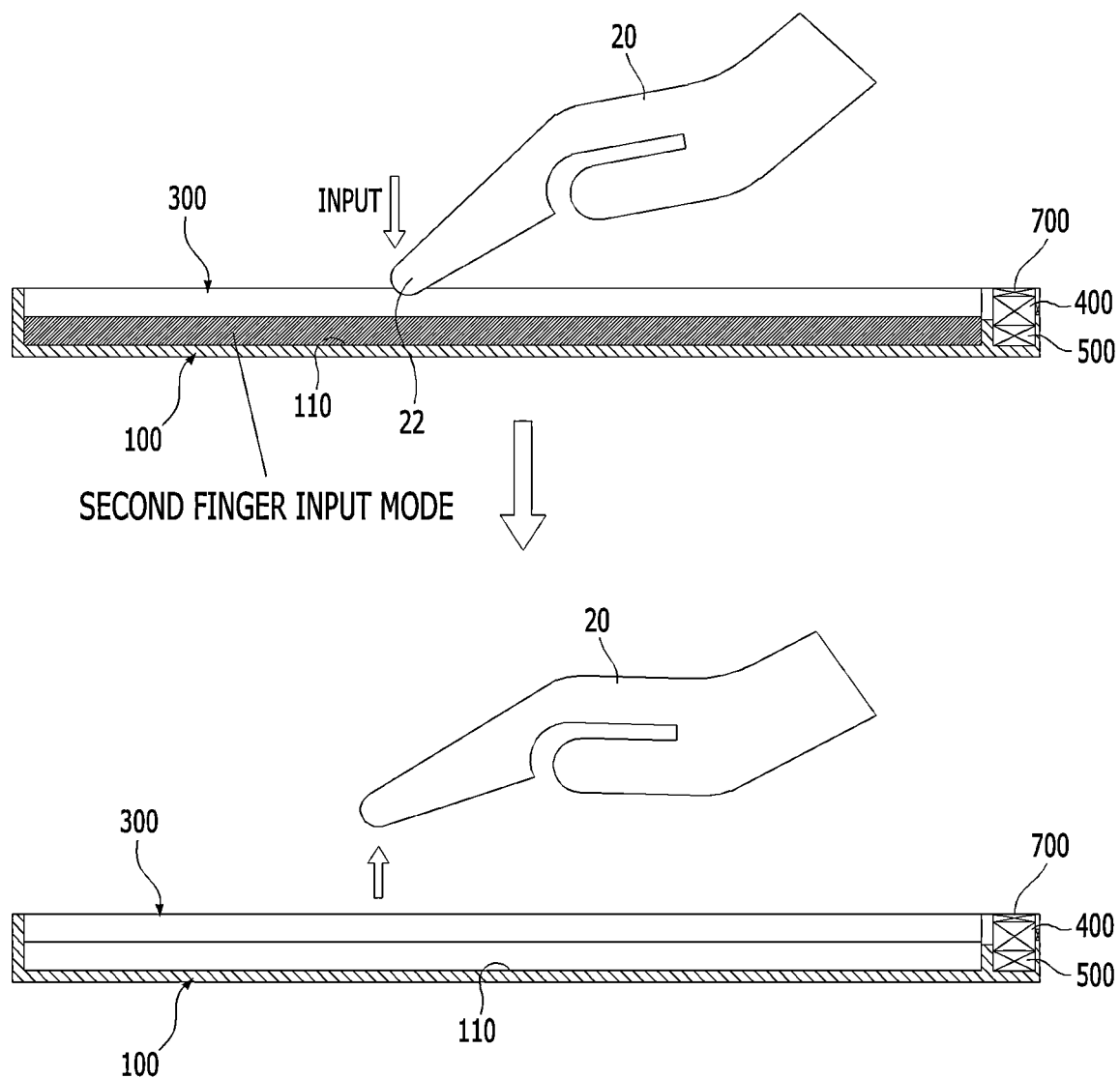
[Fig. 20]

[Fig. 21]
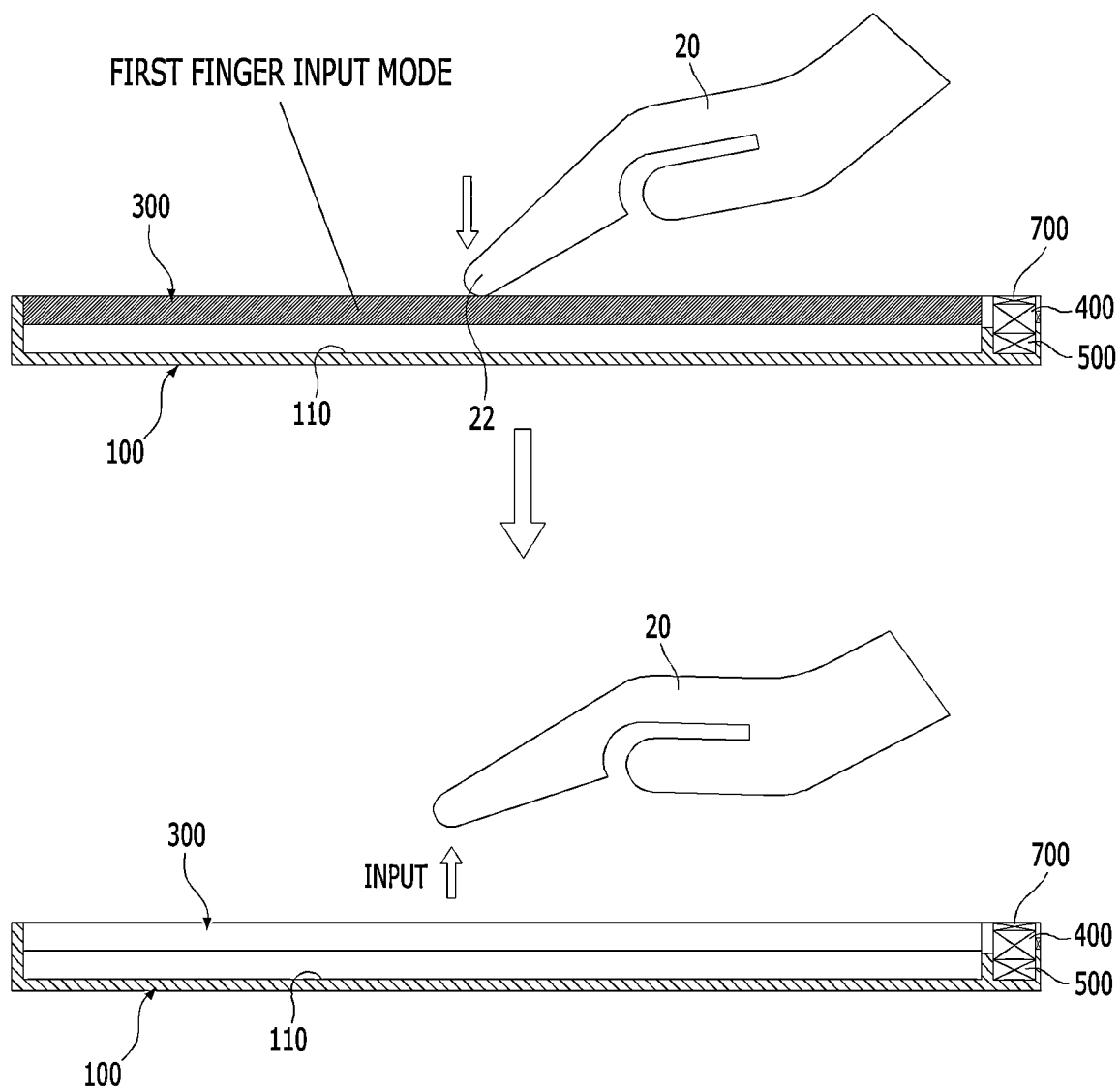

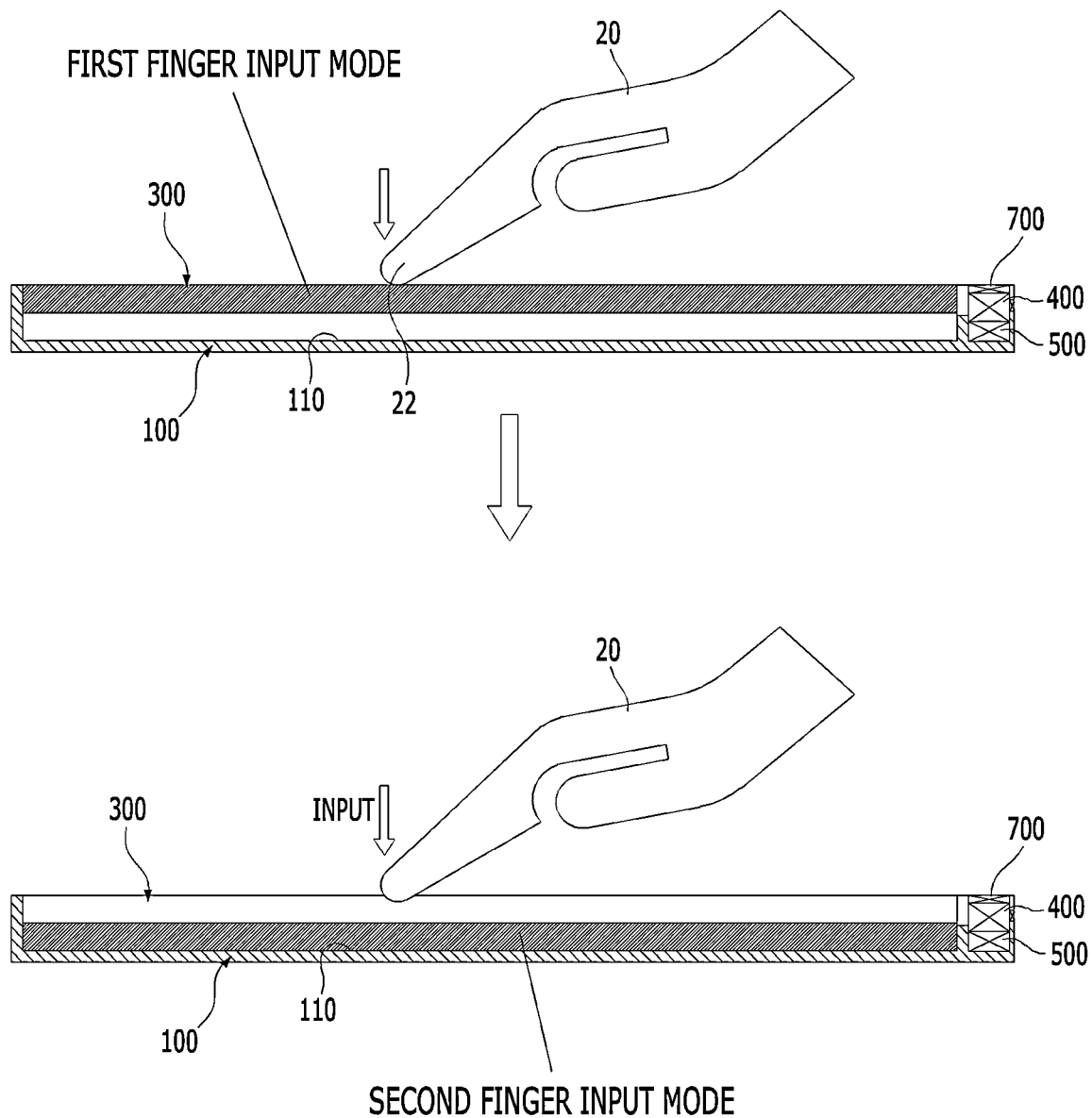
[Fig. 22]

[Fig. 23]
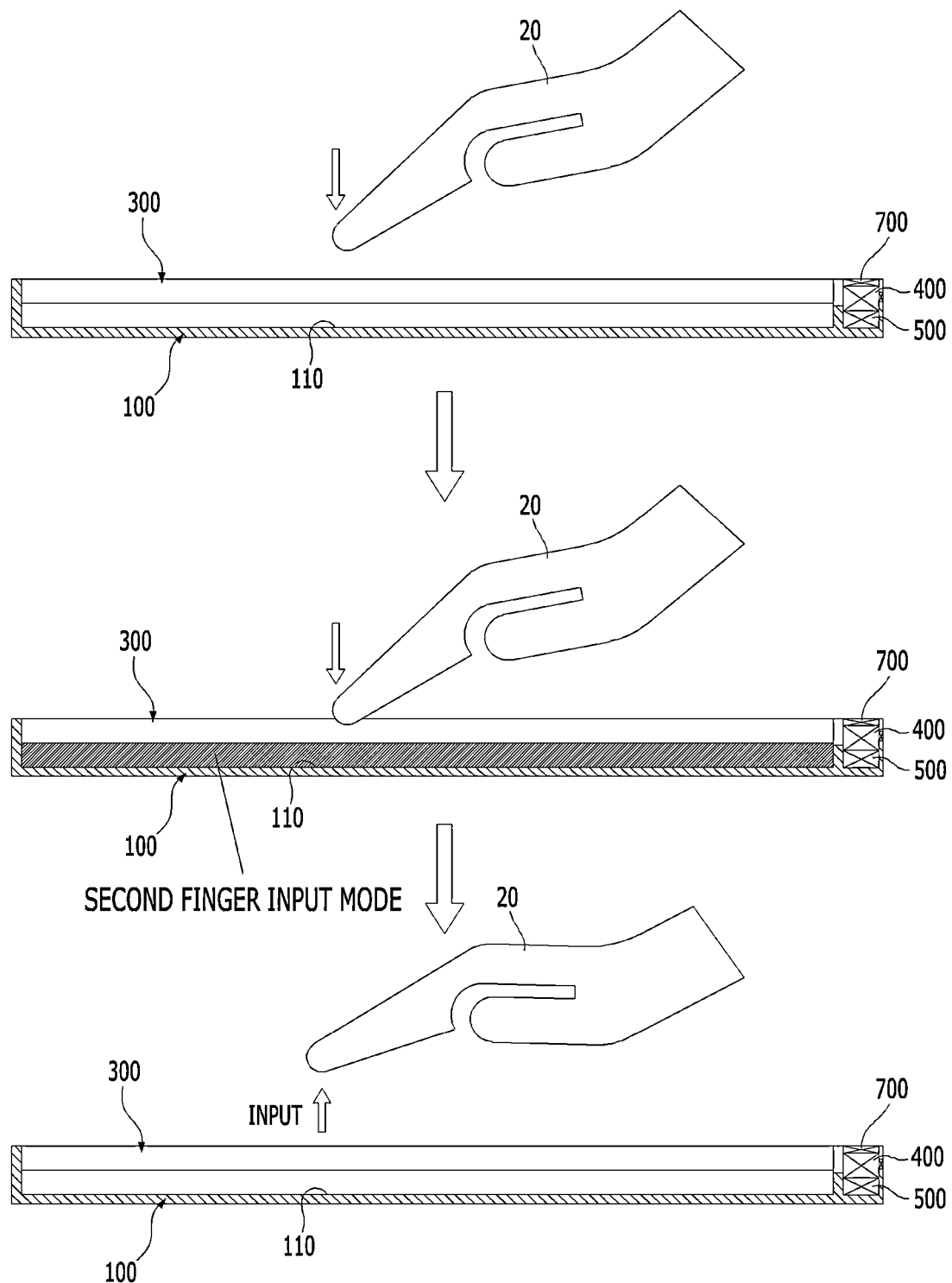

[Fig. 24]
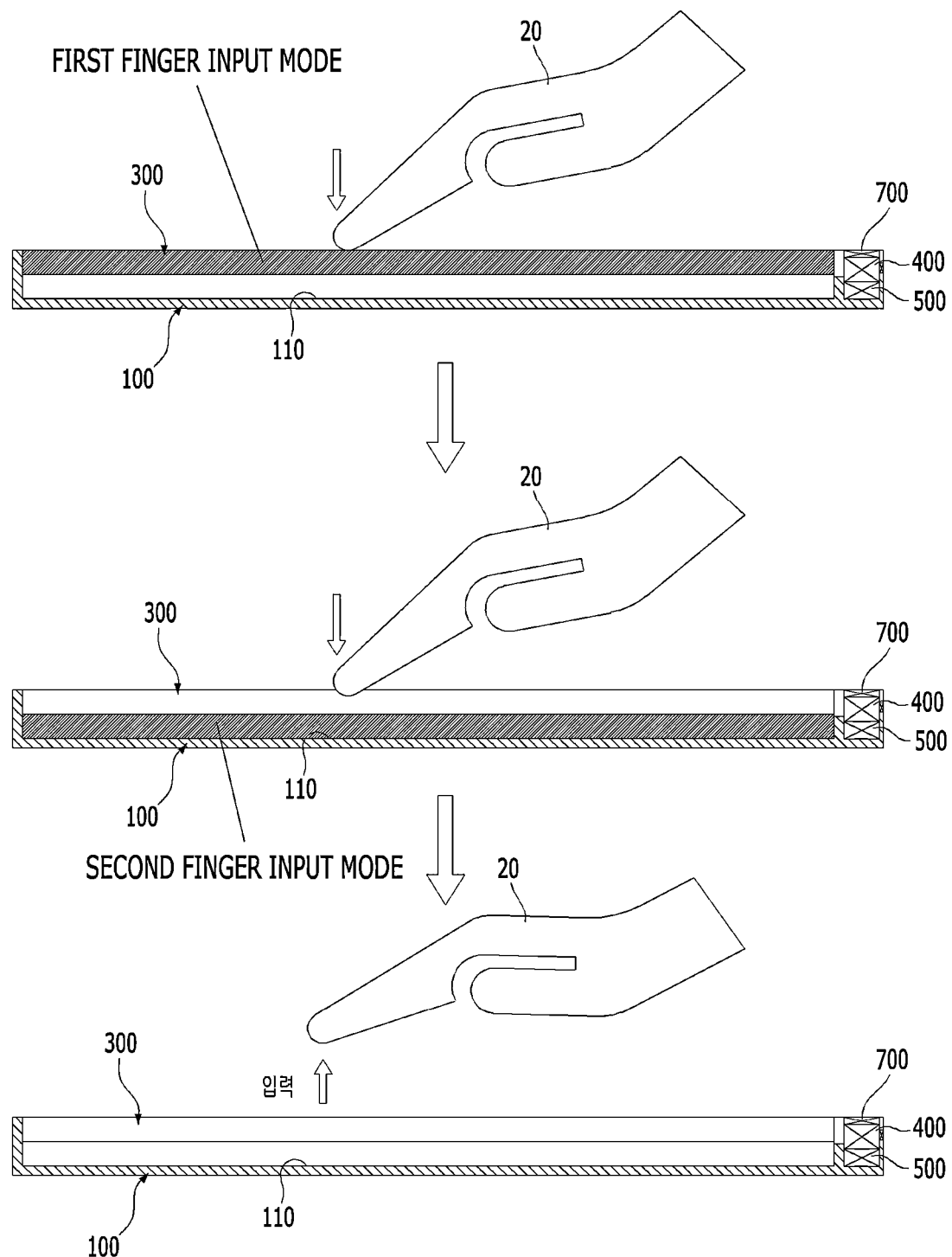

[Fig. 25]
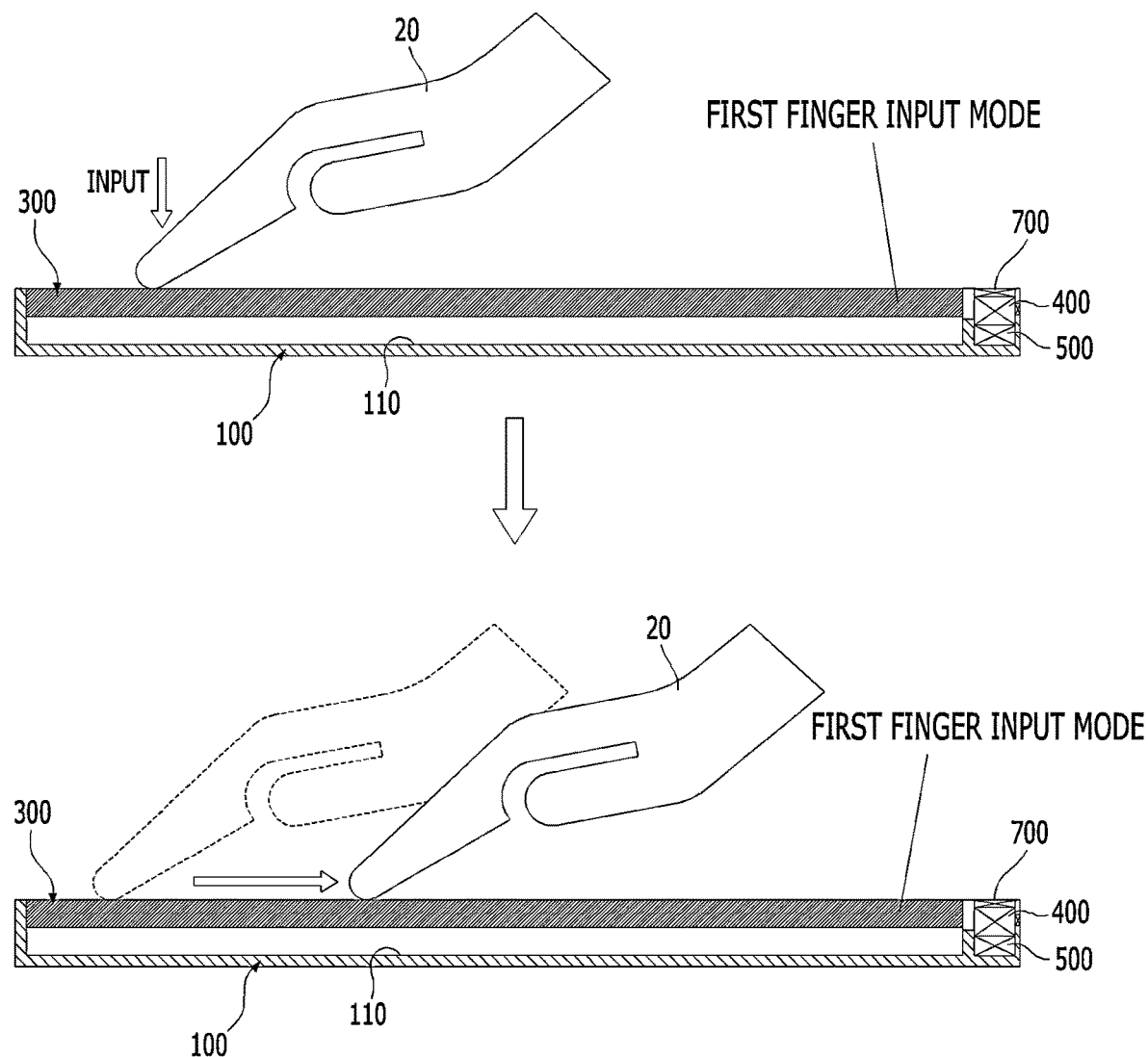

[Fig. 26]
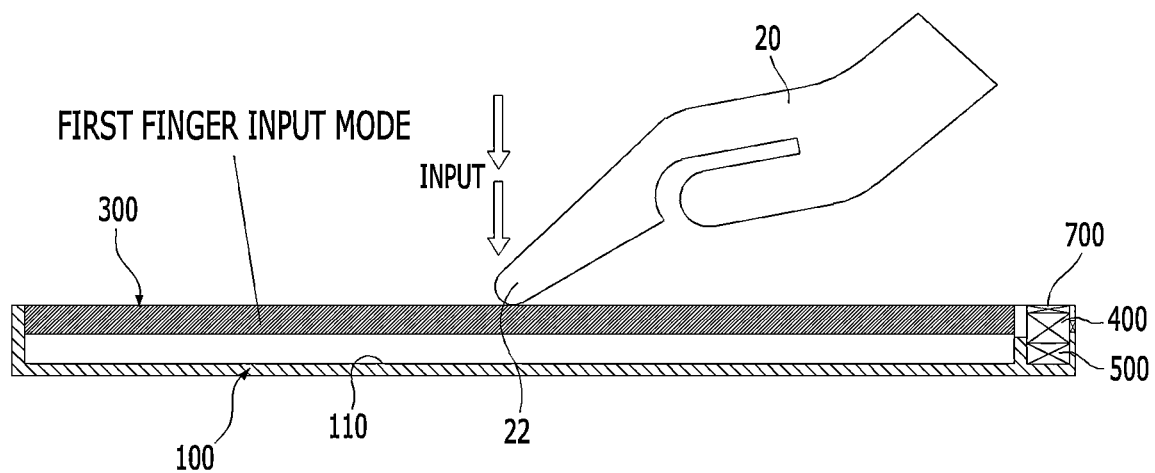

[Fig. 27]
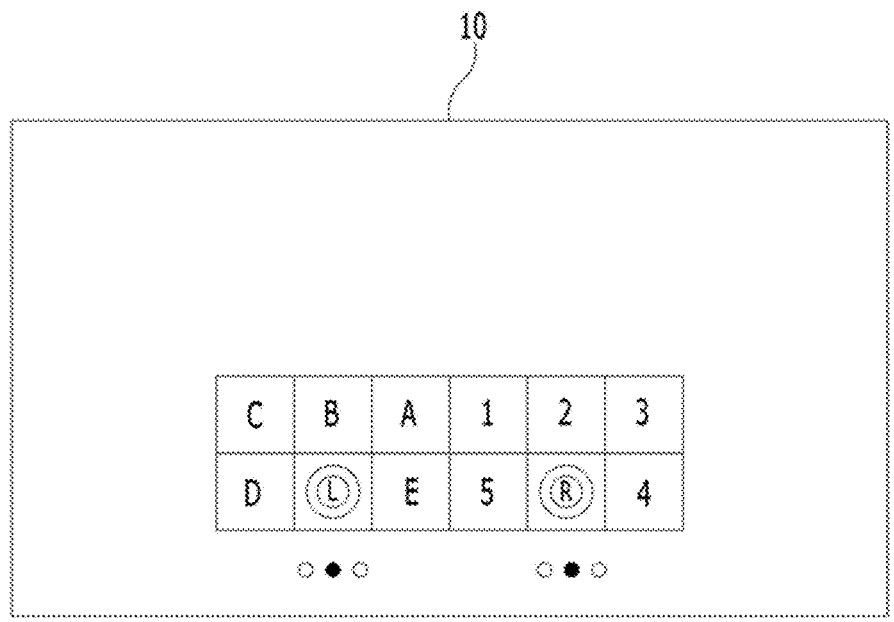
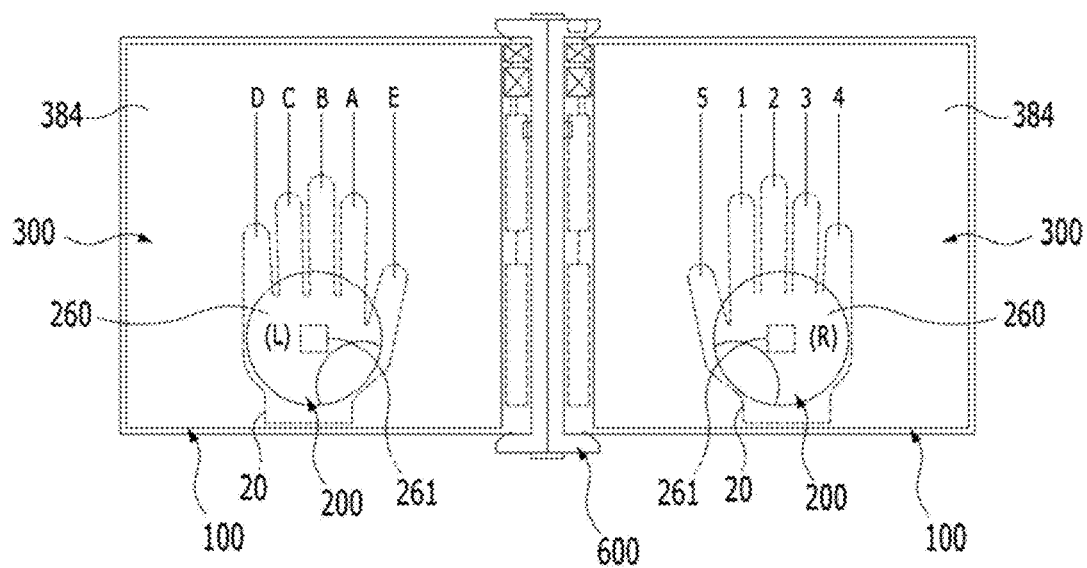

[Fig. 28]
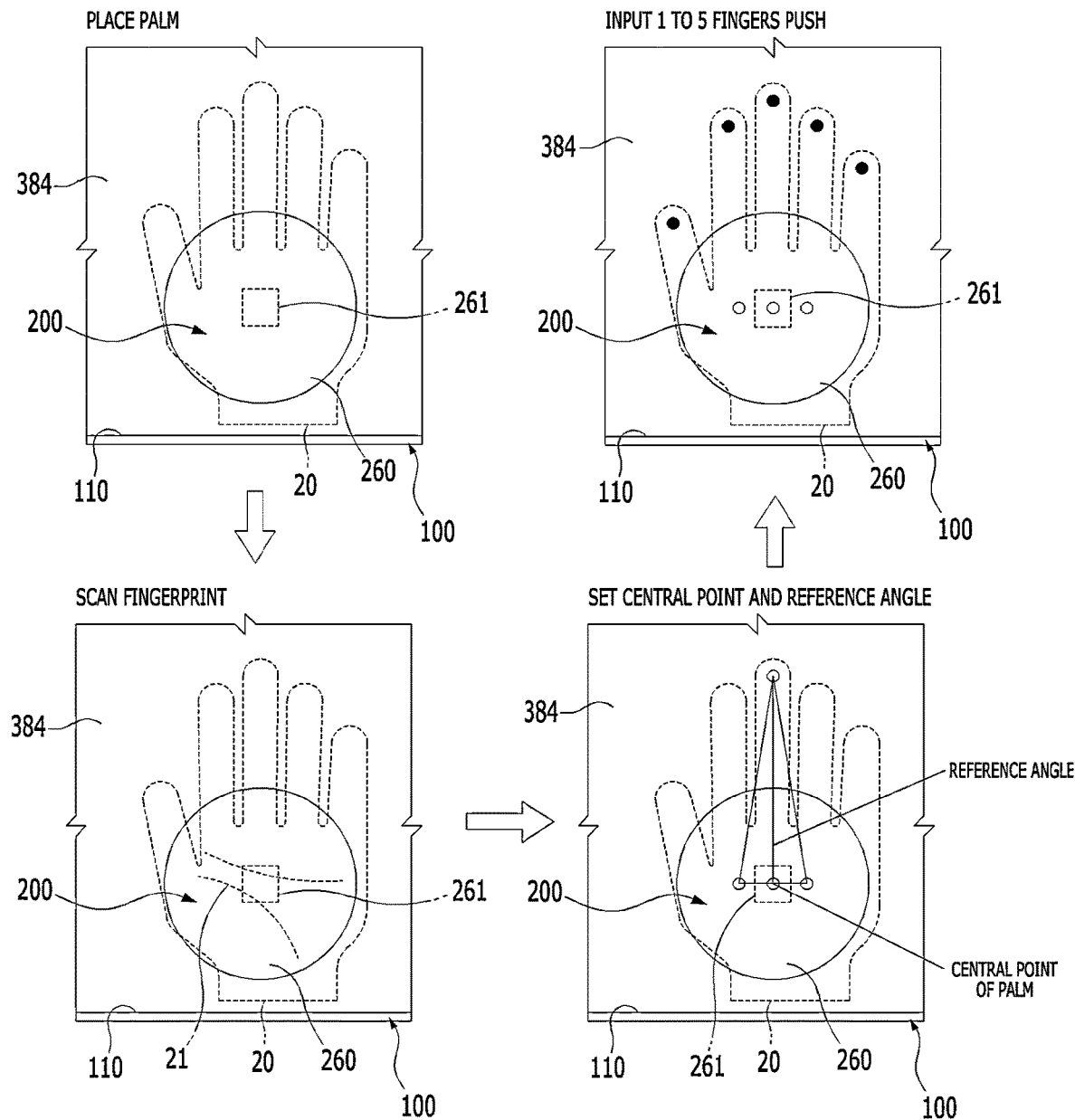

[Fig. 29]
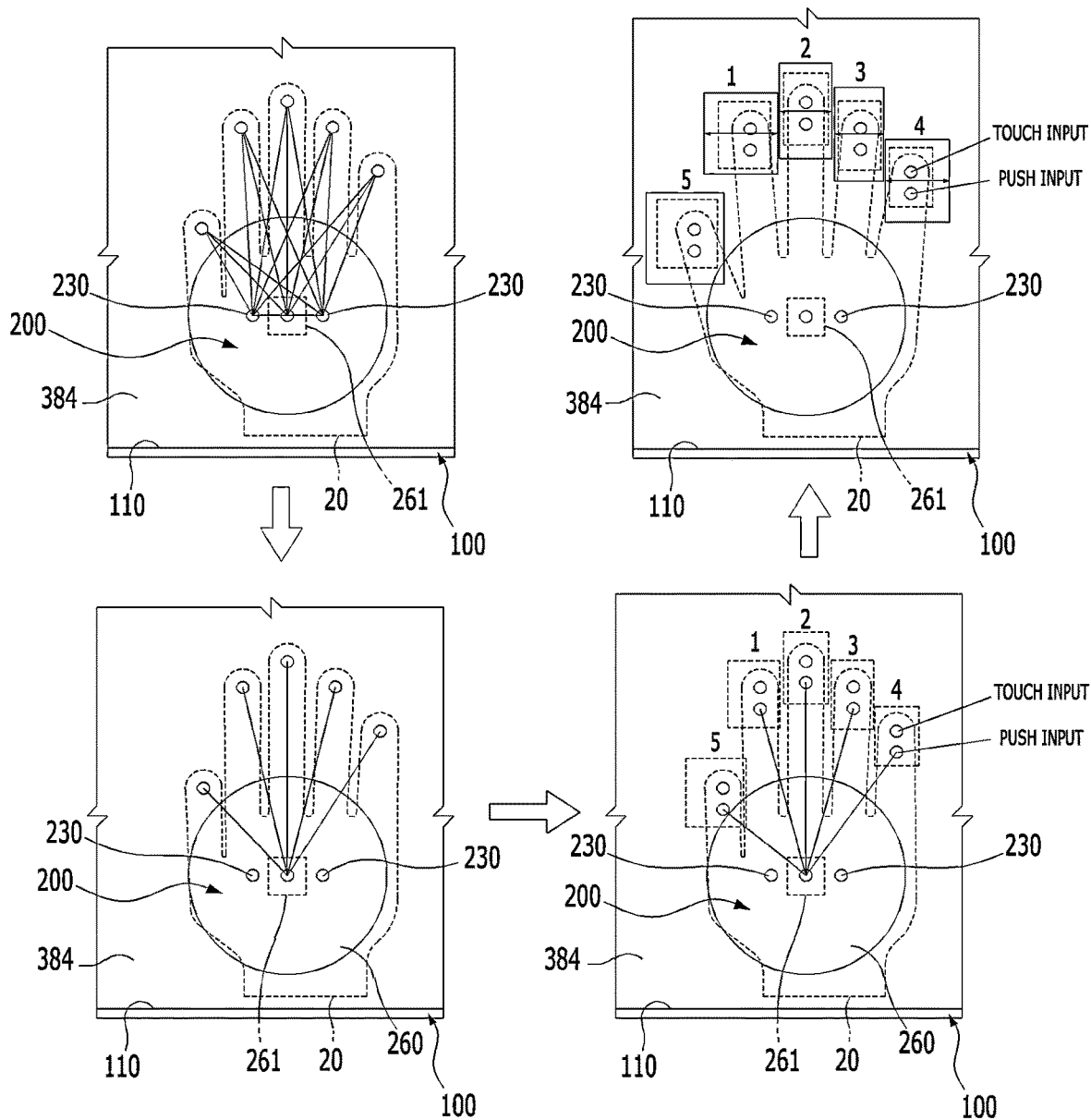

[Fig. 30]
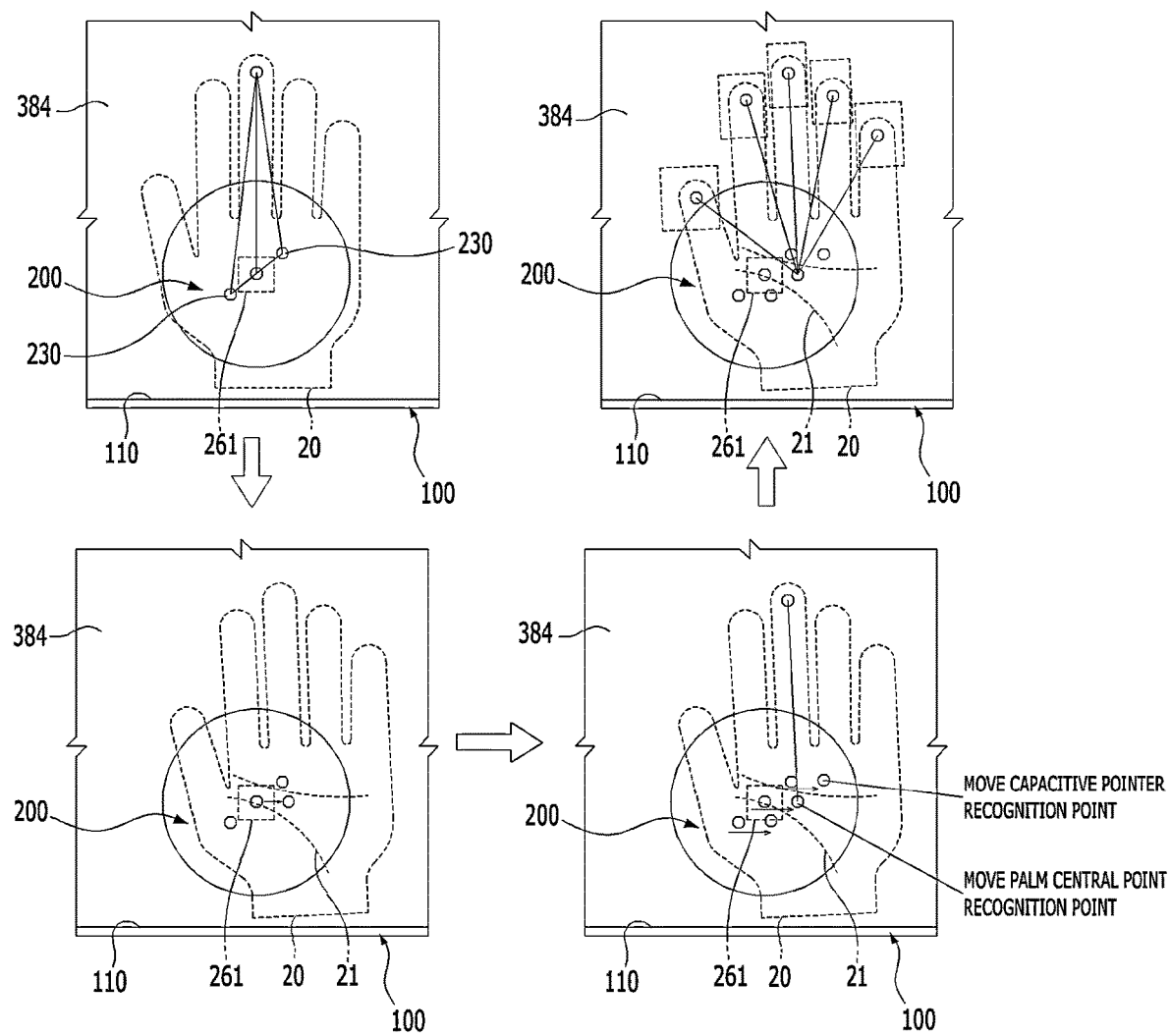

[Fig. 31]
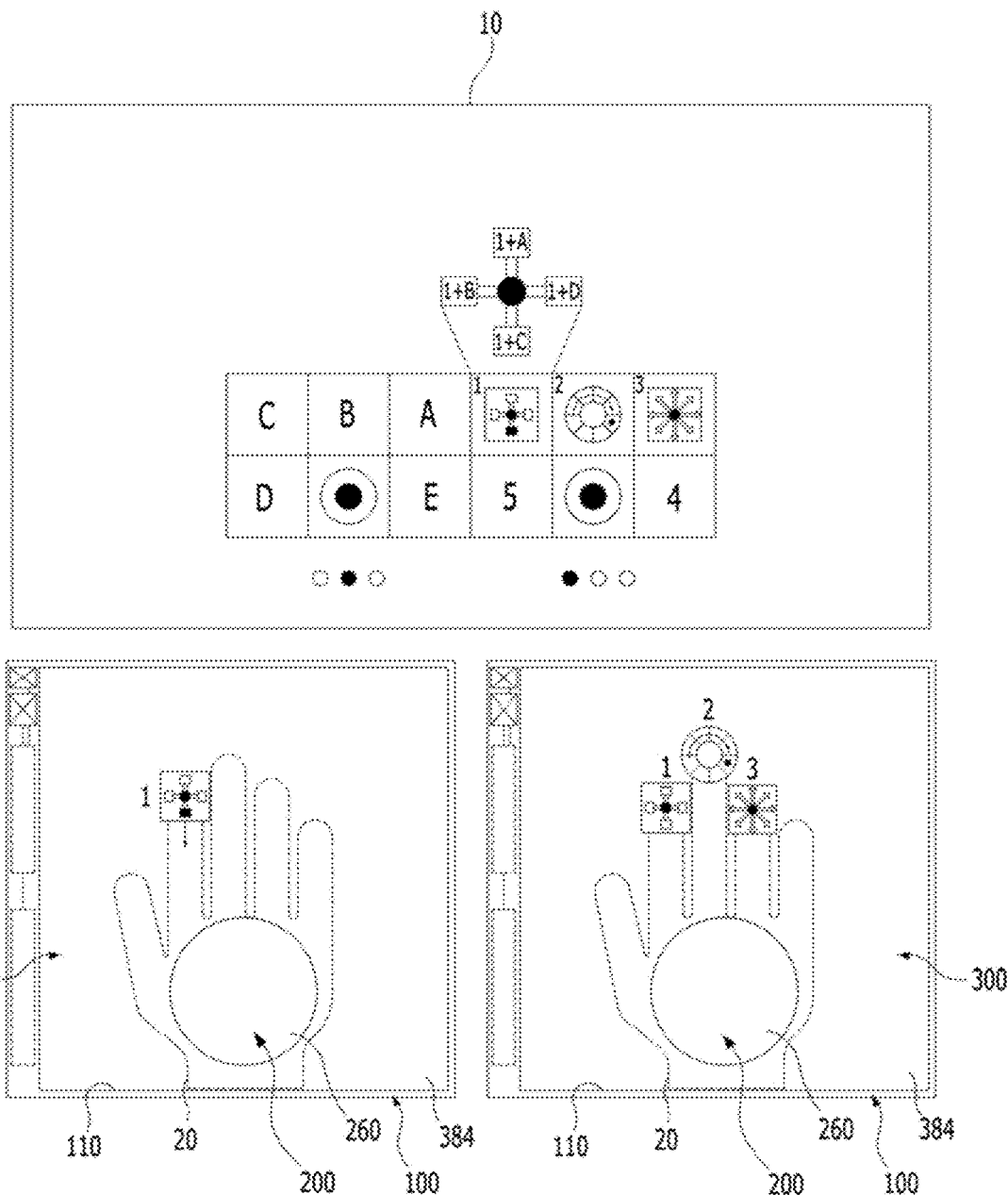

[Fig. 32]
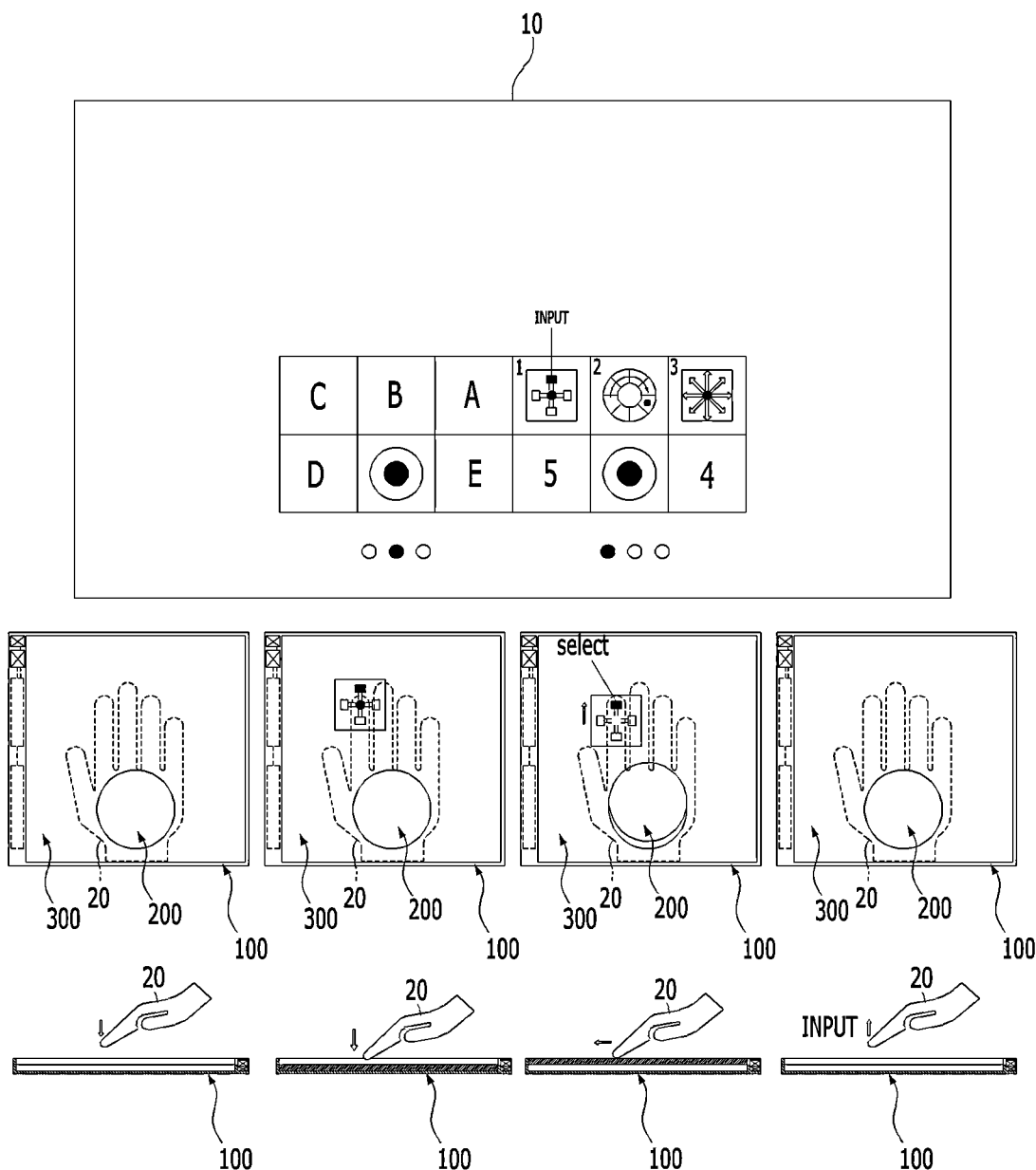

[Fig. 33]
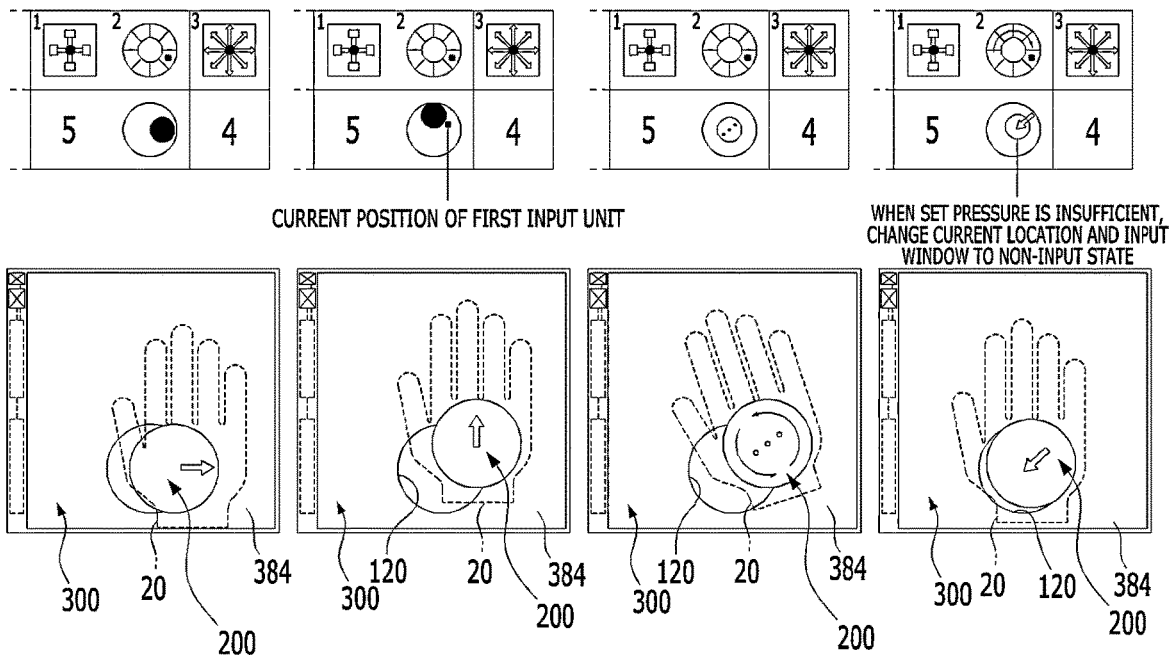

[Fig. 34]
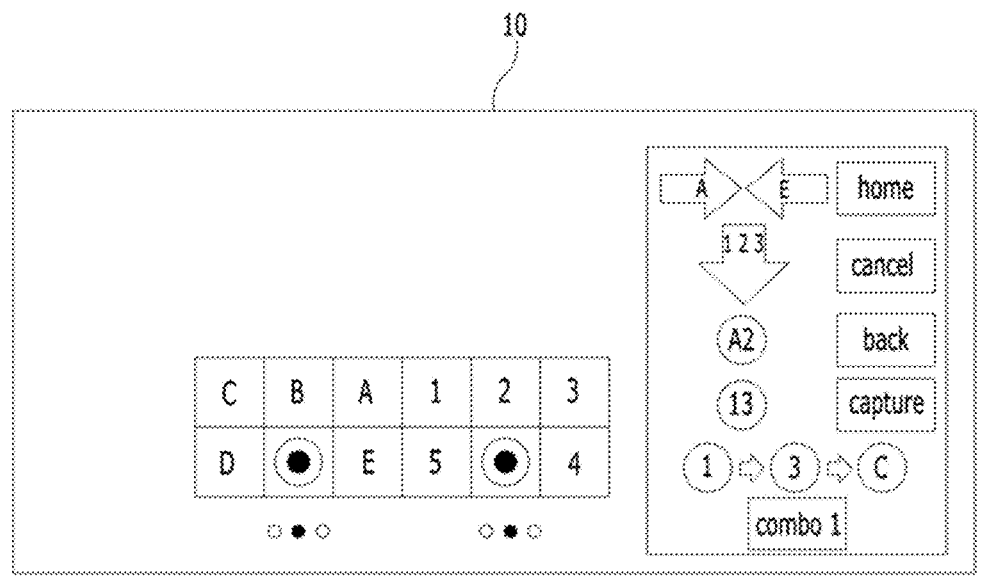

[Fig. 35]
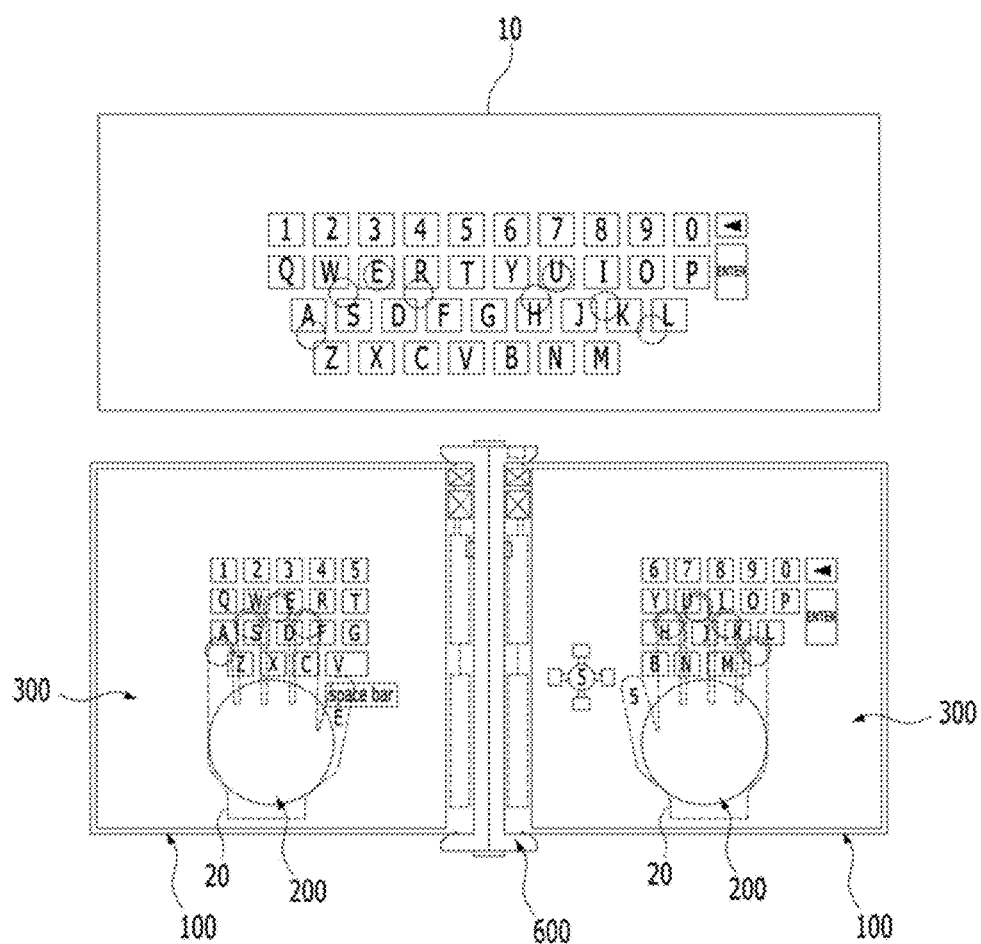

[Fig. 36]
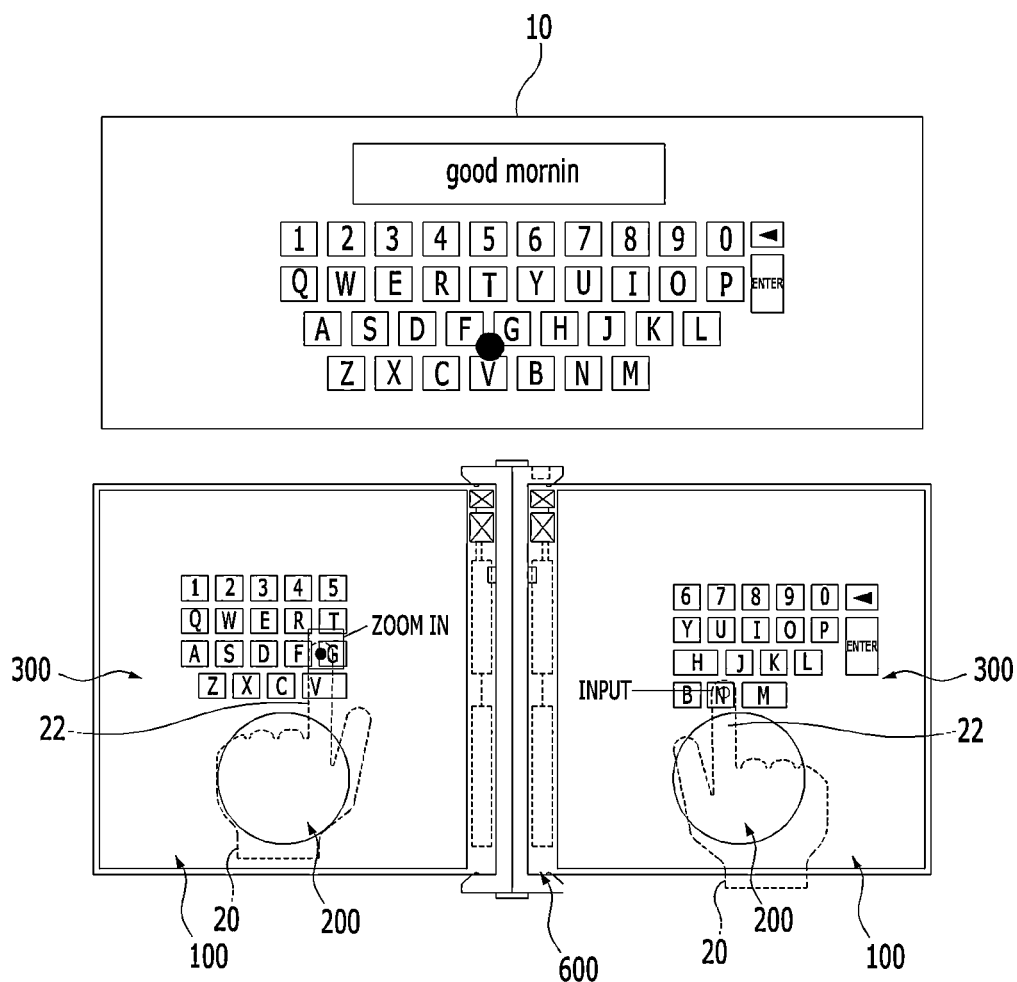

[Fig. 37]
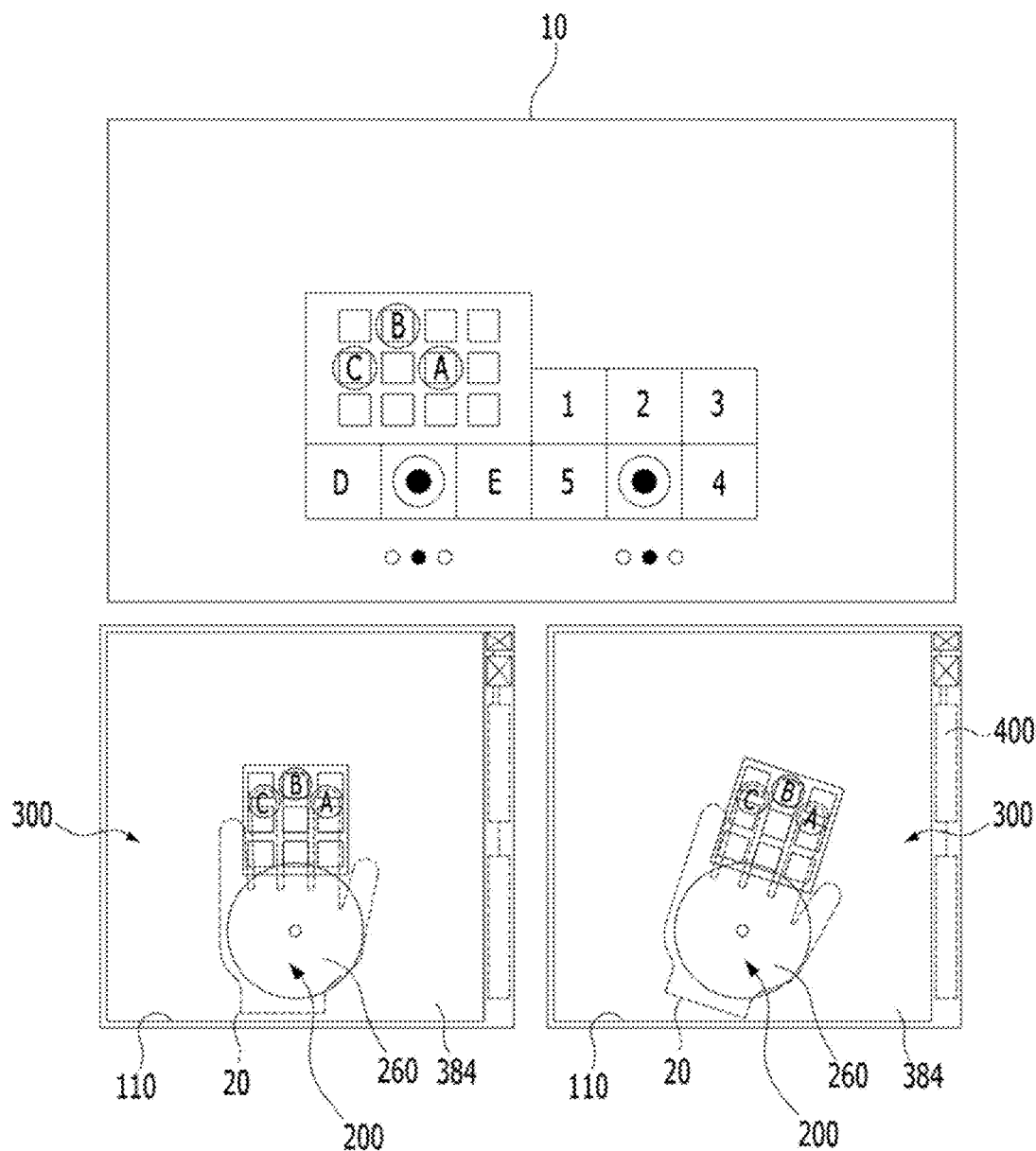

[Fig. 38]

| | | | |
|---|---|---|---|
| ① | TOUCH | ⇨1 | TOUCH SWIPE |
| ● | PUSH | ⇨1 | PUSH SWIPE |
| ◎ | DOUBLE TOUCH | 5⇨ ⇦4 | MULTIPLE DIRECTIONS TOUCH SWIPE |
| ⦿ | DOUBLE PUSH | 5⇨ ⇦4 | MULTIPLE DIRECTIONS PUSH SWIPE |
| ⑫ | MULTI TOUCH | ⇩123 | ONE DIRECTION TOUCH SWIPE |
| ⑫ | MULTI PUSH | ⇩123 | ONE DIRECTION PUSH SWIPE |
| | | ↻12 | MULTI TOUCH ROTATION |

[Fig. 39]
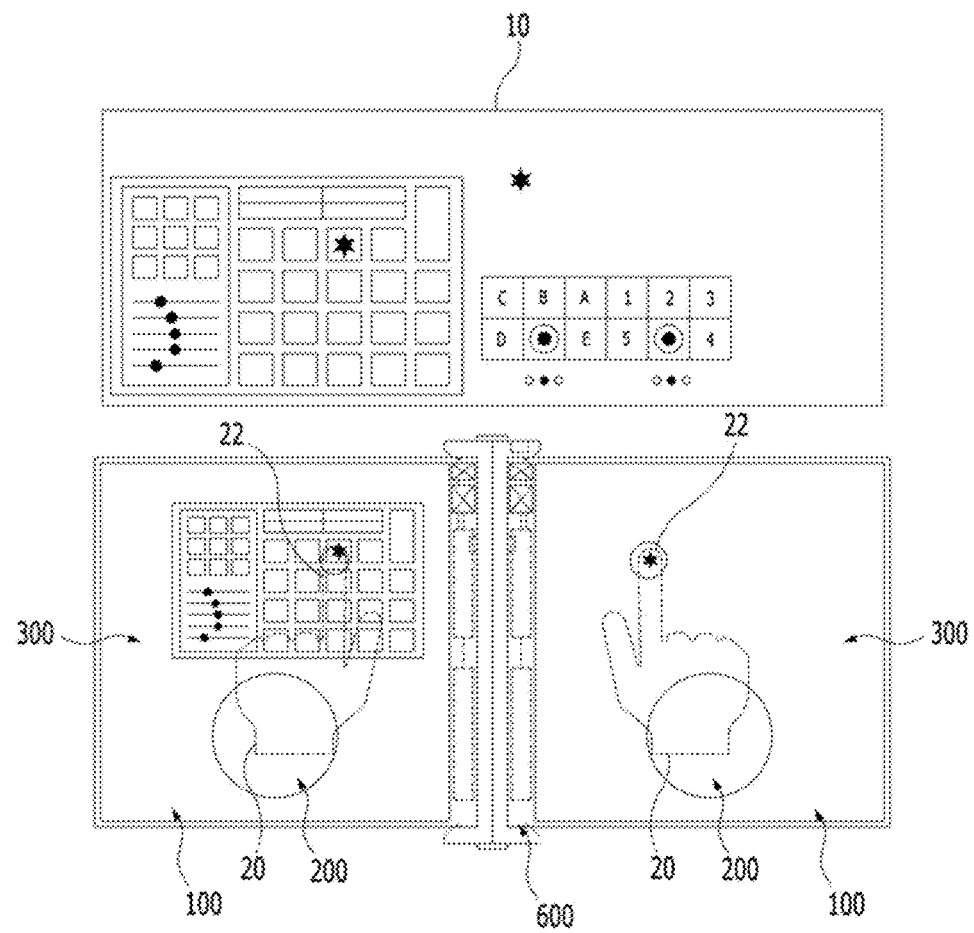

[Fig. 40]
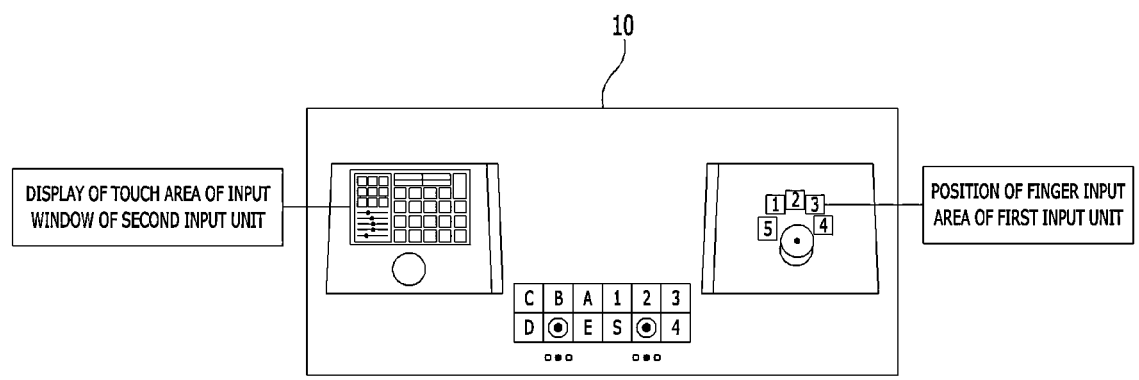

[Fig. 41]
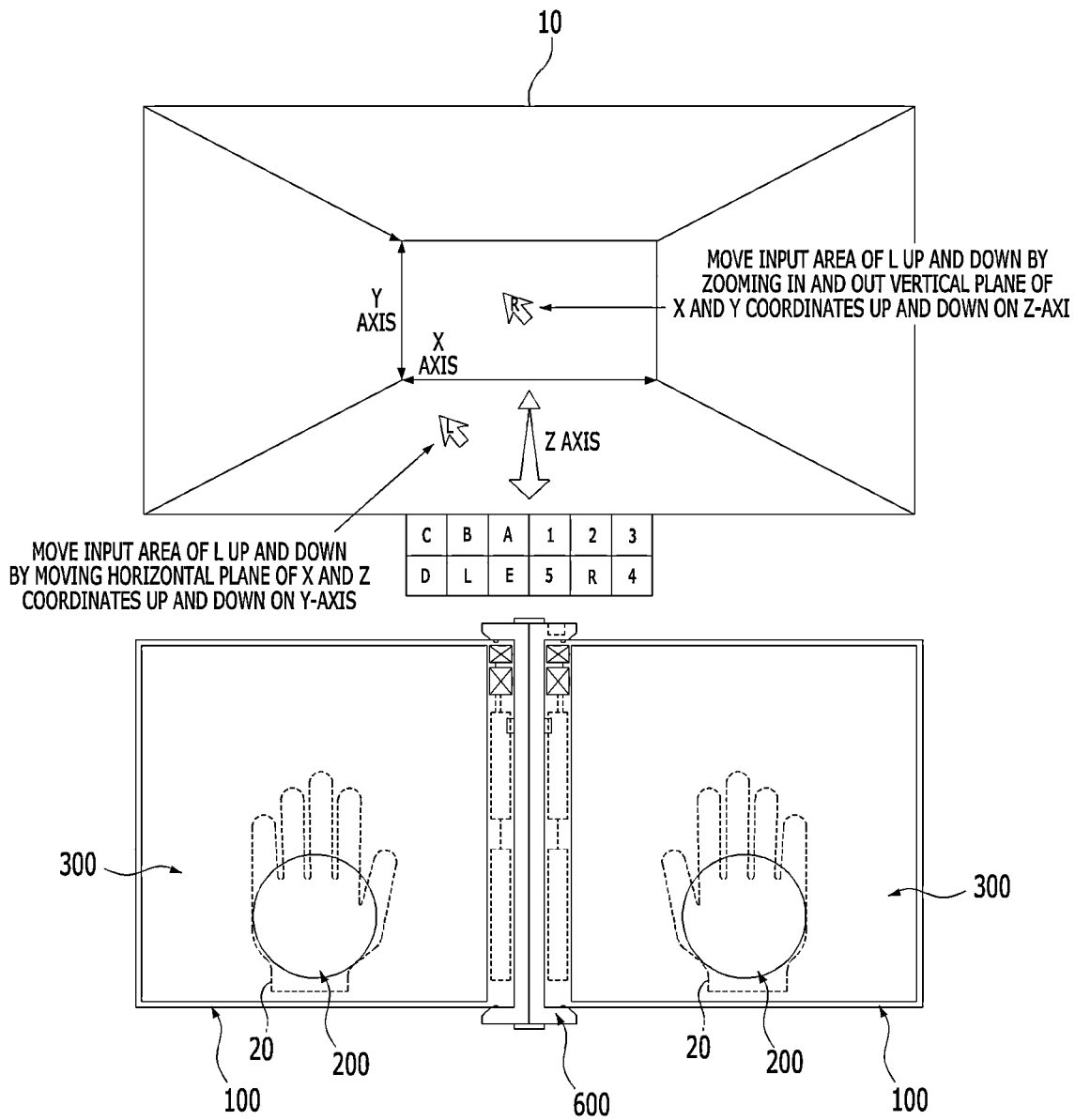

007
INPUT DEVICE AND CONTROL METHOD THEREFOR

CROSS REFERENCE TO RELATED APPLICATIONS

This application is a National Stage of International Application No. PCT/KR2023/001006 filed Jan. 20, 2023, claiming priority based on Korean Patent Application No. 10-2022-0011495 filed Jan. 26, 2022, the entire disclosures of which are incorporated herein by reference.

TECHNICAL FIELD

The present invention relates to an input device and a control method thereof, and more particularly, to an input device capable of improving the diversity and ease of use by using electromagnetic induction and capacitive touch methods to enable various motions, touch and push input, and a control method thereof.

BACKGROUND ART

In general, input devices such as keyboards use a method of inputting signals by pressing a plurality of key buttons so that letters, numbers, symbols, and the like can be input and are classified into an electronic type and a mechanical type according to operation principles.

Recently, a technology of applying a touch panel of a certain area to a portion of the input device has been proposed. Conventional touch panels use an operating method of inputting signals by using a hand or a touch means (pens or the like) and may be classified into resistive-film, light sensing, and capacitive touch panels and the like according to implementing methods.

Among them, the capacitive touch panel uses a method of converting a contact position into an electrical signal by detecting a change in capacitance formed between a conductive sensing pattern and other nearby sensing patterns or ground electrodes when a hand or a touch means is in contact therewith.

However, a conventional touch pad has difficulty in dragging a mouse pointer or operating with both hands since the size thereof is small, there is a difficulty in securing an installation space since the touch pad and key buttons of a keyboard are configured together, and portability is poor due to a large size since the keyboard and the touch pad are configured together.

In addition, the conventional touch pad has only a function of key inputting and pointer positioning, and thus is not suitable for operating electronic devices (a virtual reality (VR) device, an augmented reality (AR) device, and the like) that implement 3D images.

A prior art literature related to the present invention includes Korean Patent Application Publication No. 10-2013-0134981 (published on Dec. 10, 2013), which discloses a keyboard integrated with a touch pad having a mouse and a multi-touch function.

DISCLOSURE

Technical Problem

The present invention is directed to providing an input device capable of improving the diversity and convenience of using electronic devices in 3D virtual spaces and augmented reality through a combination of functions of two hands and ten fingers, multi-input, and changes in interactive field of view and point of view by enabling motion (movement, rotation) input of two palms and touch and push input of ten fingers, allowing input through a virtual input screen even when a field of view of a user is blocked by breaking away from input devices that are checked and input with the user's eyes, being used by flexibly changing input formats according to a program and the user rather than designated buttons and limited input formats, and performing various functions by interlocking with existing electronic devices and programs on the basis of variable input position settings, and a control method thereof.

Technical Solution

One aspect of the present invention provides an input device including a pair of bases each including a first installation groove and a second installation groove formed on an upper surface, and having facing one sides rotatably coupled to each other, a first input unit provided in the first installation groove to form a palm seating area and configured to detect a palm input signal by electromagnetic and capacitive methods when a palm is brought into contact therewith, a second input unit provided in the second installation groove to form a finger seating area and configured to detect a finger input signal by a capacitive method when a finger is brought into contact therewith, a control unit provided on each of the bases, connected to an electronic device by a communication module, and configured to transmit the palm input signal and the finger input signal transmitted respectively from the first input unit and the second input unit to the electronic device, and a power supply unit provided in each of the bases to be rechargeable or replaceable and configured to supply power to the control unit, wherein the first input unit is switched to a state in which the palm input signal is input when the palm is seated with a set pressure or more, and detects a position and a rotation of the palm and a palm print through the palm input signal, and when fingerprint information is preset and the detected palm print matches the fingerprint information, the control unit forms a central point of the palm print on the basis of the fingerprint information and a point at which the palm print of a user detected by the first input unit is recognized, and variably sets a finger input area in proportion to an angular direction in which the palm is rotated based on the central point of the palm print.

In addition, the second input unit may detect the finger input signal in a first finger input mode when touched by the finger with the set pressure or less, detect the finger input signal in a second finger input mode when being in contact with the finger with the set pressure or more, and detect a position of the finger through the finger input signal.

In addition, the first input unit may include a digitizer provided on a bottom surface of the first installation groove, a first conductive member stacked and connected to an upper surface of the digitizer, a first touch sensor stacked and connected to an upper surface of the first conductive member, a second conductive member stacked and connected to an upper portion of the first touch sensor, a first operation unit seated on an upper surface of the second conductive member to be pressable, horizontally movable, and horizontally rotatable, a palm detection unit provided on an upper surface of the first operation unit to form the palm seating area, and configured to detect the palm print when the palm is in contact therewith, and an auxiliary power supply unit provided inside the first operation unit to be rechargeable or replaceable and configured to supply power to the palm detection unit.

In addition, the first operation unit may include a body positioned on an upper portion of the second conductive member to be slidably movable and horizontally rotatable, and having an internal accommodation space open downward, a first lifting rod protruding from a lower portion of the body, an electronic-induction type pointer that is coupled to a lower portion of the body while being spaced apart therefrom, seated on the upper surface of the second conductive member, and connected to a lower end of the first lifting rod when the body descends to a lower connection position, a coil coupled to an outside of the first lifting rod, a pair of capacitive pointers correspondingly disposed on both sides of the electronic-induction type pointer with respect to the first lifting rod and having lower ends seated on the upper surface of the second conductive member, and a first elastic member coupled between the body and the electronic-induction type pointer and configured to elastically support a lower end of the body upward.

In addition, the second input unit may include a third conductive member provided on a bottom surface of the second installation groove, a second touch sensor stacked and connected to an upper surface of the third conductive member, a fourth conductive member stacked and connected to an upper surface of the second touch sensor, an insulating plastic stacked on an upper surface of the fourth conductive member and made of a non-conductive material, a plurality of lifting holes vertically passing through the insulating plastic, a conductive elastic pad positioned within a thickness of the insulating plastic and having a plurality of elastic deformation areas positioned respectively in the lifting holes to be spaced apart from an upper portion of the fourth conductive member, a second operation unit provided to be liftable in the lifting hole and having a lower end that presses the elastic deformation area downward to connect the elastic deformation area to the upper surface of the fourth conductive member when the second operation unit descends to a lower connection position, and a conductive touch unit positioned to be spaced apart from the upper portion of the fourth conductive member and having a lower surface stacked and connected to an upper end of the second operation unit.

In addition, the second operation unit may include a second lifting rod positioned on an upper portion of the elastic deformation area to be liftable, having a side surface from which a locking protrusion protrudes, and configured to press the elastic deformation area downward while descending to the connection position, a locking step protruding from an inner circumferential surface of the lifting hole and through which a lower end of the second lifting rod vertically passes, and a second elastic member provided between the locking step and the locking protrusion and configured to elastically support a lower end of the locking protrusion upward.

In addition, the conductive touch unit may include a first conductive elastic pad positioned to be spaced apart from the upper portion of the fourth conductive member and having a lower surface stacked and connected to an upper end of the second lifting rod, a third touch sensor stacked and connected to an upper surface of the first conductive elastic pad, a second conductive elastic pad stacked and connected to an upper surface of the third touch sensor, and a conductive fiber stacked and connected to an upper surface of the second conductive elastic pad to form the finger seating area.

Another aspect of the present invention provides a method of controlling an input device, the method including a signal input operation of inputting one or more of a palm input signal of a palm through a first input unit and a finger input signal of a finger through a second input unit, a signal transmission operation of generating a control signal by a control unit according to the input palm input signal and finger input signal, and then transmitting the control signal to an electronic device by a communication module, and a function performing operation of displaying a function set in the electronic device through a display window according to the transmitted control signal, wherein the first input unit is switched to a state in which a palm input signal is input when the palm of a user is seated with a set pressure or more, and detects a position and a rotation of the palm through the palm input signal, and the second input unit detects the finger input signal in a first finger input mode when touched by the finger of the user with the set pressure or less, and detects the finger input signal in a second finger input mode when touched by the finger with the set pressure or more.

In addition, the method may include, before the signal input operation, a fingerprint recognition operation of determining whether a palm print input through the first input unit matches fingerprint information preset in the control unit, and a user recognition operation of activating functions of the first input unit and the second input unit when the input palm print matches the fingerprint information.

In addition, in the signal input operation, when the palm input signal is input through the first input unit, a preset finger input area in the control unit may be set in the second input unit, and in the user recognition operation, when the function of the palm input signal is activated, a central point of the palm print may be formed on the basis of the fingerprint information and a point at which the palm print of the user detected by the first input unit may be recognized, and a finger input area may be variably set in proportion to an angular direction in which the palm is rotated based on the central point of the palm print.

Advantageous Effects

The present invention has effects of improving the diversity and convenience of use suitable for a 3D environment since various motion (movement and rotation) inputs and touch and push inputs are possible with the simultaneous operation of both hands, being utilized in various electronic devices since an input method can be changed according to the purpose and a user by a flexible and variable input method, and satisfying various requirements of the user since the user can select a desired input method.

In addition, the present invention has effects of preventing a field of view from being blocked since individual touch inputs of ten fingers can be used instead of a single touch input for finger touch and push input through a display window of an electronic device, and a line-of-sight can be turned in various directions without moving the head in a virtual space by using the palm, easily performing an input operation even by an unskilled user since a virtual input space shown through a display window of an electronic device can be widely used, preventing foreign substances from being introduced into a first installation groove, and preventing a body from being distorted in the process of being moved.

DESCRIPTION OF DRAWINGS

FIG. 1 is an exploded perspective view showing a state in which bases and a connection unit of an input device according to a first embodiment of the present invention are separated.

FIG. 2 is a perspective view illustrating a state in which the bases and the connection unit of the input device according to the first embodiment of the present invention are coupled.

FIG. 3 is a perspective view showing a folded state of the bases of the input device according to the first embodiment of the present invention.

FIG. 4 is a plan view showing a second input unit of the input device according to the first embodiment of the present invention.

FIG. 5 is a side view showing the input device according to the first embodiment of the present invention.

FIG. 6 is a side view showing the folded state of the bases of the input device according to the first embodiment of the present invention.

FIG. 7 is a side cross-sectional view showing a first input unit of the input device according to the first embodiment of the present invention.

FIG. 8 is a side cross-sectional view showing a separate state of the first input unit of the input device according to the first embodiment of the present invention.

FIG. 9 is a side cross-sectional view showing a separate state of the second input unit of the input device according to the first embodiment of the present invention.

FIG. 10 is a side view showing a state in which a first operation unit of the input device according to the first embodiment of the present invention is moved to one side.

FIG. 11 is a side cross-sectional view showing a state in which a finger input signal is input when the second input unit of the input device according to the first embodiment of the present invention is touched or pushed with a finger.

FIG. 12 is a side cross-sectional view showing a state in which the finger input signal is input when the second input unit of the input device according to the first embodiment of the present invention is touched or pushed with the finger and then the finger is separated.

FIG. 13 is a side cross-sectional view showing a state in which the finger input signal is additionally input when the second input unit of the input device according to the first embodiment of the present invention is touched with the finger and then the finger slidably moves.

FIG. 14 is a plan view showing a state in which the finger input signal is additionally input when the second input unit of the input device according to the first embodiment of the present invention is touched with the finger and then the finger slidably moves.

FIG. 15 is a side cross-sectional view showing a state in which the finger input signal is input when the second input unit of the input device according to the first embodiment of the present invention is double-touched or double-pushed with the finger.

FIG. 16 is a block diagram showing a connection relationship between each component in the input device according to the first embodiment of the present invention.

FIG. 17 is a block diagram sequentially showing a control method of an input device according to a second embodiment of the present invention.

FIG. 18 is a block diagram showing a state in which a fingerprint recognition operation and a user recognition operation are applied in the control method of the input device according to the second embodiment of the present invention.

FIG. 19 is a side cross-sectional view showing a state in which a finger input signal is immediately input when a user touches a second input unit in a first finger input mode in the control method of the input device according to the second embodiment of the present invention.

FIG. 20 is a side cross-sectional view showing a state in which the finger input signal is immediately input when the user pushes the second input unit in a second finger input mode in the control method of the input device according to the second embodiment of the present invention.

FIG. 21 is a side cross-sectional view showing a state in which the finger input signal is input when the user touches the second input unit in the first finger input mode with the finger and then separates the finger in the control method of the input device according to the second embodiment of the present invention.

FIG. 22 is a side cross-sectional view showing a state in which the finger input signal is immediately input when the user pushes the second input unit in the second finger input mode while touching the second input unit in the first finger input mode, in the control method of the input device according to the second embodiment of the present invention.

FIG. 23 is a side cross-sectional view showing a state in which the finger input signal is input when the user pushes the second input unit in the second finger input mode and then separates the finger in a state in which the user's finger is not in contact in the control method of the input device according to the second embodiment of the present invention.

FIG. 24 is a side cross-sectional view showing a push input state during touch in which the finger input signal is input when the user pushes the second input unit in the second finger input mode and then separates the finger while touching the second input unit in the first finger input mode in the control method of the input device according to the second embodiment of the present invention.

FIG. 25 is a side cross-sectional view showing a state in which the finger input signal is input when the user touches the second input unit in the first finger input mode with the finger and then slidably moves the finger in the control method of the input device according to the second embodiment of the present invention.

FIG. 26 is a side cross-sectional view showing a state in which the finger input signal is input when the user double-touches the second input unit in the first finger input mode in the control method of the input device according to the second embodiment of the present invention.

FIG. 27 is a view showing a state in which a palm is seated on each first input unit, an interface of a display window, and individual names of two hands and the fingers in the control method of the input device according to the second embodiment of the present invention.

FIG. 28 is a view showing processes of recognizing a palm print by the first input unit, setting a central point of the palm print, setting a central angle by connecting the center of the palm print and the middle finger, and setting a finger input area, in the control method of the input device according to the second embodiment of the present invention.

FIG. 29 is a view showing processes of setting the finger input area by sharing coordinates of the first input unit and the second input unit, and setting the expansion and reduction of the finger input area by detecting the touch of the fingers, in the control method of the input device according to the second embodiment of the present invention.

FIG. 30 is a view showing processes of deriving a connection value between the central point and an input point of the finger when a capacitive pointer is rotated, and changing a recognition point of the capacitive pointer and a center of rotation of the first input unit in proportion to the palm print recognized by a palm detection unit when the palm is seated on the palm detection unit, and distance and angle values of the central point of the palm print, in the control method of the input device according to the second embodiment of the present invention.

FIG. 31 is a view exemplarily showing the reduction of key input and diversification of input, such as, multi-input, through touch and slide using touch input, push input, and swiping, and an additional input method according to a set slide moving direction, in the control method of the input device according to the second embodiment of the present invention.

FIG. 32 is a view exemplarily showing a state of inputting the finger input signal through touch input, push input, and swipe, and a detection area of the second input unit used during input, in the control method of the input device according to the second embodiment of the present invention.

FIG. 33 is a view showing a joystick mode, and a process of using rotation detection and pressure detection by the first input unit, in the control method of the input device according to the second embodiment of the present invention.

FIG. 34 is a view showing an example window activation state of multi-touch, multi-push input, and continuous touch options, in the control method of the input device according to the second embodiment of the present invention.

FIG. 35 is a view showing a virtual keyboard function and a state in which positions of the fingers are confirmed with the first finger input mode through a virtual keyboard, in the control method of the input device according to the second embodiment of the present invention.

FIG. 36 is a view showing a keyboard function in the control method of the input device according to the second embodiment of the present invention.

FIG. 37 is a view showing a process of flexibly moving a range-type movement input window linked to the first input unit and the second input unit when the palm rotates and moves, and an interface state, in the control method of the input device according to the second embodiment of the present invention.

FIG. 38 is an image showing various input modes such as touch and push, multi-touch, multi-push, and input setting according to a multi-input moving direction, in the control method of the input device according to the second embodiment of the present invention.

FIG. 39 is a view showing a state in which an input option is selected as the first finger input mode and the second finger input mode by activation of a touch input option formed in the second input unit and mouse mode division, when palm input is not detected by the first input unit, a function is performed by push input during touch, and the performed function is positionally moved by mouse input with the right hand, and the utilization of the second input unit, in the control method of the input device according to the second embodiment of the present invention.

FIG. 40 is a view showing a process of recognizing a position of the base with an inclined angle in virtual reality by installing a gyro sensor and a state in which the finger input area is confirmed in the control method of the input device according to the second embodiment of the present invention.

FIG. 41 is a view for describing simultaneous control of 3D space in a virtual space by controlling vertical and horizontal planes with both hands through mouse mode input by using the first input unit with both palms by type 1 and type 2 methods and using the second input unit with both fingers, in the control method of the input device according to the second embodiment of the present invention.

MODES OF THE INVENTION

Hereinafter, exemplary embodiments of the present invention will be described in detail with reference to the accompanying drawings.

Advantages and features of the present invention and implementation methods thereof will be clarified through the following embodiments described with reference to the accompanying drawings.

However, the present invention is not limited to the following embodiments but may be implemented in various different forms. The embodiments are provided only to complete the present invention and to fully provide a person having ordinary skill in the art to which the present invention pertains with the category of the present invention, and the present invention will be defined by the appended claims.

In addition, details of generally-known technology that make the subject matter of the present invention unclear will be omitted in the following description.

FIG. 1 is an exploded perspective view showing a state in which bases and a connection unit of an input device according to a first embodiment of the present invention are separated. FIG. 2 is a perspective view illustrating a state in which the bases and the connection unit of the input device according to the first embodiment of the present invention are coupled. FIG. 3 is a perspective view showing a folded state of the bases of the input device according to the first embodiment of the present invention. FIG. 4 is a plan view showing a second input unit of the input device according to the first embodiment of the present invention. FIG. 5 is a side view showing the input device according to the first embodiment of the present invention. FIG. 6 is a side view showing the folded state of the bases of the input device according to the first embodiment of the present invention. FIG. 7 is a side cross-sectional view showing a first input unit of the input device according to the first embodiment of the present invention. FIG. 8 is a side cross-sectional view showing a separate state of the first input unit of the input device according to the first embodiment of the present invention. FIG. 9 is a side cross-sectional view showing a separate state of the second input unit of the input device according to the first embodiment of the present invention. FIG. 10 is a side view showing a state in which a first operation unit of the input device according to the first embodiment of the present invention is moved to one side. FIG. 11 is a side cross-sectional view showing a state in which a finger input signal is input when the second input unit of the input device according to the first embodiment of the present invention is touched or pushed with a finger. FIG. 12 is a side cross-sectional view showing a state in which the finger input signal is input when the second input unit of the input device according to the first embodiment of the present invention is touched or pushed with the finger and then the finger is separated. FIG. 13 is a side cross-sectional view showing a state in which the finger input signal is additionally input when the second input unit of the input device according to the first embodiment of the present invention is touched with the finger and then the finger slidably moves. FIG. 14 is a plan view showing a state in which the finger input signal is additionally input when the second input unit of the input device according to the first embodiment of the present invention is touched with the finger and then the finger slidably moves. FIG. 15 is a side cross-sectional view showing a state in which the finger input signal is input when the second input unit of the input device according to the first embodiment of the present invention is double-touched or double-pushed with the finger. FIG. 16 is a block diagram showing a connection relationship between each component in the input device according to the first embodiment of the present invention.

In addition, FIG. 17 is a block diagram for sequentially showing a control method of an input device according to a second embodiment of the present invention. FIG. 18 is a block diagram showing a state in which a fingerprint recognition operation and a user recognition operation are applied in the control method of the input device according to the second embodiment of the present invention. FIG. 19 is a side cross-sectional view showing a state in which a finger input signal is immediately input when a user touches a second input unit in a first finger input mode in the control method of the input device according to the second embodiment of the present invention. FIG. 20 is a side cross-sectional view showing a state in which the finger input signal is immediately input when the user pushes the second input unit in a second finger input mode in the control method of the input device according to the second embodiment of the present invention. FIG. 21 is a side cross-sectional view showing a state in which the finger input signal is input when the user touches the second input unit in the first finger input mode with the finger and then separates the finger in the control method of the input device according to the second embodiment of the present invention. FIG. 22 is a side cross-sectional view showing a state in which the finger input signal is immediately input when the user pushes the second input unit in the second finger input mode while touching the second input unit in the first finger input mode, in the control method of the input device according to the second embodiment of the present invention. FIG. 23 is a side cross-sectional view showing a state in which the finger input signal is input when the user pushes the second input unit in the second finger input mode and then separates the finger in a state in which the user's finger is not in contact in the control method of the input device according to the second embodiment of the present invention. FIG. 24 is a side cross-sectional view showing a push input state during touch in which the finger input signal is input when the user pushes the second input unit in the second finger input mode and then separates the finger while touching the second input unit in the first finger input mode in the control method of the input device according to the second embodiment of the present invention. FIG. 25 is a side cross-sectional view showing a state in which the finger input signal is input when the user touches the second input unit in the first finger input mode with the finger and then slidably moves the finger in the control method of the input device according to the second embodiment of the present invention. FIG. 26 is a side cross-sectional view showing a state in which the finger input signal is input when the user double-touches the second input unit in a first finger input mode in the control method of the input device according to the second embodiment of the present invention. FIG. 27 is a view showing a state in which a palm is seated on each first input unit, an interface of a display window, and individual names of two hands and the fingers in the control method of the input device according to the second embodiment of the present invention. FIG. 28 is a view showing processes of recognizing a palm print by the first input unit, setting a central point of the palm print, setting a central angle by connecting the center of the palm print and the middle finger, and setting a finger input area, in the control method of the input device according to the second embodiment of the present invention. FIG. 29 is a view showing processes of setting the finger input area by sharing coordinates of the first input unit and the second input unit, and setting the expansion and reduction of the finger input area by detecting the touch of the fingers, in the control method of the input device according to the second embodiment of the present invention. FIG. 30 is a view showing processes of deriving a connection value between the central point and an input point of the finger when a capacitive pointer is rotated, and changing a recognition point of the capacitive pointer and a center of rotation of the first input unit in proportion to the palm print recognized by a palm detection unit when the palm is seated on the palm detection unit, and distance and angle values of the central point of the palm print, in the control method of the input device according to the second embodiment of the present invention.

In addition, FIG. 31 is a view for exemplarily showing the reduction of key input and diversification of input, such as, multi input, through touch and slide using touch input, push input, and swiping, and an additional input method according to a set slide moving direction, in the control method of the input device according to the second embodiment of the present invention. FIG. 32 is a view for exemplarily showing a state of inputting the finger input signal through touch input, push input, and swipe, and a detection area of the second input unit used during input, in the control method of the input device according to the second embodiment of the present invention. FIG. 33 is a view showing a joystick mode, and a process of using rotation detection and pressure detection by the first input unit, in the control method of the input device according to the second embodiment of the present invention. FIG. 34 is a view showing an example window activation state of multi-touch, multi-push input, and continuous touch options, in the control method of the input device according to the second embodiment of the present invention. FIG. 35 is a view showing a virtual keyboard function and a state in which positions of the fingers are confirmed with the first finger input mode through a virtual keyboard, in the control method of the input device according to the second embodiment of the present invention. FIG. 36 is a view showing a keyboard function in the control method of the input device according to the second embodiment of the present invention. FIG. 37 is a view showing a process of flexibly moving a range-type movement input window linked to the first input unit and the second input unit when the palm rotates and moves, and an interface state, in the control method of the input device according to the second embodiment of the present invention. FIG. 38 is an image showing various input modes such as touch and push, multi-touch, multi-push, and input setting according to a multi-input moving direction, in the control method of the input device according to the second embodiment of the present invention. FIG. 39 is a view showing a state in which an input option is selected as the first finger input mode and the second finger input mode by activation of a touch input option formed in the second input unit and mouse mode division, when palm input is not detected by the first input unit, a function is performed by push input during touch, and the performed function is positionally moved by mouse input with the right hand, and the utilization of the second input unit, in the control method of the input device according to the second embodiment of the present invention. FIG. 40 is a view showing a process of recognizing a position of the base with an inclined angle in virtual reality by installing a gyro sensor and a state in which the finger input area is confirmed in the control method of the input device according to the second embodiment of the present invention. FIG. 41 is a view for describing simultaneous control of 3D space in a virtual space by controlling vertical and horizontal planes with both hands through mouse mode input by using the first input unit with both palms by type 1 and type 2 methods and using the second input unit with both fingers, in the control method of the input device according to the second embodiment of the present invention.

Referring to FIGS. 1 to 16, an input device according to a first embodiment of the present invention is connected to an electronic device 10 (a personal computer (PC), a virtual reality (VR) device, an augmented reality (AR) device, or the like) by a near-field communication method and includes a pair of bases 100, a pair of first input units 200, a pair of second input units 300, a pair of control units 400, a pair of power supply units 500, and a connection unit 600.

Each of the pair of bases 100 may include a first installation groove 110 formed on an upper surface so that the first input unit 200 to be described below is installed, and a second installation groove 120 formed therein so that the second input unit 300 to be described below is installed. Here, each of the bases 100 may have a square or rectangular panel shape with four sides formed at an edge thereof, but various shapes may be applied to the base 100 as necessary.

In addition, a charging terminal 130 may be provided on a corresponding one side of each of the bases 100 so as to be interconnected with and separated from a charging terminal 620 of the connection unit 600 to be described below, and the bases 100 may be coupled in a state in which the corresponding one side is inserted into a coupling groove 601 of the connection unit 600 to be described below.

The first installation groove 110 may have a square or rectangular groove shape having four sides formed at an edge thereof, but various shapes may be applied to the first installation groove 110 as necessary, and an edge part having a predetermined width may be formed between the edge of the first installation groove 110 and a side surface of the base 100.

The second installation groove 120 may be eccentrically positioned toward the rear of the base 100 so that a user's palm can be seated and may be positioned at the center of the base 100 or to be eccentrically toward one side of the base 100 in a left and right direction, and an edge of the second installation groove 120 may be positioned adjacent to the edge of the base 100.

The charging terminal 130 is coupled to the charging terminal 620 of the connection unit 600 to be described below in a male-female manner, and the charging terminal 130 of the base 100 and the charging terminal 620 of the connection unit 600 may have corresponding shapes (a C-type, a micro 5-pin, a universal serial bus (USB)-type, a slide-type, and the like) so that the charging terminal 130 of the base 100 and the charging terminal 620 of the connection unit 600 are coupled to and separated from each other in a male-female manner.

In addition, connection protrusions (not shown) or connection grooves (not shown), which can be coupled to and separated from each other in a male-female manner, may be formed correspondingly at one sides of the bases 100 facing each other. The connection protrusion may protrude from one side of one of the bases 100, and the connection groove may be concavely formed in one side of the other one of the bases 100, and the positions and numbers of the connection protrusions and the connection grooves may be variously applied as necessary.

The first input unit 200 is provided in the first installation groove 110 to form a seating area for the user's palm, and when a pressure at which the user's palm is seated is greater than or equal to a set pressure, the first input unit 200 is switched to a state in which a palm input signal can be input by an electromagnetic induction method, and the position and rotation of the palm and a palm print are detected through the palm input signal.

At this time, the control unit 400 to be described below may detect the position and rotation of the user's palm and the palm print, and when the first input unit 200 is horizontally rotated by the palm, the control unit 400 may detect the rotation of the palm by using static electricity. Since the first input unit 200 is provided in each of the pair of bases 100, the user may input palm input signals with both hands individually or simultaneously.

That is, by moving the palm horizontally, a pointer shown in a display window of the electronic device 10 may be moved in various directions (360 degrees), and by rotating (360 degrees) the palm, a line-of-sight shown through the display window of the electronic device 10 may be moved in various directions. When the user separates the palm from the first input unit 200 during movement input to the first input unit 200 in a state the palm is detected by a capacitive pointer so that the pressure is below a set detection pressure of the electromagnetic induction device, the movement input may be initialized, and the first input unit 200 may adjust a position of the first input unit 200 to a desired position as shown in FIG. 33 by confirming the position of the first input unit 200 in an accommodation space through the display window of the electronic device 10 in a non-input state.

As shown in FIGS. 7, 8, and 10, the first input unit 200 according to one embodiment of the present invention may include a digitizer 210 provided on a bottom surface of the first installation groove 110, a first conductive member 220 stacked and connected to an upper surface of the digitizer 210, a first touch sensor 230 stacked and connected to an upper surface of the first conductive member 220, a second conductive member 240 stacked and connected to an upper portion of the first touch sensor 230, a first operation unit seated on an upper surface of the second conductive member 240 to be pressable, horizontally movable, and horizontally rotatable, a palm detection unit 260 provided on an upper portion of the first operation unit to form a palm seating area and configured to detect a palm print when the palm comes into contact with the palm seating area, and an auxiliary power supply unit 270 provided inside the first operation unit to be rechargeable or replaceable and configured to supply power to the palm detection unit 260.

The digitizer 210 is for detecting a position of the palm by an electromagnetic induction method, and the digitizer 210 may be horizontally installed on the bottom surface of the first installation groove 110 in the form of a panel, and may detect the position of the palm and a pressure by detecting an electromagnetic wave generated when a lower end of a first lifting rod 252 to be described below is brought into contact with an electronic-induction type pointer 253. The digitizer 210 as described above may detect the movement of the palm, convert detected coordinates into digital data, and transmit the digital data to the control unit 400 to be described below.

The first conductive member 220 may use an electro-conductive plastic material, may be horizontally installed in the form of a panel on the upper surface of the digitizer 210, and may be electrically connected to the digitizer 210 so that electricity may flow therebetween.

The first touch sensor 230 may detect the movement of the palm in X-line and Y-line directions in an electrostatic manner, may be horizontally installed on the upper surface of the first conductive member 220, and may be electrically connected to the first conductive member 220 so that electricity may flow therebetween. The first touch sensor 230 as described above may detect the movement of the palm in the X-line and Y-line directions and transmit the detected movement to the control unit 400 to be described below.

The second conductive member 240 may use an electro-conductive plastic material, may be horizontally installed in the form of a panel on an upper surface of the first touch sensor 230, and may be electrically connected to the first touch sensor 230 so that electricity may flow therebetween.

The first operation unit is for detecting a contact of the palm, and is switched to a state in which the palm input signal is input when the user's palm is seated thereon and a pressure transmitted from the user's palm is greater than or equal to a set pressure. That is, the position and rotation of the palm and the palm print may be detected by using the palm input signal input through the first operation unit.

As shown in FIGS. 7, 8, and 10, the first operation unit according to one embodiment of the present invention may include a body 251 positioned on an upper portion of the second conductive member 240 to be slidably movable and horizontally rotatable and having an internal accommodation space open downward, the first lifting rod 252 coupled to an upper end of the body 251 and protruding from a lower portion of the body 251, the electronic-induction type pointer 253 that is coupled to the lower portion of the body 251 while being spaced apart therefrom, seated on the upper surface of the second conductive member 240, and connected to the lower end of the first lifting rod 252 to transmit a connection signal to the digitizer 210 by an electromagnetic induction method when the body 251 descends to a lower connection position, a coil 254 coupled to an outside of the first lifting rod 252, a pair of capacitive pointers 255 correspondingly disposed on both sides of the electronic-induction type pointer 253 with respect to the first lifting rod 252 and having lower ends seated on the upper surface of the second conductive member 240, and a first elastic member 256 coupled between the body 251 and the electronic-induction type pointer 253 and configured to elastically support a lower end of the body 251 upward.

The body 251 is seated on the upper surface of the second conductive member 240 and provided to be slidably movable in various directions (360 degrees) and horizontally rotatable (360 degrees) about a vertical rotation center C, the first lifting rod 252 is positioned to be liftable in an accommodation space 251a of the body 251. Here, the body 251 may have a cylindrical shape with a side surface forming a circumference, but the body 251 may selectively use various shapes as necessary.

The first lifting rod 252 is provided inside the accommodation space 251a to be liftable together with the body 251 to the lower connection position and an upper connection release position, and is elastically supported by the first elastic member 256 to be described below. For example, when the first lifting rod 252 descends to the lower connection position, the lower end of the first lifting rod 252 may be connected to an upper end of the electronic-induction type pointer 253 to be described below, and when the first lifting rod 252 is lifted to the upper connection release position, the lower end of the first lifting rod 252 may be positioned to be spaced apart from an upper portion of the electronic-induction type pointer 253.

The electronic-induction type pointer 253 is slidably movable together with the body 251 at a lower portion of the first lifting rod 252, the first lifting rod 252 is positioned on the upper portion of the electronic-induction type pointer 253, a lower end of the electronic-induction type pointer 253 is seated on the upper surface of the second conductive member 240 to be slidably movable, and the upper portion of the electronic-induction type pointer 253 vertically communicates with the accommodation space 251a to be connected to and disconnected from the lower end of the first lifting rod 252.

Such an electronic-induction type pointer 253 is connected to the lower end of the first lifting rod 252 when the body 251 descends to the connection position, and a connection signal is transmitted to the digitizer 210 by an electromagnetic induction method. Here, the digitizer 210 detects the movement of the palm, converts detected coordinates (an X-line and a Y-line) into digital data, and transmits the digital data to the control unit 400 to be described below.

When the coil 254 made of a metal material is wound on the outside of the first lifting rod 252, and the lower end of the first lifting rod 252 is connected to the upper end of the electronic-induction type pointer 253, the digitizer 210 may detect the position of the palm by electromagnetic induction with the coil 254. On the other hand, when the lower end of the first lifting rod 252 is spaced apart from the upper portion of the electronic-induction type pointer 253, the control unit 400 to be described below may recognize that the palm is spaced apart from the palm detection unit 260 to be described below.

For example, when the palm is moved in a specific direction in a state in which the body 251 descends to the connection position, the control unit 400 to be described below may recognize that the user's palm is moved, and move the pointer shown through the display window of the electronic device 10 in the same direction as the palm.

The pair of capacitive pointers 255 are seated on the upper surface of the second conductive member 240 to be slidably movable. The capacitive pointer 255 rotates together with the electronic-induction type pointer 253 when the body 251 rotates horizontally, and a rotation direction of the capacitive pointer 255 may be detected by the first touch sensor 230.

For example, when the body 251 rotates to a left side in a state of descending to the connection position, the control unit 400 to be described below may recognize that the user's palm is rotated, and move the line-of-sight shown through the display window of the electronic device 10 to the left side or perform a set input such as changing an input window page of the electronic device 10. On the other hand, when the body 251 rotates to a right side in a state of descending to the connection position, the control unit 400 to be described below may recognize that the user's palm is rotated, and move the line-of-sight shown through the display window of the electronic device 10 to the right side or perform a set input. The first elastic member 256 is coupled between the body 251 and the electronic-induction type pointer 253 and elastically supports the lower end of the body 251 upward, and the first elastic member 256 may have the form of a coil spring having a lower end seated on an upper surface of the electronic-induction type pointer 253 and an upper end elastically supporting the lower end of the body 251, and may be coupled in a state of surrounding the outside of the first lifting rod 252

For example, when the body 251 descends to the lower connection position, the first elastic member 256 is compressed downward, and when the body 251 is lifted to the upper connection release position, the first elastic member 256 may be stretched upward by its own elastic force, and the body 251 may maintain the lifted state by the elastic supporting force of the first elastic member 256.

The palm detection unit 260 is a part on which the user's palm is seated, and the palm detection unit 260 may be provided on the upper portion of the first operation unit to form the palm seating area, and may detect a palm print 21 when the palm is in contact with the palm detection unit 260 and transmit a detection signal for the palm print 21 to the control unit 400 to be described below. Here, the palm detection unit 260 may use an electro-conductive plastic, and a non-conductive material may be further coupled to a lower surface of the palm detection unit 260.

In addition, the palm detection unit 260 may be horizontally coupled to the upper end of the body 251 in the shape of a disk, and an upper surface of the palm detection unit 260 may form an upwardly convex curvature so as to be in close contact with the user's palm, but although not shown in the drawings, the upper surface of the palm detection unit 260 may be applied in various shapes so as to correspond to the shape of a user's hand.

In addition, when the user's palm is seated (in contact with) on the palm detection unit 260, the first input unit 200 may detect the user's palm in contact with the capacitive pointer of the first input unit 200 through static electricity of the user, and the palm input signal of the first input unit 200 is not input when the first input unit 200 descends to the contact position in a state in which the user's palm is not seated (in contact with) on the palm detection unit 260. That is, since the palm input signal is input only when the user's palm is seated on the palm detection unit 260, input errors may be prevented.

In addition, a palm print detection unit 261 provided inside the palm detection unit 260 and configured to detect the palm print 21 may be further included. The palm print detection unit 261 may be provided inside the palm detection unit 260, and when the palm is in contact therewith, the palm print 21 of the palm seated on the upper surface of the palm detection unit 260 may be detected and a palm print detection signal may be transmitted to the control unit 400 to be described below. Here, when the palm print 21 detected by the palm print detection unit 261 matches preset palm print information, the control unit 400 to be described below may derive a center value and a central angle of the palm print 21 from the preset palm print information with a recognition point of the detected palm print 21 as a starting point, and activate a finger input area according to the detected position and angle of the palm print 21.

For example, when the user places the palm on the upper surface of the palm detection unit 260 and the palm print 21 of the user detected by the palm print detection unit 261 matches the palm print information of the user, a distance and angle between the recognition point of the detected palm print and a central point of the palm print 21 of the user are derived and set as an angle of a central starting point of the palm print 21, and an input area of fingers is activated in the second input unit 300 using an average touch point for each finger in a second finger input mode, so that even when the fingers are separated, an input point of the finger can be predicted and detected through palm print recognition, and in the rotation center C of the first input unit 200 and the capacitive pointer of the first input unit 200, the recognition point is changed on the basis of the central point of the palm print 21, so that a new input of the user's finger is detected and a position data value of the finger input is stored.

In this state, when the user touches the second input unit 300 to be described below by using each of the fingers in a first finger input mode, an interval between currently touched fingers may be detected, and an input coordinate range of the fingers may be expanded and reduced.

The auxiliary power supply unit 270 is for supplying power to the palm detection unit 260, and the auxiliary power supply unit 270 may use a rechargeable or replaceable battery inside the first operation unit, may be provided in the palm detection unit 260, and may be electrically connected to the control unit 400 to be described below.

In addition, the first operation unit according to one embodiment of the present invention may include a cover member 280 for covering an upper side of the first installation groove 110. The cover member 280 may include a first slide panel 281 disposed to be horizontally movable inside the first installation groove 110 and having a disk shape through which a first hollow 281a passes vertically so that the body 251 vertically passes therethrough and is coupled, a second slide panel 282 disposed to be horizontally movable inside the first installation groove 110 and having a disk shape, through which a second hollow 282a passes vertically so that the first slide panel 281 is positioned therein and in which a slide groove 282b is formed concavely on an inner circumferential surface of the second hollow 282a so that a side surface of the first slide panel 281 is inserted horizontally in a male-female manner, and a third slide panel 283 having an edge fixed inside the first installation groove 110 and a disk shape, through which a third hollow 283a passes vertically so that the second slide panel 282 is positioned therein and in which a slide groove 283b is formed concavely on an inner circumferential surface of the third hollow 283a so that a side surface of the second slide panel 282 is inserted horizontally in a male-female manner.

The first slide panel 281 is a component horizontally movable (360 degrees) together with the body 251, and the side surface of the first slide panel 281 and an inner circumferential surface of the first hollow 281a may form a circumference along an edge of the first slide panel 281. For example, when the body 251 is moved to one side, the first slide panel 281 is horizontally moved together with the body 251, and a position of the first slide panel 281 may be changed as the edge of the first slide panel 281 moves horizontally along the slide groove 282b of the second slide panel 282.

The second slide panel 282 is a component linked to the sliding movement (360 degrees) of the first slide panel 281, and is horizontally disposed on the same line as the first slide panel 281, and the side surface of the second slide panel 282 and the inner circumferential surface of the second hollow 282a may form a circumference along an edge of the second slide panel 282. For example, when the body 251 is moved to one side, a position of the second slide panel 282 may be changed as the edge of the second slide panel 282 moves horizontally along the slide groove 283b of the third slide panel 283.

Here, a plurality of second slide panels 282 may be slidably coupled to each other in a male-female manner along a circumferential direction. In this case, each of the plurality of second slide panels 282 may have the slide groove 282b formed in the inner circumferential surface of the second hollow 282a, the second slide panels 282 may be sequentially arranged in the order of increasing diameters in the circumferential direction, and the second slide panel 282 may be provided in one or more numbers.

In addition, locking protrusions may protrude upward and downward respectively from upper and lower edges of the first slide panel 281, and steps for positionally locking the locking protrusions of the first slide panel 281 in a direction of the body 251 may be respectively formed on upper and lower surfaces of the slide groove 282b of the second slide panel 282 in order to prevent the locking protrusions of the first slide panel 281 from being separated to the second hollow 282a. That is, the separation of the first slide panel 281 may be prevented by using the locking structure of the locking protrusion and the step.

The third slide panel 283 is horizontally disposed on the same line as the second slide panel 282, and has the edge fixedly coupled to an inner circumferential surface of the first installation groove 110. For example, when the body 251 is moved to one side, the position of the second slide panel 282 may be changed as the edge of the second slide panel 282 moves horizontally along the slide groove 283b of the third slide panel 283.

In addition, locking protrusions may protrude upward and downward respectively from upper and lower edges of the second slide panel 282, and steps for positionally locking the locking protrusions of the second slide panel 282 in the direction of the body 251 may be respectively formed in the slide groove 283b of the third slide panel 283 in order to prevent the locking protrusions of the second slide panel 282 from being separated to the third hollow 283a. That is, the separation of the second slide panel 282 may be prevented by using the locking structure of the locking protrusion and the step.

Since the cover member 280 as described above slidably moves together with the body 251 while covering an upper portion of the first installation groove 110, the cover member 280 may prevent the first installation groove 110 from being exposed to the outside, may prevent foreign substances and the like from flowing into the first installation groove 110, and may prevent the body 251 from being twisted while moving by horizontally supporting the body 251 by the slide movement method.

The second input unit 300 is provided in the second installation groove 120 to form a seating area for the user's finger, and detects a finger input signal by a capacitive method when the finger is in contact therewith. The second input unit 300 may be divided into a plurality of areas by insulating materials, and is provided in each of the pair of bases 100, so that finger input signals of user's left and right hands can be input separately.

The second input unit 300 as described above may detect the finger input signal in the first finger input mode (capacitive manner) when the finger comes into contact (touch) therewith with a set pressure or less, detect the finger input signal in the second finger input mode when the finger comes in contact (push) therewith with the set pressure or more, and detect a position of the finger through the finger input signal.

That is, the user touches the second input unit 300 with the finger with the set pressure or less to move the pointer shown through the display window of the electronic device 10 in various directions, and when the user pushes the second input unit 300 with the finger with the set pressure or more, various functions of the electronic device 10 may be performed by an input operation of the finger input signal.

The second input unit 300 according to one embodiment of the present invention may include a third conductive member 310 provided on a bottom surface of the second installation groove 120, a second touch sensor 320 stacked and connected to an upper surface of the third conductive member 310, a fourth conductive member 330 stacked and connected to an upper surface of the second touch sensor 320, an insulating plastic 340 made of a non-conductive material and stacked on an upper surface of the fourth conductive member 330, a plurality of lifting holes 350 vertically pass through the insulating plastic 340, a conductive elastic pad 360 positioned within a thickness of the insulating plastic 340 and having a plurality of elastic deformation areas 361 positioned respectively in the lifting holes 350 to be spaced apart from an upper portion of the fourth conductive member 330, a second operation unit provided to be liftable in the lifting hole 350 and having a lower end that presses the elastic deformation area 361 downward to connect the elastic deformation area 361 to the upper surface of the fourth conductive member 330 when the second operation unit descends to the lower connection position, and a conductive touch unit 380 positioned to be spaced apart from the upper portion of the fourth conductive member 330 and having a lower surface stacked and connected to an upper end of the second operation unit.

The third conductive member 310 may use an electro-conductive plastic, may be horizontally installed in the form of a panel on the bottom surface of the second installation groove 120, and have one side electrically connected to the first conductive member 220 described above at the same height as the first conductive member 220. Here, the third conductive member 310 may be integrally connected to the first conductive member 220 to form one body.

The second touch sensor 320 may detect the movement of the finger in the X-line and Y-line directions in an electrostatic manner, may be horizontally installed on the upper surface of the third conductive member 310, and may be electrically connected to the third conductive member 310 so that electricity may flow therebetween.

Here, the second touch sensor 320 may detect the movement of the finger in the X-line and Y-line directions and transmit the detected movement to the control unit 400 to be described below, may be electrically connected to the first touch sensor 230 described above at the same height as the first touch sensor 230, and may share coordinates with the first touch sensor 230 by being electrically connected to the first touch sensor 230.

The fourth conductive member 330 may use an electro-conductive plastic, may be horizontally installed in the form of a panel on the upper surface of the second touch sensor 320, and have one side electrically connected to the second conductive member 240 described above at the same height as the second conductive member 240. Here, the fourth conductive member 330 is integrally connected to the second conductive member 240 to form one body.

The insulating plastic 340 uses a non-conductive plastic material in which electricity is not conducted, and the insulating plastic 340 may be horizontally installed in the form of a panel on the upper surface of the fourth conductive plastic 330 and may be electrically connected to the fourth conductive plastic 330 so that electricity may flow therebetween.

The lifting hole 350 is a space in which the second operation unit to be described below is installed, and is vertically penetrated through the insulating plastic 340. Here, a second lifting rod 371 to be described below is positioned to be liftable in the lifting hole 350, and an upper end of the second lifting rod 371 protrudes from an upper portion of the lifting hole 350.

The conductive elastic pad 360 may use a conductive rubber material or the like having electrical conductivity, may be horizontally installed in the form of a panel within a thickness of the insulating plastic 340, and the plurality of elastic deformation areas 361 formed on the conductive elastic pad 360 may be respectively positioned in the lifting holes 350 to be spaced apart from the upper portion of the fourth conductive member 330.

Here, the elastic deformation areas 361 may be positioned in the lifting holes 350, respectively, and when the second lifting rod 371 to be described below descends to the connection position, the elastic deformation area 361 is electrically connected to the upper surface of the fourth conductive member 330 by being convexly bent and deformed downwardly while being connected to the second lifting rod 371. That is, when the user pushes a conductive fiber 384 with the finger with the set pressure or more to lower the second lifting rod 371 to the connection position, a lower end of the second lifting rod 371 is connected to an upper end of the elastic deformation area 361, and the conductive elastic pad 360 transmits the connection signal to the second conductive member 240.

When the user touches the conductive fiber 384 of the second input unit 300 with each finger in a second finger input mode, each input point for the second finger input mode is connected to the capacitive pointer 255, and then an input value of the touch point may be stored in a database, and a touch point input coordinate range of each finger may be formed by deriving a distance value of the average touch point of an average touch point of each finger input for the second finger input mode and the center of the capacitive pointer 255.

In addition, when the user's palm is seated on the palm detection unit 260, the palm print detection unit 261 may scan the palm print 21 of the user, and when the palm print detection unit 261 recognizes the palm print 21 of the user, and the palm print 21 of the user detected by the palm print detection unit 261 matches the preset fingerprint information, a distance and an angle between a point at which the detected fingerprint is recognized and a central point of the palm print 21 of the user are derived and set as an angle of the central starting point of the palm print 21, an input may be detected by adjusting the position of the input area of the fingers to the average touch point for each finger in the second finger input mode, the central point of the capacitive pointer of the first input unit 200 may be changed to the central point of the palm print 21, and when the user touches the conductive fiber 384 of the second input unit 300 using each finger in the first finger input mode, an input coordinate range of the fingers may be expanded or reduced by detecting an interval between currently touched fingers.

For example, in an initial use, after scanning the palm print 21 of the user, a push input point for each finger is input, and then the position and angle of the average coordinate value of the second finger input mode may be adjusted to the position of the palm input through the palm print detection unit 261, the touch range may be expanded or reduced to the current position for each finger of the first finger input mode, and the palm detection unit 260 moves and rotates together with the user's palm.

In addition, the conductive fiber 384 of the second input unit 300 may adjust the sensitivity of the second finger input mode according to a thickness and an elastic force of the conductive fiber 384 by absorbing static electricity of the finger that touches finely as an input of the first input unit 200 using a user's fingernail and using a soft touch for a long time, may be provided in the form suitable for a user's touch pressure and the purpose, and may detect the input of the user's fingers even when the user's fingers are not touched therewith by storing coordinates of the last touch of the user's finger. That is, since the first input unit 200 and the second input unit 300 detect the palm and fingers of the user together, it is possible to comprehensively detect the movement and rotation of the palm, the input position of the finger, and the like.

The second operation unit is for detecting a contact of the finger, and is switched to the second finger input mode in which the finger input signal is input when a pressure transmitted from the user's finger is greater than or equal to the set pressure.

The second operation unit according to one embodiment of the present invention may include the second lifting rod 371 positioned on an upper portion of the elastic deformation area 361 to be liftable and having a side surface from which a locking protrusion 371a protrudes, and configured to press the elastic deformation area 361 downward while descending to the connection position, a locking step 372 protruding from an inner circumferential surface of the lifting hole 350 and configured to positionally lock an upper end of the locking protrusion 371a when the second lifting rod 371 is lifted to a connection release position, and a second elastic member 373 provided between the locking step 372 and the locking protrusion 371a and configured to elastically support a lower end of the locking protrusion 371a upward.

The second lifting rod 371 is provided in the lifting hole 350 to be liftable from the lower connection position and to the upper connection release position, the lower end of the second lifting rod 371 is positioned to be liftable in the lifting hole 350, and the upper end of the second lifting rod 371 is positioned in a state of being in close contact with a lower surface of a first conductive elastic pad 381 to be described below.

The second lifting rod 371 as described above is lifted to the upper connection release position while being elastically supported by the second elastic member 373 to be described below, the locking protrusion 371a of the second lifting rod 371 maintains the positionally locked state to an upper end of the lifting hole 350, and the lower end of the second lifting rod 371 is positioned to be spaced apart from the upper portion of the elastic deformation area 361. On the other hand, when the user pushes the conductive fiber 384 of the conductive touch unit 380 to be described below with the finger with the set pressure or more, the second lifting rod 371 descends to the lower connection position, and the second elastic member 373 is compressed downward by the lowering of the locking protrusion 371a.

The locking step 372 may protrude from the inner circumferential surface of the lifting hole 350, a through hole may vertically pass through the locking step 372 so that the lower end of the second lifting rod 371 vertically pass through the through hole, and the lower end of the second lifting rod 371 may be positionally locked when the second lifting rod 371 is lifted to the connection release position.

The second elastic member 373 is coupled to an outside of the second lifting rod 371, has a lower end seated on an upper end of the locking step 372, and has an upper end elastically supporting the lower end of the locking protrusion 371a upward. For example, when the second lifting rod 371 descends to the connection position, the second elastic member 373 is compressed downward, and when the second lifting rod 371 is lifted to the connection release position, the second elastic member 373 is stretched upward by its own elastic force, and the second lifting rod 371 may be positioned in a lifted state by the elastic supporting force of the second elastic member 373.

The conductive touch unit 380 may include a first conductive elastic pad 381 positioned to be spaced apart from the upper portion of the fourth conductive member 330 and having a lower surface stacked and connected to the upper end of the second lifting rod 371, a third touch sensor 382 stacked and connected to an upper surface of the first conductive elastic pad 381, a second conductive elastic pad 383 stacked and connected to an upper surface of the third touch sensor 382, and the conductive fiber 384 stacked and connected to an upper surface of the second conductive elastic pad 383 to form a finger seating area.

The first conductive elastic pad 381 may be manufactured using an elastic material so that a shape thereof can be horizontally restored by self-elastic force after being convexly bent and deformed downwardly when the user presses the first conductive elastic pad 381 as shown in FIG. 13, and the first conductive elastic pad 381 may be manufactured using a material such as polyethylene terephthalate (PET). Here, the lower surface of the first conductive elastic pad 381 and the upper end of the second lifting rod 371 described above may be attached by a separate adhesive 381a.

The third touch sensor 382 may detect the movement of the finger in the X-line and Y-line directions in an electrostatic manner, may be horizontally installed on the upper surface of the first conductive elastic pad 381, and may be electrically connected to the first conductive elastic pad 381 so that electricity may flow therebetween. The third touch sensor 382 as described above may detect the movement of the finger in the X-line and Y-line directions and transmit the detected movement to the control unit 400 to be described below.

The second conductive elastic pad 383 may be manufactured using an elastic material so that a shape thereof can be horizontally restored by self-elastic force after being convexly bent and deformed downwardly when the user presses the second conductive elastic pad 383 as shown in FIG. 13, and the second conductive elastic pad 383 may be manufactured using a conductive material such as PET.

The conductive fiber 384 is the part with which the user's finger comes into contact, and the conductive fiber 384 may use a conductive yarn material in which a conductive material such as carbon or metal is included in a fiber in order to detect static electricity flowing through the finger of the user, and is horizontally coupled to an upper surface of the second conductive elastic pad 383. Here, the conductive fiber 384 may horizontally cover the entire area above the second installation groove 120.

The control unit 400 transmits the palm input signal and the finger input signal transmitted from the first input unit 200 and the second input unit 300 to the electronic device 10 by a wireless communication method. Here, when palm print information is preset and the detected palm print 21 matches the preset fingerprint information, the control unit 400 variably sets the finger input area according to a setting direction of the palm print 21 with respect to the vertical rotation center C of the first input unit 200.

In this case, the user can zoom in or out the finger input area by decreasing or increasing an interval between the fingers while multi-touching the conductive fiber 384 with the finger, and when the user rotates the palm, the control unit 400 can detect the rotation of the palm detection unit 260 and may reset the finger input area according to a position of the center of the palm print 21 and a direction of the central angle through the palm print 21 recognized by the palm detection unit 260.

For example, the fingerprint 21 may be scanned in a state in which the user's palm is placed on a palm seat unit 210, and then, touch and push input points for each finger may be input to the second input unit 300. Here, the position and angle of the central starting point of the palm print 21 may be adjusted according to the position of the palm print input through the palm print detection unit 261, areas of the first and second finger input modes may be formed by adjusting the position and angle of the average coordinate value of the second finger input mode on the basis of the central starting point of the palm print 21, the finger input area may be zoomed in and out by detecting the interval between fingers in the first finger input mode, and a touch and a push can be detected even when the first input unit 200 moves and rotates together with the user's palm.

In addition, when the user pushes the second input unit 300 in the second finger input mode by using the fingers, the seating area of each finger may be set by connecting each of the input points of the second finger input mode to the capacitive pointer 255 and then storing the input value of the touch point to a database, and deriving the average touch point of each finger in the second finger input mode and the distance value between the center of the capacitive pointer 255 and the average touch point.

In addition, the rotation center C of the first input unit 200 and the input recognition coordinates of the capacitive pointer 255 may be changed to the center of the palm print 21 in proportion to the position and angle, at which the palm is seated, with respect to the central point of the palm print 21 of the user, and since central point value of the fixed capacitive pointer 255, the central point of the palm print 21, and the rotation center C of the first input unit 200 may have the same position value even when the capacitive pointer 255 rotates, the same input position value and distance value may be derived, and the average push input value of the user's second finger input mode may be stored in the database even when the detection position in the center of the palm is rotated.

Various input modes may be preset in the control unit 400 using input methods such as touching, pushing, and sliding, contacting, non-contacting, separating, and the like, when the user touches the second input unit 300 in a predetermined pattern using the finger, the corresponding input mode may be performed through the display window of the electronic device 10, and when the user moves or rotates the first input unit 200 in a specific direction using the palm, the corresponding input mode may be performed together through the display window of the electronic device 10.

In addition, input immediately after being touched during non-contact, input immediately after being pushed during non-contact, input after a while after being pushed during contact, input immediately after being pushed during contact, and input after a while after being pushed during non-contact may be used for the input mode, and input methods such as double-touch, touch-swipe, multi-touch, multi-touch rotation, multiple direction touch swipe, one direction touch swipe, double-push, push-swipe, multi-push, multiple direction push swipe, and one direction push swipe may be used.

In addition, the control unit 400 may include a communication module 410 for near-field communication with an electronic device, a power switch 420 for operating a power-on/off state, and a display unit 430 for displaying state information to the outside, and the control unit 400 described above may be electrically connected to the charging terminal 130.

The communication module 410 may use methods of Bluetooth, Wi-Fi, and the like, but may selectively use various near-field communication methods as necessary, and may be installed in a state of being embedded in the base 100.

The power switch 420 may be installed in a state of being exposed to the outside of the base 100, and the driving of the control unit 400 may be turned on/off using the power switch 420. For example, an operating part (a lever type, a push/pull type, a slide type, or the like) of the power switch 420 may be exposed from the side surface of the base 100.

The charging terminal 130 described above may be installed in a state of being exposed to the outside of the base 100, and a connector of a charging cable may be connected to the charging terminal 130 to charge the power supply unit 500 to be described below. In a different form, the power supply unit 500 may be configured to be replaceable without configuring the charging terminal 130, and a mounting unit (not shown) that can be opened and closed may be additionally configured on one side of the base 100.

The display unit 430 may be installed in a state of being exposed to the outside of the base 100, and the display unit 430 may use a liquid-crystal display (LCD) device, a lamp (green, red, and the like) for displaying the state information to the outside. For example, the display unit 430 may be installed in a state of being exposed on an edge-side upper surface of the base 100, and a charging state, a remaining amount, and the like of the power supply unit 500 to be described below may be displayed to the outside.

A fingerprint detection unit 700 for inputting the fingerprint 21 of the user may be further electrically connected to the control unit 400 according to one embodiment of the present invention, and the detection unit of the fingerprint detection unit 700 may be installed in a state of being exposed to the outer surface of the base 100. For example, the detection unit of the fingerprint detection unit 700 may be horizontally positioned on the edge-side upper surface of the base 100, and the user may register the fingerprint or release a lock by bringing the finger into contact with the detection unit.

In addition, when the driving of the power supply unit 500 is turned on, the control unit 400 may perform a function of registering and modifying the fingerprint, may selectively store one or more fingerprints, and may release the lock and switch to a usable state when the fingerprint of the user is input. For example, when the driving of the power switch 420 is turned on, a fingerprint recognition function of the fingerprint detection unit 700 may be performed.

The power supply unit 500 is provided in each of the bases 100 to be rechargeable or replaceable and supplies power to the control unit 400, a power supply state may be turned on/off by operating the power switch 420, and when the power supply unit 500 is applied to be rechargeable, the power supply unit 500 may be electrically connected to the charging terminal 130 described above. The charging terminal 130 may be installed in a state of being exposed to the outer surface of the base 100, and the connector of the charging cable may be connected to the charging terminal 130 to charge the power supply unit 500.

The connection unit 600 is for charging the power supply unit 500 in a state in which the pair of bases 100 are respectively coupled to both sides thereof, and the connection unit 600 may include a pair of coupling members 610 having one sides facing each other and rotatably connected to each other by a hinge part, having lengths in a direction of a horizontal rotation center, and having opposite sides to which one side of each of the bases 100 is coupled while being in close contact therewith, a pair of charging terminals 620 each provided on an opposite side of the coupling member 610 and connected to the charging terminal 130 of the base 100 in a male-female manner, and a cable connection terminal 630 provided on one side of the coupling member 610 in a longitudinal direction and to which a connector 31 of a charging cable 30 is connected in a male-female manner.

As shown in FIGS. 1 to 6, the coupling members 610 may be horizontally unfolded or rotated so that corresponding one surfaces of the bases 100 come into close contact therewith. For example, when using the input device, the bases 100 may be unfolded in parallel by horizontally rotating the coupling members 610, and when storing and carrying the input device, the bases 100 may be brought into close contact with each other in a folded state by rotating the coupling members 610 in a folded direction. That is, when the coupling member 610 is folded, the volume of the base 100 is reduced, thereby providing ease of storage and portability.

In addition, the coupling groove 601 may be formed on one side of the coupling member 610 facing the bases 100 to allow the one side of the base 100 to be correspondingly inserted therein. Coupling protrusions 602 may protrude from opposite sides of the coupling groove 601, and corresponding coupling grooves may be concavely formed on both sides of the bases 100 so that the coupling protrusions 602 may be correspondingly inserted therein to be positionally locked. A protruding end of the coupling protrusion 602 may form a convex curvature (such as a hemisphere).

In addition, inclined surfaces may be formed on both sides of the coupling groove 601 such that an interval therebetween gradually decreases toward an insertion direction of the base 100. When one side of the base 100 is pushed into the coupling groove 601, the inclined surfaces guide both sides of the base 100 in an insertion direction of the coupling groove 601. That is, since an entrance of the coupling groove 601 is widely formed by the inclined surfaces, the base 100 may be easily coupled.

The charging terminal 620 of the connection unit 600 may be correspondingly positioned at the opposite side of the coupling member 610, and may be electrically connected to the cable connection terminal 630 via the inside of the coupling member 610. That is, the charging terminal 130 of the base 100 and the charging terminal 620 of the connection unit 600 may be connected to each other, and the connector 31 of the charging cable 30 may be connected to the cable connection terminal 630, thereby charging the power supply unit 500.

The input device according to one embodiment of the present invention may further include a lighting unit 800 electrically connected to the control unit 400. A plurality of lighting units 800 may be arranged along an upper surface of the insulating plastic 340, may be turned on when the user touches the conductive fiber 384 to emit light upward, and may display various input options to the outside according to the connected electronic device.

Here, the lighting units 800 may each use a lamp such as a light-emitting diode (LED) or the like and may be arranged to be spaced apart from each other along the upper surface of the insulating plastic 340, and the conductive touch unit 380 may be manufactured using a material through which light can be transmitted so that the light of the lighting unit 800 can be diffused upward. In addition, the lighting unit 800 may be disposed at an interval between the second lifting rods 371 described above, the installation position and size of the lighting unit 800 may be variously applied as necessary, and an input area and an input window may be displayed externally.

In addition, the input device according to one embodiment of the present invention may further include a gyro sensor (not shown). As shown in FIGS. 40 and 41, the gyro sensor may be installed inside the base 100 and electrically connected to the control unit 400. That is, by detecting x-, y-, and z-axis coordinates of the input device using the gyro sensor, even when a field of view is blocked in a virtual reality space, a position of the device and a finger touch area of the second input unit 300 may be confirmed and a range-type input unit area may be confirmed, thereby improving the convenience of use.

In addition, the input device according to one embodiment of the present invention may further include a gyro sensor (not shown). As shown in FIG. 40, the gyro sensor may be installed inside the base 100 and electrically connected to the control unit 400. That is, by detecting the x-, y-, and z-axis coordinates of the input device using the gyro sensor, even when a field of view is blocked in a virtual reality space, a position of the device, positions of a first palm input unit of the first input unit and the finger touch area of the second input unit 300, the range-type input unit area, a keyboard input area, and the like may be confirmed, thereby improving the convenience of use.

Referring to FIG. 41, as a mouse mode, Type 1 uses the palm and Type 2 uses the fingers, and by changing a viewing angle through screen rotation and control axis setting, free input in a 3D virtual space is possible. As for an operation method of Type 1, while controlling a horizontal plane of X and Z coordinates through the mouse mode input in the accommodation space of the left hand first input unit 200, and controlling a vertical plane of X and Y coordinates through mouse mode input in the accommodation space of the right hand first input unit 200, an input area of R is pulled closer or pushed away by moving the vertical plane of the X and Y coordinates to an Z-axis by sliding an index finger 1 of the right hand up and down, so that Z-axis movement control of the vertical plane of the X and Z coordinates is performed, and a height of an input area of L is adjusted by moving the horizontal plane of the X and Z coordinates up and down on a Y-axis by sliding an index finger A of the left hand up and down, so that movement control of the horizontal plane of the X and Z coordinates on the Y-axis is performed. In addition, 3D space control may be used efficiently and conveniently by confirming inputs, such as, changing left and right viewing angles through palm rotation, setting a position of a moving axis according to the settings of the user and programmer, setting positions of a horizontal input surface and a vertical input surface of the input area and 360-degree angles, changing a 360 degree view, adding an input area for the function of the second input unit, and the like by detecting the rotation of the capacitive pointer of the first input unit 200, through the display window of the electronic device 10, and combining input methods in various ways.

An operation method of Type 2 is the same control method as the z-axis and y-axis movement method of Type I using the multi-touch of the second finger input unit, the mouse input of the finger touched first and the slide of the next finger as a multi-touch function. As shown in FIG. 39, while controlling the vertical plane of the X and Z coordinates through the mouse mode input of the second finger input unit with the index finger A of the left hand, and controlling the vertical plane of the X and Y coordinates through the mouse mode input of the second input unit 300 with the index finger 1 of the right hand, an input area of R is pulled closer or pushed away by moving the vertical plane of the X and Y coordinates to an Z-axis by sliding a middle finger 2 of the right hand up and down, so that Z-axis movement control of the vertical plane of the X and Z coordinates is performed, and a height of an input area of L is adjusted by moving the horizontal plane of the X and Z coordinates up and down on a Y-axis by sliding a middle finger B of the left hand up and down, so that movement control of the horizontal plane of the X and Z coordinates on the Y-axis is performed.

By the multi-second finger input mode, inputting of viewing angle rotation and various functions as shown in FIG. 39 are used, and by changing the input method according to the user and the program, and setting input button options, the second finger input mode may be used effectively in virtual spaces for gaming, video production, design, and the like.

Hereinafter, an operation of an input device according to a first embodiment of the present invention will be described as follow. When the user places the palm on the palm detection unit 260 of the first input unit 200, the palm detection unit 260, the body 251, and the first lifting rod 252 descend, and when a load greater than or equal to a set pressure is applied to the palm detection unit 260, the first lifting rod 252 descends to the lower connection position.

At this time, at the same time that the lower end of the first lifting rod 252 is connected to the upper end of the electronic-induction type pointer 253, the first elastic member 256 is compressed downward, the electronic-induction type pointer 253 transmits a connection signal to the digitizer 210 by an electromagnetic induction method, and the digitizer 210 converts detected coordinates into digital data and transmits the digital data to the control unit 400.

In this state, when the user's palm is horizontally moved or horizontally rotated, the pair of capacitive pointers 255 horizontally slide or rotate in a state in which the lower ends thereof are in contact with the upper surface of the second conductive member 240, and the movement and rotation direction of the capacitive pointer 255 may be detected by the first touch sensor 230.

For example, when the user's palm is rotated to the left side while the body 251 descends to the connection position, the control unit 400 may recognize that the user's palm is rotated, and may move a line-of-sight shown through the display window of the electronic device 10 in various directions.

On the other hand, when the user's palm is rotated to the right side while the body 251 descends to the connection position, the control unit 400 to be described below may recognize that the user's palm is rotated, and may move the line-of-sight shown through the display window of the electronic device 10 in various directions. That is, the user may move a pointer shown through the display window of the electronic device 10 in various directions by moving the palm, or move the line-of-sight shown through the display window of the electronic device 10 in various directions by rotating the palm.

In addition, the control unit 400 may detect the palm print 21 and set the input area of (five) fingers to a position of a central point of the palm print 21 and a detecting direction on the basis of the vertical rotation center C of the capacitive pointer 255, and the user may zoom in or out the finger input area by decreasing or increasing an interval between the fingers while multi-touching the conductive fiber 384 with the finger.

In addition, when the user rotates the palm, the control unit 400 may detect the rotation of the palm detection unit 260 and reset the finger input area (expected touch point) according to the position of the central point and the central angle of the palm print 21 of the palm detection unit 260 and a detection angle direction.

That is, the input area of each finger may be variably formed in a direction corresponding to the rotation direction of the palm, the touch of each finger may be accurately detected through the detection of the palm print 21, and the input area of each finger may be individually formed. As shown in FIG. 23, an input error can be prevented when the input area is pushed by the second finger input by setting the input method to be input after the fingers are separated.

Meanwhile, when the user touches the conductive fiber 384 of the second input unit 300 by using the finger, as shown in FIGS. 11 to 14, the static electricity transmitted from finger may be transmitted to the third touch sensor 382 via the conductive fiber 384, and the finger input signal transmitted to the third touch sensor 382 may be transmitted to the control unit 400.

For example, when a pressure with which the user presses the conductive fiber 384 with the finger is less than or equal to a set pressure, a first finger input mode is performed. In this case, as shown in FIGS. 11 and 12, static electricity transmitted to the conductive fiber 384 via the user's finger is transmitted to the third touch sensor 382, and the third touch sensor 382 detects a position in which the user's finger touches and transmits a finger input signal to the control unit 400.

On the other hand, when a pressure with which the user presses the conductive fiber 384 with the finger is greater than or equal to the set pressure, the second finger input mode is performed. In this case, as shown in FIG. 13, the seating area of the conductive fiber 384 is convexly bent and deformed downwardly, and the second lifting rod 371 positioned in the corresponding seating area descends to the lower connection position.

In addition, at the same time that the lower end of the second lifting rod 371 is connected to the upper end of the elastic deformation area 361, the second elastic member 373 is compressed downward, and the lower end of the elastic deformation area 361 is connected to the upper surface of the fourth conductive member 330. Here, a connection signal of the elastic deformation area 361 is transmitted to the second touch sensor 320, and the second touch sensor 320 detects a position in which the user's finger touches and transmits the finger input signal to the control unit 400.

The method in which the user inputs the finger input signal with the finger may be applied in various ways, an input mode may be performed in which the user touches a surface of the conductive fiber 384 with the finger as shown in FIG. 11, and an input mode may be performed in which the user touches the surface of the conductive fiber 384 with the finger and separates the finger from the conductive fiber 384 as shown in FIG. 12.

For example, when the input of the second finger input mode in which the index finger is pushed with a pressure greater than or equal to the set pressure is detected, sliding in the first finger input mode is detected when dragging to the right side, and thus the frequency of input errors can be reduced and various types of additional input values can be set by inputting in a method, such as an immediate slide input, an input when separated after the slide, an input while the finger is separated as shown in FIG. 23, or the like in four directions, eight directions, in a circle, or the like with the finger rather than a single touch input in the second finger input mode according to the system setting.

In addition, by using multi-touch, various input methods such as two-finger touch, two-finger double-touch, two-finger left and right drag, touch after two-finger drag, two-finger circle drag (90 degrees or more), two-finger spread (zoom in), two-finger pinch (zoom out), two-finger rotate, three-finger drag left and right and up and down, three-finger swipe and touch, three-finger circular swipe can be used.

In addition, as shown in FIGS. 13 and 14, when the user touches the conductive fiber 384 with the finger, a primary input mode may be performed, and when the user slidably moves the finger to another position while touching the surface of the conductive fiber 384 with the finger, a secondary input mode (additional options for symbols, English lowercase letters, English uppercase letters, diphthongs, or the like) may be performed.

That is, the user touches the second input unit 300 with the finger with the set pressure or less to move the pointer shown through the a display unit 430 of the electronic device in various directions, and when the user pushes the second input unit 300 with the finger with the set pressure or more, various functions of the electronic device may be performed by an input operation of the finger input signal.

In addition, as shown in FIG. 15, when the user double-touches the surface of the conductive fiber 384 with the finger, the input mode may be performed, and when the user double-touches the surface of the conductive fiber 384, the input mode may be performed even when the second touch is below the set pressure when the user double-touches the surface of the conductive fiber 384.

In addition, when the user touches the conductive fiber 384 of the second input unit 300 in a preset pattern with the finger, a virtual interface (a key input pattern, a keyboard, or the like) may be visually shown through the display window of the electronic device 10, and positions for inputting key buttons (characters, numbers, symbols, and the like) of the interface may be set in each seating area of the second input unit 300.

For example, when the user touches the conductive fiber 384 of the second input unit 300 in the preset pattern with the finger, input information (a thumb: E, an index finger: A, a middle finger: B, a ring finger: C, and a little finger: D) of a left hand L, input information (a thumb: 5, an index finger: 1, a middle finger: 2, a ring finger: 3, and a little finger: 4) of a right hand R, a pointer showing a finger touch point, and the like may be selectively displayed through the display window of the electronic device 10, and the movement and rotation direction of the palm detection unit 260 may be selectively displayed (through images or the like) through the display window of the electronic device 10.

In addition, key buttons or the like displayed on the virtual interface may be arranged in various combinations as necessary, the key buttons may be changed to displayed input languages and various input values through visual sharing of the input through the display window of the electronic device 10 using the second input unit 300, and the size and input values of keyboard buttons may be adjusted in various ways depending on the user's convenience. In addition, a shape of the user's hand may be displayed together in the virtual interface shown through the display window of the electronic device 10, and a touch position of the key button may be displayed in various forms when the key button is touched.

In addition, an input value may be set by multi-touch during mouse input like a right-click of a mouse, a touch position of a pen may be confirmed in the first finger input mode in a state in which a field of view is blocked by using a stylus pen or the like used for the mobile, and a pen input is possible through the second finger input mode of a set pressure or more.

Hereinafter, a method of controlling an input device according to a second embodiment of the present invention will be described with reference to FIGS. 17 to 38. The method of controlling the input device according to the second embodiment of the present invention includes a signal input operation (S100), a signal transmission operation (S200), and a function performing operation (S300).

The signal input operation (S100) is a process of inputting at least one of a palm input signal of a palm through a first input unit 200 and a finger input signal of a finger through a second input unit 300, and at least one of the palm input signal of the palm through the first input unit 200 and the finger input signal of the finger through the second input unit 300 is input to a control unit 400.

In the signal input operation (S100), the first input unit 200 is provided in a first installation groove 110 of a base 100 to form a palm seating area of a user and switched to a state in which a palm input signal is input when a user's palm is seated with a set pressure or more, and a position and rotation of the palm and a palm print 21 are detected through the palm input signal.

Here, the first input unit 200 is switched to a state in which the palm input signal can be input by an electromagnetic induction method when a pressure with which the user's palm is seated is greater than or equal to the set pressure.

At this time, the control unit 400 to be described below may detect the position and rotation of the user's palm and the palm print 21, and when the first input unit 200 is horizontally rotated by the palm, the control unit 400 may detect the rotation of the palm by using static electricity, and an erroneous input caused by a non-conductive object being in contact with a motion input unit may be prevented by detecting a biometric input signal of the user. Since the first input unit 200 as described above is provided in each of the pair of bases 100, the user may individually or simultaneously input palm input signals with both hands.

That is, by moving the palm horizontally, a pointer shown in the display window of the electronic device 10 may be moved in various directions (360 degrees), and by rotating (360 degrees) the palm, a view point shown in a display window of an electronic device 10 may be moved freely with bi-directional input. When the user separates the palm from the first input unit 200 and then presses the first input unit 200 with the set pressure or more again, the first input unit 200 may recognize that the palm is positioned at the current position.

The first input unit 200 according to one embodiment of the present invention may include a digitizer 210 provided on a bottom surface of the first installation groove 110, a first conductive member 220 stacked and connected to an upper surface of the digitizer 210, a first touch sensor 230 stacked and connected to an upper surface of the first conductive member 220, a second conductive member 240 stacked and connected to an upper portion of the first touch sensor 230, a first operation unit seated on an upper surface of the second conductive member 240 to be pressable, horizontally movable, and horizontally rotatable, a palm detection unit 260 provided on an upper portion of the first operation unit to form a palm seating area and configured to detect a fingerprint 21 when the palm comes into contact with the palm seating area, and an auxiliary power supply unit 270 provided inside the first operation unit to be rechargeable or replaceable and configured to supply power to the palm detection unit 260.

The digitizer 210 is for detecting a position of the palm by an electromagnetic induction method, and the digitizer 210 may be horizontally installed on the bottom surface of the first installation groove 110 in the form of a panel, and may detect the position of the palm and a pressure by detecting an electromagnetic wave generated when a lower end of a first lifting rod 252 to be described below is brought into contact with an electronic-induction type pointer 253. The digitizer 210 as described above may detect the movement of the palm, convert detected coordinates into digital data, and transmit the digital data to the control unit 400 to be described below.

The first conductive member 220 may use an electro-conductive plastic material, may be horizontally installed in the form of a panel on the upper surface of the digitizer 210, and may be electrically connected to the digitizer 210 so that electricity may flow therebetween.

The first touch sensor 230 may detect the movement of the palm in X-line and Y-line directions in an electrostatic manner, may be horizontally installed on the upper surface of the first conductive member 220, and may be electrically connected to the first conductive member 220 so that electricity may flow therebetween. The first touch sensor 230 as described above may detect the movement of the palm in the X-line and Y-line directions and transmit the detected movement to the control unit 400 to be described below.

The second conductive member 240 may use an electro-conductive plastic material, may be horizontally installed in the form of a panel on an upper surface of the first touch sensor 230, and may be electrically connected to the first touch sensor 230 so that electricity may flow therebetween.

The first operation unit is for detecting a contact of the palm, and is switched to a state in which the palm input signal is input when the user's palm is seated thereon, and a pressure transmitted from the user's palm is greater than or equal to a set pressure. That is, the position and rotation of the palm and the palm print 21 may be detected by using the palm input signal input through the first operation unit.

The first operation unit according to one embodiment of the present invention may include a body 251 positioned on an upper portion of the second conductive member 240 to be slidably movable and horizontally rotatable and having an internal accommodation space open downward, the first lifting rod 252 coupled to an upper end of the body 251 and protruding from a lower portion of the body 251, the electronic-induction type pointer 253 that is coupled to the lower portion of the body 251 while being spaced apart therefrom, seated on the upper surface of the second conductive member 240, and connected to the lower end of the first lifting rod 252 to transmit a connection signal to the digitizer 210 by an electromagnetic induction method when the body 251 descends to a lower connection position, a coil 254 coupled to an outside of the first lifting rod 252, a pair of capacitive pointers 255 correspondingly disposed on both sides of the electronic-induction type pointer 253 with respect to the first lifting rod 252 and having lower ends seated on the upper surface of the second conductive member 240, and a first elastic member 256 coupled between the body 251 and the electronic-induction type pointer 253 and configured to elastically support a lower end of the body 251 upward.

The body 251 is seated on the upper surface of the second conductive member 240 and provided to be slidably movable in various directions (360 degrees) and horizontally rotatable (360 degrees) about a vertical rotation center C, the first lifting rod 252 is positioned to be liftable in an accommodation space 251a of the body 251. Here, the body 251 may have a cylindrical shape with a side surface forming a circumference, but the body 251 may selectively use various shapes as necessary.

The first lifting rod 252 is provided inside the accommodation space 251a to be liftable together with the body 251 to the lower connection position and an upper connection release position, and is elastically supported by the first elastic member 256 to be described below. For example, when the first lifting rod 252 descends to the lower connection position, the lower end of the first lifting rod 252 may be connected to an upper end of the electronic-induction type pointer 253 to be described below, and when the first lifting rod 252 is lifted to the upper connection release position, the lower end of the first lifting rod 252 may be positioned to be spaced apart from an upper portion of the electronic-induction type pointer 253.

The electronic-induction type pointer 253 is slidably movable together with the body 251 at a lower portion of the first lifting rod 252, the first lifting rod 252 is positioned on the upper portion of the electronic-induction type pointer 253, a lower end of the electronic-induction type pointer 253 is seated on the upper surface of the second conductive member 240 to be slidably movable, and the upper portion of the electronic-induction type pointer 253 vertically communicates with the accommodation space 251a so to be connected to and disconnected from the lower end of the first lifting rod 252.

The electronic-induction type pointer 253 as described above is connected to the lower end of the first lifting rod 252 when the body 251 descends to the connection position, and a connection signal is transmitted to the digitizer 210 by an electromagnetic induction method. Here, the digitizer 210 detects the movement of the palm, converts detected coordinates (an X-line and a Y-line) into digital data, and transmits the digital data to the control unit 400 to be described below.

When the coil 254 made of a metal material is wound on the outside of the first lifting rod 252, and the lower end of the first lifting rod 252 is connected to the upper end of the electronic-induction type pointer 253, the digitizer 210 may detect the position of the palm by electromagnetic induction with the coil 254. On the other hand, when the lower end of the first lifting rod 252 is spaced apart from the upper portion of the electronic-induction type pointer 253, the control unit 400 to be described below may recognize that the palm is spaced apart from the palm detection unit 260 to be described below.

For example, when the palm is moved in a specific direction in a state in which the body 251 descends to the connection position, the control unit 400 to be described below may recognize that the user's palm is moved, and moves the pointer shown through the display window of the electronic device 10 in the same direction as the palm.

The pair of capacitive pointers 255 are seated on the upper surface of the second conductive member 240 to be slidably movable. The capacitive pointer 255 rotates together with the electronic-induction type pointer 253 when the body 251 rotates horizontally, and a rotation direction of the capacitive pointer 255 may be detected by the first touch sensor 230.

For example, when the user's palm is rotated to the left side while the body 251 descends to the connection position, the control unit 400 to be described below may recognize that the user's palm is rotated, and may move a line-of-sight shown through the display window of the electronic device 10 in a left side. On the other hand, when the user's palm is rotated to the right side while the body 251 descends to the connection position, the control unit 400 to be described below may recognize that the user's palm is rotated, and may move the line-of-sight shown through the display window of the electronic device 10 in a right side.

The first elastic member 256 is coupled between the body 251 and the electronic-induction type pointer 253 and elastically supports the lower end of the body 251 upward, and the first elastic member 256 may have the form of a coil spring having a lower end seated on an upper surface of the electronic-induction type pointer 253 and an upper end elastically supporting the lower end of the body 251, and may be coupled in a state of surrounding the outside of the first lifting rod 252

For example, when the body 251 descends to the lower connection position, the first elastic member 256 is compressed downward, and when the body 251 is lifted to the upper connection release position, the first elastic member 256 may be stretched upward by its own elastic force, and the body 251 may maintain the lifted state by the elastic supporting force of the first elastic member 256.

The palm detection unit 260 is a part on which the user's palm is seated, and the palm detection unit 260 may be provided on the upper portion of the first operation unit to form the palm seating area, and may detect a palm print 21 when the palm is in contact with the palm print 21 and transmit a fingerprint detection signal to the control unit 400 to be described below.

Here, the palm detection unit 260 may use an electro-conductive plastic, may be horizontally coupled to the upper end of the body 251 in a disk shape, and the upper surface of the palm detection unit 260 may form an upwardly convex curvature so as to closely adhere to the user's palm. In addition, a non-conductive material may be further coupled to a lower surface of the palm detection unit 260.

In addition, when the user places (touches) the palm on the palm detection unit 260, the first input unit 200 may detect that the user's palm is in contact with the palm detection unit 260, and when the first input unit 200 descends to the contact position in a state in which the user's palm is not seated (in contact with) on the palm detection unit 260, the palm input signal of the first input unit 200 is not input. That is, since the palm input signal is input only when the user's palm is seated on the palm detection unit 260, input errors may be prevented.

In addition, a palm print detection unit 261 provided inside the palm detection unit 260 and configured to detect the palm print 21 may be further included. The palm print detection unit 261 may be provided inside the palm detection unit 260, and when the palm is in contact therewith, the fingerprint 21 of the palm seated on the upper surface of the palm detection unit 260 may be detected and a palm print detection signal may be transmitted to the control unit 400 to be described below. At this time, when the fingerprint 21 detected by the palm print detection unit 261 matches preset fingerprint information, the control unit 400 to be described below may variably set a finger input area according to a position and a detecting direction of a central point of the palm print 21 on the basis of the preset fingerprint information.

For example, when the user places the palm on the upper surface of the palm detection unit 260 and the palm print 21 of the user detected by the palm print detection unit 261 matches the fingerprint information, a distance and angle between the recognition point of the detected fingerprint and a central point of the palm print 21 of the user are derived and set as an angle of a central starting point of the palm print 21, and an input area of fingers is activated in the second input unit 300 using an average touch point for each finger in a second finger input mode, so that even when the fingers are separated, an input point of the finger can be predicted and detected through fingerprint recognition, and in a rotation center C of the first input unit and the capacitive pointer 255 of the first input unit, the recognition point is changed on the basis of the central point of the palm print 21, so that a new input of the user's finger is detected and a position data value of the finger input is stored.

In this state, when the user touches the second input unit 300 to be described below by using each of the fingers in a first finger input mode, an interval between currently touched fingers may be detected, and an input coordinate range of the fingers may be expanded and reduced.

The auxiliary power supply unit 270 is for supplying power to the palm detection unit 260, and the auxiliary power supply unit 270 may use a rechargeable or replaceable battery inside the first operation unit, may be provided in the palm detection unit 260, and may be electrically connected to the control unit 400 to be described below.

In the signal input operation (S100), the second input unit 300 is provided in the second installation groove 120 of the base 100 to form a seating area of the user's finger, and detects the finger input signal by a capacitive method when the finger is in contact therewith. The second input unit 300 may be divided into a plurality of areas by insulating materials, and is provided in each of the pair of bases 100, so that finger input signals of user's left and right hands can be input separately.

The second input unit 300 as described above may detect the finger input signal in the first finger input mode by a capacitive method when the finger comes into contact (touch) therewith with a set pressure or less, detect the finger input signal in the second finger input mode when the finger comes in contact (push) therewith with the set pressure or more, and detect an input of the finger through the finger input signal.

That is, the user touches the second input unit 300 with the finger with the set pressure or less to move the pointer shown through the display window of the electronic device 10 in various directions, and when the user pushes the second input unit 300 with the finger with the set pressure or more, various functions of the electronic device 10 may be performed by an input operation of the finger input signal.

The second input unit 300 according to one embodiment of the present invention may include a third conductive member 310 provided on a bottom surface of the second installation groove 120, a second touch sensor 320 stacked and connected to an upper surface of the third conductive member 310, a fourth conductive member 330 stacked and connected to an upper surface of the second touch sensor 320, an insulating plastic 340 made of a non-conductive material and stacked on an upper surface of the fourth conductive member 330, a plurality of lifting holes 350 vertically pass through the insulating plastic 340, a conductive elastic pad 360 positioned within a thickness of the insulating plastic 340 and having a plurality of elastic deformation areas 361 positioned respectively in the lifting holes 350 to be spaced apart from an upper portion of the fourth conductive member 330, a second operation unit provided to be liftable in the lifting hole 350 and having a lower end that presses the elastic deformation area 361 downward to connect the elastic deformation area 361 to the upper surface of the fourth conductive member 330 when the second operation unit descends to the lower connection position, and a conductive touch unit 380 positioned to be spaced apart from the upper portion of the fourth conductive member 330 and having a lower surface stacked and connected to an upper end of the second operation unit.

The third conductive member 310 may use an electro-conductive plastic, may be horizontally installed in the form of a panel on the bottom surface of the second installation groove 120, and have one side electrically connected to the first conductive member 220 described above at the same height as the first conductive member 220. Here, the third conductive member 310 may be integrally connected to the first conductive member 220 to form one body.

The second touch sensor 320 may detect the movement of the finger in the X-line and Y-line directions in an electro-static manner, may be horizontally installed on the upper surface of the third conductive member 310, and may be electrically connected to the third conductive member 310 so that electricity may flow therebetween.

Here, the second touch sensor 320 may detect the movement of the finger in the X-line and Y-line directions and transmit the detected movement to the control unit 400 to be described below, may be electrically connected to the first touch sensor 230 described above at the same height as the first touch sensor 230, and may share coordinates with the first touch sensor 230 by being electrically connected to the first touch sensor 230.

The fourth conductive member 330 may use an electro-conductive plastic, may be horizontally installed in the form of a panel on the upper surface of the second touch sensor 320, and have one side electrically connected to the second conductive member 240 described above at the same height as the second conductive member 240. Here, the fourth conductive member 330 is integrally connected to the second conductive member 240 to form one body.

The insulating plastic 340 uses a non-conductive plastic material in which electricity is not conducted, and the insulating plastic 340 may be horizontally installed in the form of a panel on the upper surface of the fourth conductive plastic 330 and may be electrically connected to the fourth conductive plastic 330 so that electricity may flow therebetween.

The lifting hole 350 is a space in which the second operation unit to be described below is installed, and is vertically penetrated through the insulating plastic 340. Here, a second lifting rod 371 to be described below is positioned to be liftable in the lifting hole 350, and an upper end of the second lifting rod 371 protrudes from an upper portion of the lifting hole 350.

The conductive elastic pad 360 may use a conductive rubber material or the like having electrical conductivity, may be horizontally installed in the form of a panel within a thickness of the insulating plastic 340, and the plurality of elastic deformation areas 361 formed on the conductive elastic pad 360 may be respectively positioned in the lifting holes 350 to be spaced apart from the upper portion of the fourth conductive member 330.

Here, the elastic deformation areas 361 may be positioned in the lifting holes 350, respectively, and when the second lifting rod 371 to be described below descends to the connection position, the elastic deformation area 361 is electrically connected to the upper surface of the fourth conductive member 330 by being convexly bent and deformed downwardly while being connected to the second lifting rod 371. That is, when the user pushes a conductive fiber 384 with the finger with the set pressure or more to lower the second lifting rod 371 to the connection position, a lower end of the second lifting rod 371 is connected to an upper end of the elastic deformation area 361, and the conductive elastic pad 360 transmits the connection signal to the second conductive member 240.

When the user touches the conductive fiber 384 of the second input unit 300 with each finger in the second finger input mode, each input point for the second finger input mode is connected to the capacitive pointer 255, and then an input value of the touch point may be stored in a database, and a touch point input coordinate range of each finger may be formed by deriving a distance value of the average touch point of an average touch point of each finger input for the second finger input mode and the center of the capacitive pointer 255.

In addition, when the user's palm is seated on the palm detection unit 260, the palm print detection unit 261 may scan the palm print 21 of the user. When the palm print detection unit 261 recognizes the palm print 21 of the user, the palm print detection unit 261 may detect an input by recognizing a rotation angle on the basis of user's fingerprint data scanned using the recognized fingerprint, forming a central point of the palm print 21 of the user, and adjusting a position of an average touch point input area using the position and the angle. When the user touches the conductive fiber 384 of the second input unit 300 using each finger in the first finger input mode, an input coordinate range of the fingers may be expanded or reduced by detecting an interval between currently touched fingers.

For example, in an initial use, the palm print 21 of the user is scanned and then, the central point and the central angle of the palm print 21 are set, and then touch and push input points for each finger are input, and then, the position and angle of the average coordinate value of the second finger input mode are adjusted to the position of the palm input through the palm print detection unit 261, and the first and second finger input areas are formed, and then the touch range may be expanded and reduced to the current position for each finger of the first finger input mode, and the palm detection unit 260 moves and rotates together with the user's palm.

In addition, the conductive fiber 384 of the second input unit 300 may be used according to the purpose by adjusting a touch pressure by changing the elastic strength and thickness thereof, and even when the user's finger is not touched, the input of the fingers may be detected by detecting the palm print and storing a position of the last touch for each finger. That is, since the first input unit 200 and the second input unit 300 detect the palm and fingers of the user together, it is possible to comprehensively detect the movement and rotation of the palm, the input position of the finger, and the like.

The second operation unit is for detecting a contact of the finger, and is switched to the second finger input mode in which the finger input signal is input when a pressure transmitted from the user's finger is greater than or equal to the set pressure.

The second operation unit according to one embodiment of the present invention may include the second lifting rod 371 positioned on an upper portion of the elastic deformation area 361 to be liftable and having a side surface from which a locking protrusion 371a protrudes, and configured to press the elastic deformation area 361 downward while descending to the connection position, a locking step 372 protruding from an inner circumferential surface of the lifting hole 350 and configured to positionally lock an upper end of the locking protrusion 371a when the second lifting rod 371 is lifted to a connection release position, and a second elastic member 373 provided between the locking step 372 and the locking protrusion 371a and configured to elastically support a lower end of the locking protrusion 371a upward.

The second lifting rod 371 is provided in the lifting hole 350 to be liftable from the lower connection position and to the upper connection release position, the lower end of the second lifting rod 371 is positioned to be liftable in the lifting hole 350, and the upper end of the second lifting rod 371 is positioned in a state of being in close contact with a lower surface of a first conductive elastic pad 381 to be described below.

The second lifting rod 371 as described above is lifted to the upper connection release position while being elastically supported by the second elastic member 373 to be described below, the locking protrusion 371a of the second lifting rod 371 maintains the positionally locked state to an upper end of the lifting hole 350, and the lower end of the second lifting rod 371 is positioned to be spaced apart from the upper portion of the elastic deformation area 361. On the other hand, when the user pushes the conductive fiber 384 of the conductive touch unit 380 to be described below with the finger with the set pressure or more, the second lifting rod 371 descends to the lower connection position, and the second elastic member 373 is compressed downward by the lowering of the locking protrusion 371a.

The locking step 372 may protrude from the inner circumferential surface of the lifting hole 350, a through hole may vertically pass through the locking step 372 so that the lower end of the second lifting rod 371 vertically pass through the through hole, and the lower end of the second lifting rod 371 may be positionally locked when the second lifting rod 371 is lifted to the connection release position.

The second elastic member 373 is coupled to an outside of the second lifting rod 371, has a lower end seated on an upper end of the locking step 372, and has an upper end elastically supporting the lower end of the locking protrusion 371a upward. For example, when the second lifting rod 371 descends to the connection position, the second elastic member 373 is compressed downward, and when the second lifting rod 371 is lifted to the connection release position, the second elastic member 373 is stretched upward by its own elastic force, and the second lifting rod 371 may be positioned in a lifted state by the elastic supporting force of the second elastic member 373.

The conductive touch unit 380 may include a first conductive elastic pad 381 positioned to be spaced apart from the upper portion of the fourth conductive member 330 and having a lower surface stacked and connected to the upper end of the second lifting rod 371, a third touch sensor 382 stacked and connected to an upper surface of the first conductive elastic pad 381, a second conductive elastic pad 383 stacked and connected to an upper surface of the third touch sensor 382, and the conductive fiber 384 stacked and connected to an upper surface of the second conductive elastic pad 383 to form the finger seating area.

The first conductive elastic pad 381 may be manufactured using an elastic material so that a shape thereof can be horizontally restored by self-elastic force after being convexly bent and deformed downwardly when the user presses the first conductive elastic pad 381 as shown in FIG. 13, and the first conductive elastic pad 381 may be manufactured using a material such as PET. Here, the lower surface of the first conductive elastic pad 381 and the upper end of the second lifting rod 371 described above may be attached by a separate adhesive 381a.

The third touch sensor 382 may detect the movement of the finger in the X-line and Y-line directions in an electrostatic manner, may be horizontally installed on the upper surface of the first conductive elastic pad 381, and may be electrically connected to the first conductive elastic pad 381 so that electricity may flow therebetween. The third touch sensor 382 as described above may detect the movement of the finger in the X-line and Y-line directions and transmit the detected movement to the control unit 400 to be described below.

The second conductive elastic pad 383 may be manufactured using an elastic material so that a shape thereof can be horizontally restored by self-elastic force after being convexly bent and deformed downwardly when the user presses the second conductive elastic pad 383 as shown in FIG. 13, and the second conductive elastic pad 383 may be manufactured using a material such as PET.

The conductive fiber 384 is the part with which the user's finger comes into contact, and the conductive fiber 384 may use a conductive yarn material in which a conductive material such as carbon or metal is included in a fiber in order to detect static electricity flowing through the finger of the user, and is horizontally coupled to an upper surface of the second conductive elastic pad 383. Here, the conductive fiber 384 may horizontally cover the entire area above the second installation groove 120.

Next, in the signal transmission operation (S200), a control signal is generated by the control unit 400 according to the palm input signal input through the first input unit 200 and the finger input signal input through the second input unit 300, and the control signal is transmitted to the electronic device 10 by the communication module 410.

When fingerprint information is preset in the control unit 400, and the detected palm print 21 matches the preset fingerprint information, a finger input area according to the position and set direction of the palm print 21 is set in a user recognition operation (S20), the signal input operation (S100) is performed. When the input using the finger is detected according to the system settings, the function of the signal transmission operation (S200) is performed, and the control signal is transmitted to the electronic device 10 by the communication module 410.

In this case, the user may zoom in or out the finger input area by decreasing or increasing an interval between the fingers while multi-touching the conductive fiber 384 with the finger, and when the user rotates the palm, the control unit 400 may detect the rotation of the palm detection unit 260 and may reset the finger input area according to the recognition of the center of the palm print 21 by the palm detection unit 260.

In addition, various input modes may be preset in the control unit 400, and when the user touches the second input unit 300 in a preset pattern using the finger, the corresponding input mode may be performed through the display window of the electronic device 10, and when the user moves or rotates the first input unit 200 in a specific direction by using the palm, the corresponding input mode may be performed together through the display window of the electronic device 10.

In addition, various input modes may be preset in the control unit 400 using input methods such as touching, pushing, and sliding, contacting, non-contacting, separating, and the like, when the user touches the second input unit 300 in a predetermined pattern using the finger, the corresponding input mode may be performed through the display window of the electronic device 10, and when the user moves or rotates the first input unit 200 in a specific direction using the palm, the corresponding input mode may be performed together through the display window of the electronic device 10.

In addition, input immediately after being touched during non-contact, input immediately after being pushed during non-contact, input after a while after being pushed during contact, input immediately after being pushed during contact, and input after a while after being pushed during non-contact may be used for the input mode, and input methods such as double-touch, touch-swipe, multi-touch, multi-touch rotation, multiple direction touch swipe, one direction touch swipe, double-push, push-swipe, multi-push, multiple direction push swipe, and one direction push swipe may be used.

In addition, the control unit 400 may include a communication module 410 for near-field communication with an electronic device, a power switch 420 for operating a power-on/off state, and a display unit 430 for displaying state information to the outside, and the control unit 400 described above may be electrically connected to the charging terminal 130. The communication module 410 may use methods of Bluetooth, Wi-Fi, and the like, but may selectively use various near-field communication methods as necessary, and may be installed in a state of being embedded in the base 100.

A fingerprint detection unit 700 for inputting the fingerprint (reference numeral not shown) of the user may be further electrically connected to the control unit 400 according to one embodiment of the present invention, and the detection unit of the fingerprint detection unit 700 may be installed in a state of being exposed to the outer surface of the base 100. For example, the detection unit of the fingerprint detection unit 700 may be horizontally positioned on the edge-side upper surface of the base 100, and the user may register the fingerprint or release a lock by bringing the finger into contact with the detection unit.

In addition, when the driving of the power supply unit 500 is turned on, the control unit 400 may perform a function of registering and modifying the fingerprint, may selectively store one or more fingerprints, and may release the lock and switch to a usable state when the fingerprint of the user is input. For example, when the driving of the power switch 420 is turned on, a fingerprint recognition function of the fingerprint detection unit 700 may be performed.

Finally, in the function performing operation (S300), the function set in the electronic device 10 according to the transmitted control signal is displayed through the display window.

When the user inputs the finger input signal with the finger in the signal input operation (S100), a virtual interface (a key input pattern, a keyboard, or the like) may be visually displayed through the display window of the electronic device 10 as in FIGS. 19 to 26, and positions for inputting key buttons (characters, numbers, symbols, and the like) of the interface displayed through the display window may be set in each seating area of the second input unit 300.

In the signal input operation (S100), when the user touches the second input unit 300 in the preset pattern with the finger, as shown in FIG. 27, input information (a thumb: E, an index finger: A, a middle finger: B, a ring finger: C, and a little finger: D) of a left hand L, input information (a thumb: 5, an index finger: 1, a middle finger: 2, a ring finger: 3, and a little finger: 4) of a right hand R, a pointer showing a finger touch point, and the like may be selectively displayed through the display window of the electronic device 10, and as shown in FIG. 33, the movement and rotation direction of the first input unit 200 may be selectively displayed (images or the like) through the display window of the electronic device 10.

When the user multi-touches (A+B, A+1, 1+2+3, and the like) or multi-pushes (A+B, A+1, 1+2+3, and the like) the second input unit 300 with the fingers A to E and 1 to 5, as shown in FIG. 34, a confirmation window displaying the inputs through the display window of the electronic device 10 may be activated and externally displayed, and the user may confirm input options shown through the confirmation window.

When the user touches or pushes the second input unit 300 with the finger to select a keyboard function, a keyboard shape may be displayed through the display window of the electronic device 10 as shown in FIGS. 35 to 37. The key buttons and the like of the keyboard may be arranged in various combinations as necessary, may be changed according to a displayed input language and various set input values by visually sharing the input through the display window of the electronic device 10 by using the second input unit 300, and may be adjusted in size and input values in various ways to the user's convenience.

The virtual keyboard and the second input unit 300 may have different touch ranges based on input frequency and user input data. In addition, the virtual keyboard screen during keyboard typing allows the user to detect typos and prevent them by changing the input position before spacing the fingers by using spaced input that pushes and slides in the second finger input mode during inputting and non-inputting.

As shown in FIG. 36, when typing "Good morning" and touching an area between "g" and "f" and "v" while typing the last "g", the actual input area for "g" may be enlarged or autocorrected to reduce the frequency of user errors. When the user deletes a character when inputting with autocorrect, the system stores the error in the database so that the same character is input uncorrected when inputting, so that user convenience is increased, and an actual input area may be set to be larger than the input area displayed on the screen for the frequently used button A among buttons Q, W, and A.

The default input is made by push input, but when touch input is input, the touch input may be input according to the judgment of a non-input prevention system, during keyboard input, the thumb E and space 5 are input by swiping after pushing an input language, an emoticon, special characters, and the like, and the first input unit 200 may be changed by a method of inputting a language, an emoticon, a numeric keypad, or the like in various ways such as left/right rotation, multiple direction touch, and swipe by the user.

In addition, a shape of the user's hand may be displayed together through the display window of the electronic device 10, and when the left hand fingers A to C of the user are used to move and rotate the palm in the same way that a range-type movement input is used to rotate and move the palm of the hand when a movable input window is activated, the shape of the keyboard may be positioned to correspond to the detecting direction of the palm print 21.

In this case, the input area may be formed in an area from the index finger 1 to the ring finger 3, the user's touch point may be confirmed on the interface of the input window in which the input area moves theretogether even when the first input unit moves and rotates on the basis of the central point of the palm print 21, input values (e.g., "ctrl," "alt," "shift," "tap," and the like) may be set according to the convenience of developers and users, and existing input values for the thumb 5 and the little finger 4 may be maintained.

In addition, the interface displayed through the display window of the electronic device 10 may be zoomed in and out by using the second input unit 300, the interface may be divided into left and right hand display windows, and a page with a limited number of input values may be formed by performing a page flip function to allow more input values to be set.

In addition, mouse and pen functions may be activated by inputting a finger input signal by using the second input unit 300. An input value may be set by multi-touch like a right mouse click during mouse input, a touch position of a pen may be confirmed with the first finger input mode in a state in which a field of view is blocked using a stylus pen or the like used in mobile phones, and pen input is possible through the second finger input mode with a set pressure or more.

More specifically, when activating the mouse function, the position of the mouse may be detected by touching the second input unit 300, and the finger input signal may be input by pushing the second input unit 300. On the other hand, when activating the pen function, the position of the pen may be detected by touching the second input unit 300, and the finger input signal may be input by pushing the second input unit 300.

When activating the mouse function, a multi-touch function may be used, and an input window like a right mouse button may be generated by mouse input with one finger (such as the index finger) and push input with the rest of the fingers. In addition, when one finger is used to drag a shape such as a quadrangular shape during push input, and the other fingers are used to push and then swipe forward, a hexahedral shape may be dragged, and a finger rotation may be used to change a line-of-sight and drag input at the same time.

A horizontal plane using X and Y coordinates and a vertical plane using X and Z coordinates may be controlled simultaneously by using the first input unit 200 and the second input unit 300 with both hands to control X, Y, and Z coordinates of a 3D space, zooming in and out of the horizontal plane using the X and Y coordinates in a direction of a Z-coordinate, and the movement control of the vertical plane using the X and Z coordinates upwardly and downwardly in a direction of a Y-coordinate, rotating the palm, and inputting ten fingers are utilized simultaneously, existing keyboard, mouse, touch screen, console game controller devices may be integrated by utilizing a wide space of the second input unit 300 to create and utilize input options, and new input methods are added, thereby utilizing the present invention in various fields such as work and games in a virtual space.

Meanwhile, before the above-described signal input operation (S100), a fingerprint recognition operation (S10) of determining whether the palm print 21 input through the first input unit 200 matches the fingerprint information preset in the control unit 400, and the user recognition operation (S20) of switching to a state in which the palm input signal is input when the input fingerprint 21 matches the fingerprint information may be included.

In addition, in the above-described signal input operation (S100), when the palm input signal is input through the first input unit 200, the finger input area preset in the control unit 400 may be set to the second input unit 300, and in the user recognition operation (S20), a fingerprint of the seated palm may be detected using a function of recognizing the palm print 21 of the first input unit 200, a recognition point at the center of the palm print 21 may be set, and a finger input area may be set according to the location and setting direction.

For example, as shown in FIGS. 28 to 30, when the palm print 21 of the user is scanned using the first input unit 200 and the second input unit 300 is used to input touch and push input points for each of the fingers (10 fingers), the first and second finger input areas are formed, the input area for each finger is formed by recognizing the central point of the palm print 21 with the fingerprint recognized through the fingerprint detection unit 261 of the first input unit 200 when the palm is seated after the palm is separated, and forming the input area according to an average touch point of the second finger input mode according to the position and angle, and the seating area may be enlarged or reduced to a current position of each finger in the first finger input mode.

In addition, when the user rotates the palm, as shown in FIG. 33, the control unit 400 detects the rotation and position of the first input unit 200 by using the vertical rotation center C and the capacitive pointer 255, and the palm print detection unit 261 of the first input unit 200 may set the input area (expected touch point) according to the recognition of the central point of the palm print 21 and an angular direction by using the recognized palm print and the preset fingerprint information. That is, since the input area of each finger is variably formed at a position corresponding to the input position and direction of the palm, whether each of the fingers is touched may be accurately detected, and input errors may be prevented when touching during palm movement and rotation since the input area of each finger is formed individually, touch or push input is activated after the fingers are separated, and options.

In addition, before the signal input operation (S100), a fingerprint registration operation (not shown) of registering the fingerprint 21 by switching the power of the control unit 400 to an ON state and then placing the palm on the palm seat unit 210 may be further included. In this case, the fingerprint information of the user may be stored in the control unit 400, and the user recognition operation (S20) may be performed by using the fingerprint information stored in the control unit 400.

In the fingerprint registration operation, fingerprints of multiple users may be registered, and when the fingerprint 21 of one user among the multiple users is scanned using the fingerprint detection unit 261, a finger input area of the corresponding user may be set in the second input unit 300, and in initial setting, a reference value of the center of the palm and the angle when the center of the fingerprint detection unit 261 and the user's middle finger 2 are seated in the same straight line position may be stored, and a touch area for each finger of the user may be stored as a push input for each finger. When the palm is seated on the palm seat unit 210 again, a distance interval between the fingerprint sensor and the center of the palm and the angle of the palm are detected, and the input of the fingers may be detected by adjusting the position of the average push input point of the user.

As a result, it is possible to control devices such as screen devices, 3D virtual screens, and augmented reality by implementing various motions (movement and rotation) and visual and spatial control with free touch and push input by manipulating both hands simultaneously, so that the present invention may improve the diversity and convenience of use, and it is possible to change settings of the change of the input area and the input method according to the purpose, the size of the user's hand, and the input pattern, so that the present invention may be utilized in various electronic devices 10 and can satisfy the requirements of various users since the user can select a desired input method.

In addition, according to the present invention, since a single touch input of the finger and a push input of the finger may be switched to individual inputs of ten fingers through the display window of the electronic device 10, and a line-of-sight may be diverted in various directions in a virtual space by using the palm and without moving the head, a field of view is prevented from being blocked, and a virtual input space shown through the display window of the electronic device 10 may be widely used, so that even inexperienced users can easily input.

In addition, since the line-of-sight shown through the display window of the electronic device may be diverted in various directions, the field of view is prevented from being blocked, and the virtual input space shown through the display window of the electronic device 10 may be widely used, even inexperienced users can easily input, foreign substances may be blocked from entering the first installation groove 110, and the body 251 of the first operation unit may be prevented from being twisted while being moved, so that stable operation is possible.

For example, when used as an input device for VR devices, limited input methods in virtual reality in which a field of view is blocked or the entire body should be used, spatial discomfort, and physical fatigue may be eliminated, since key input, touch, drag, joystick input, and stylus pen input that transmits static electricity are possible using both hands and ten fingers, the input device may be interworked with the existing input device, and free input and control are possible, and since the position of the user's finger may be confirmed using a virtual interface (a keyboard or the like) shown through the display window of the electronic device 10, key input errors can be prevented. In addition, the input device may be implemented as a single device together with a keyboard game console, so that use convenience may be improved, and the input method may be freely changed according to the setting of both hands.

Although the input device and the method of controlling the same according to the present invention have been described above, it is apparent that various embodiments are possible without departing from the scope of the present invention.

Therefore, the scope of the present invention is not limited to the described embodiments, and should be defined by the claims as well as the scope of the claims which will be described below.

In other words, it should be understood that the above-described embodiments are illustrative in all respects and are not intended to limit the present invention to the above-described embodiments, and the scope of the present invention is in the claims described later rather than the detailed description described above. All changes or modifications derived from the meaning and scope of the claims and equivalent concepts should be construed as being included in the scope of the present invention.

Modes of the Invention

The embodiments of the present invention have been described together in the best mode for carrying out the disclosure.

INDUSTRIAL APPLICABILITY

Since various motions and touch and push inputs are possible using electromagnetic induction and capacitive touch methods, the diversity and convenience of use may be improved, and thus, the present invention is industrially applicable.

The invention claimed is:
1. An input device comprising:
a pair of bases each including a first installation groove and a second installation groove formed on an upper surface, and having facing one sides rotatably coupled to each other;
a first input unit provided in the first installation groove to form a palm seating area and configured to detect a palm input signal by electromagnetic and capacitive methods when a palm is brought into contact therewith;
a second input unit provided in the second installation groove to form a finger seating area and configured to detect a finger input signal by a capacitive method when a finger is brought into contact therewith;

a control unit provided on each of the bases, connected to an electronic device by a communication module, and configured to transmit the palm input signal and the finger input signal transmitted respectively from the first input unit and the second input unit to the electronic device; and a power supply unit provided in each of the bases to be rechargeable or replaceable and configured to supply power to the control unit, wherein the first input unit is switched to a state in which the palm input signal is input when the palm is seated with a set pressure or more, and detects a position and a rotation of the palm and a palm print through the palm input signal, when fingerprint information is preset and the detected palm print matches the fingerprint information, the control unit forms a central point of the palm print on the basis of the fingerprint information and a point at which the palm print of a user detected by the first input unit is recognized, and variably sets a finger input area in proportion to an angular direction in which the palm is rotated based on the central point of the palm print, and wherein the second input unit detects the finger input signal in a first finger input mode when touched by the finger with the set pressure or less, detects the finger input signal in a second finger input mode when being in contact with the finger with the set pressure or more, and detects a position of the finger through the finger input signal.

2. The input device of claim 1, wherein the first input unit includes:
   a digitizer provided on a bottom surface of the first installation groove;
   a first conductive member stacked and connected to an upper surface of the digitizer;
   a first touch sensor stacked and connected to an upper surface of the first conductive member;
   a second conductive member stacked and connected to an upper portion of the first touch sensor;
   a first operation unit seated on an upper surface of the second conductive member to be pressable, horizontally movable, and horizontally rotatable;
   a palm detection unit provided on an upper surface of the first operation unit to form the palm seating area, and configured to detect the palm print when the palm is in contact therewith; and
   an auxiliary power supply unit provided inside the first operation unit to be rechargeable or replaceable and configured to supply power to the palm detection unit.

3. The input device of claim 2, wherein the first operation unit includes:
   a body positioned on an upper portion of the second conductive member to be slidably movable and horizontally rotatable, and having an internal accommodation space open downward;
   a first lifting rod protruding from a lower portion of the body;
   an electronic-induction type pointer that is coupled to a lower portion of the body while being spaced apart therefrom, seated on the upper surface of the second conductive member, and connected to a lower end of the first lifting rod when the body descends to a lower connection position;
   a coil coupled to an outside of the first lifting rod;
   a pair of capacitive pointers correspondingly disposed on both sides of the electronic-induction type pointer with respect to the first lifting rod and having lower ends seated on the upper surface of the second conductive member; and
   a first elastic member coupled between the body and the electronic-induction type pointer and configured to elastically support a lower end of the body upward.

4. The input device of claim 1, wherein the second input unit includes:
   a third conductive member provided on a bottom surface of the second installation groove;
   a second touch sensor stacked and connected to an upper surface of the third conductive member;
   a fourth conductive member stacked and connected to an upper surface of the second touch sensor;
   an insulating plastic stacked on an upper surface of the fourth conductive member and made of a non-conductive material;
   a plurality of lifting holes vertically passing through the insulating plastic;
   a conductive elastic pad positioned within a thickness of the insulating plastic and having a plurality of elastic deformation areas positioned respectively in the lifting holes to be spaced apart from an upper portion of the fourth conductive member;
   a second operation unit provided to be liftable in the lifting hole and having a lower end that presses the elastic deformation area downward to connect the elastic deformation area to the upper surface of the fourth conductive member when the second operation unit descends to a lower connection position; and
   a conductive touch unit positioned to be spaced apart from the upper portion of the fourth conductive member and having a lower surface stacked and connected to an upper end of the second operation unit.

5. The input device of claim 4, wherein the second operation unit includes:
   a second lifting rod positioned on an upper portion of the elastic deformation area to be liftable, having a side surface from which a locking protrusion protrudes, and configured to press the elastic deformation area downward while descending to the connection position;
   a locking step protruding from an inner circumferential surface of the lifting hole and through which a lower end of the second lifting rod vertically passes; and
   a second elastic member provided between the locking step and the locking protrusion and configured to elastically support a lower end of the locking protrusion upward.

6. The input device of claim 5, wherein the conductive touch unit includes:
   a first conductive elastic pad positioned to be spaced apart from the upper portion of the fourth conductive member and having a lower surface stacked and connected to an upper end of the second lifting rod;
   a third touch sensor stacked and connected to an upper surface of the first conductive elastic pad;
   a second conductive elastic pad stacked and connected to an upper surface of the third touch sensor; and
   a conductive fiber stacked and connected to an upper surface of the second conductive elastic pad to form the finger seating area.

7. A method of controlling an input device, the method comprising:

a signal input operation of inputting one or more of a palm input signal of a palm through a first input unit and a finger input signal of a finger through a second input unit;

a signal transmission operation of generating a control signal by a control unit according to the input palm input signal and finger input signal, and then transmitting the control signal to an electronic device by a communication module; and a function performing operation of displaying a function set in the electronic device through a display window according to the transmitted control signal, wherein the first input unit is switched to a state in which a palm input signal is input when the palm of a user is seated with a set pressure or more, and detects a position and a rotation of the palm through the palm input signal, the second input unit detects the finger input signal in a first finger input mode when touched by the finger of the user with the set pressure or less, and detects the finger input signal in a second finger input mode when touched by the finger with the set pressure or more, and the first input unit is provided in the first installation groove to form a palm seating area and configured to detect a palm input signal by electromagnetic and capacitive methods when a palm is brought into contact therewith, the second input unit is provided in the second installation groove to form a finger seating area and configured to detect a finger input signal by a capacitive method when a finger is brought into contact therewith.

8. The method of claim 7, comprising:

before the signal input operation, a fingerprint recognition operation of determining whether a palm print input through the first input unit matches fingerprint information preset in the control unit; and a user recognition operation of activating functions of the first input unit and the second input unit when the input palm print matches the fingerprint information.

9. The method of claim 8, wherein in the signal input operation, when the palm input signal is input through the first input unit, a preset finger input area in the control unit is set in the second input unit, and in the user recognition operation, when the function of the palm input signal is activated, a central point of the palm print is formed on the basis of the fingerprint information and a point at which the palm print of the user detected by the first input unit is recognized, and a finger input area is variably set in proportion to an angular direction in which the palm is rotated based on the central point of the palm print.

\* \* \* \* \*